United States Patent
Liu et al.

(10) Patent No.: US 12,474,885 B2
(45) Date of Patent: Nov. 18, 2025

(54) PROJECTED INTERFACES OF ELECTRONIC DEVICES

(71) Applicant: Huawei Technologies Co., Ltd., Shenzhen (CN)

(72) Inventors: Shicong Liu, Shenzhen (CN); Guofeng Li, Shenzhen (CN); Lifen Ye, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/041,492

(22) PCT Filed: Aug. 2, 2021

(86) PCT No.: PCT/CN2021/109972
§ 371 (c)(1),
(2) Date: Feb. 13, 2023

(87) PCT Pub. No.: WO2022/033342
PCT Pub. Date: Feb. 17, 2022

(65) Prior Publication Data
US 2023/0342104 A1    Oct. 26, 2023

(30) Foreign Application Priority Data

Aug. 11, 2020   (CN) .......................... 202010803731.5

(51) Int. Cl.
*G06F 3/14*     (2006.01)
*G06F 3/0486*   (2013.01)

(52) U.S. Cl.
CPC .......... *G06F 3/1454* (2013.01); *G06F 3/0486* (2013.01)

(58) Field of Classification Search
CPC .......... G06F 3/048–0488; G06F 3/1454–1462; G06F 9/452; G09G 5/12–14; G09G 2370/06–20
See application file for complete search history.

(56) References Cited

U.S. PATENT DOCUMENTS

2010/0261507 A1\* 10/2010 Chang ..................... G09G 5/14
                                                    455/566
2011/0119611 A1\*  5/2011 Ahn ....................... H04N 21/47
                                                    715/810

(Continued)

FOREIGN PATENT DOCUMENTS

CN       104506907 A     4/2015
CN       105549870 A     5/2016
(Continued)

*Primary Examiner* — Keith L Crawley
(74) *Attorney, Agent, or Firm* — Conley Rose, P.C.

(57) ABSTRACT

A data transmission method is implemented by a first electronic device and includes displaying a first window and a second window, where the first window displays a projected interface of a second electronic device, and the second window displays a projected interface of a third electronic device; detecting a first input instruction that acts on first information in the first window; sending a second input instruction to the second electronic device based on the first input instruction, where the second input instruction instructs the second electronic device to determine the first information; receiving, from the second electronic device, first transmission information about the first information; detecting a third input instruction acting on the second window; and sending, to the third electronic device based on the third input instruction, second transmission information generated based on the first transmission information.

19 Claims, 51 Drawing Sheets

(56) References Cited

U.S. PATENT DOCUMENTS

| | | | | |
|---|---|---|---|---|
| 2012/0088548 | A1* | 4/2012 | Yun | G08C 23/04 |
| | | | | 455/557 |
| 2014/0181686 | A1* | 6/2014 | Shin | G09G 5/397 |
| | | | | 715/748 |
| 2015/0061972 | A1* | 3/2015 | Seo | H04M 1/72412 |
| | | | | 345/2.3 |
| 2015/0082241 | A1* | 3/2015 | Kang | H04N 7/15 |
| | | | | 715/803 |
| 2016/0350055 | A1* | 12/2016 | Ji | G09G 5/12 |
| 2017/0150227 | A1* | 5/2017 | Kim | G06Q 20/326 |
| 2017/0235435 | A1* | 8/2017 | Sohn | G06F 3/0481 |
| | | | | 715/738 |
| 2018/0074779 | A1* | 3/2018 | Marquardt | G06F 3/1454 |
| 2021/0048933 | A1* | 2/2021 | Shah | G06F 3/1423 |
| 2022/0147228 | A1* | 5/2022 | Yi | H04M 1/72412 |
| 2022/0229624 | A1* | 7/2022 | Xiong | G09G 5/14 |
| 2022/0291892 | A1 | 9/2022 | Gu | |
| 2022/0295027 | A1* | 9/2022 | Wang | H04N 21/4312 |
| 2022/0326825 | A1* | 10/2022 | Niu | G06F 3/0481 |

FOREIGN PATENT DOCUMENTS

| | | |
|---|---|---|
| CN | 106293563 A | 1/2017 |
| CN | 106850719 A | 6/2017 |
| CN | 107066172 A | 8/2017 |
| CN | 110515576 A | 11/2019 |
| CN | 110597474 A | 12/2019 |
| CN | 110703966 B | 6/2021 |
| KR | 20120069490 A | 6/2012 |

* cited by examiner

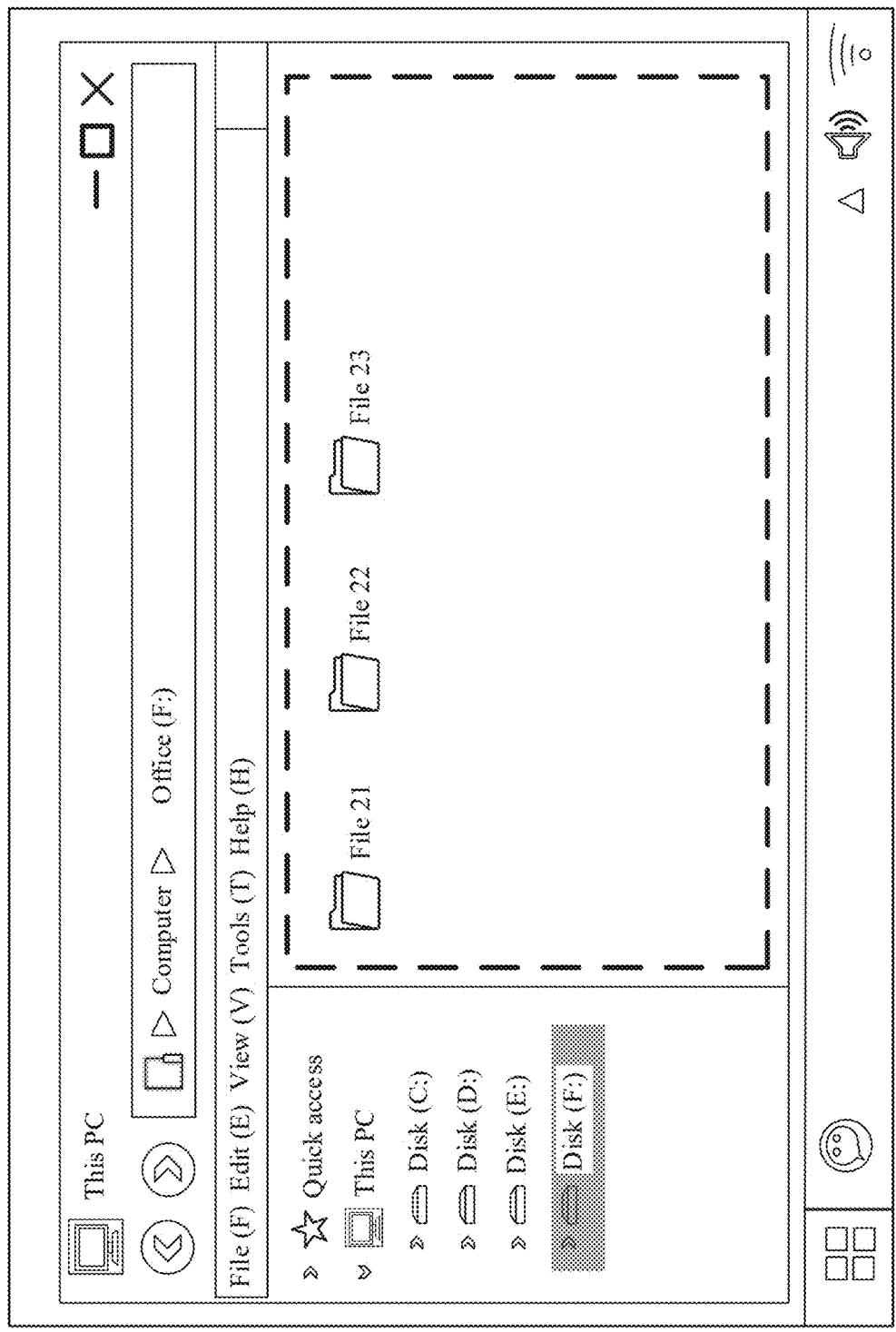

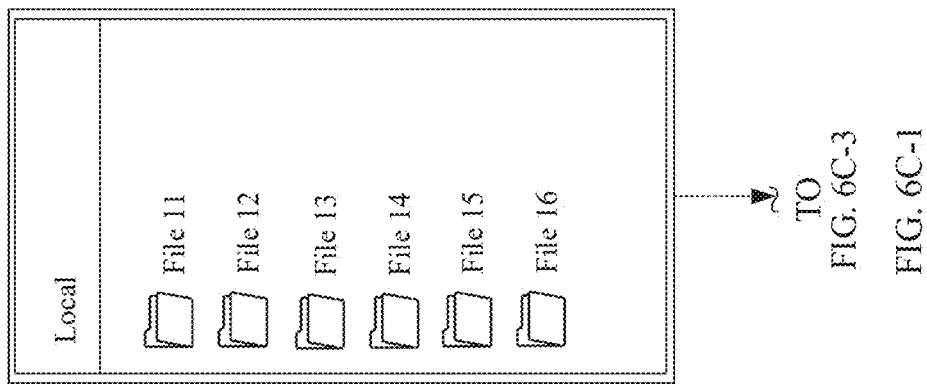

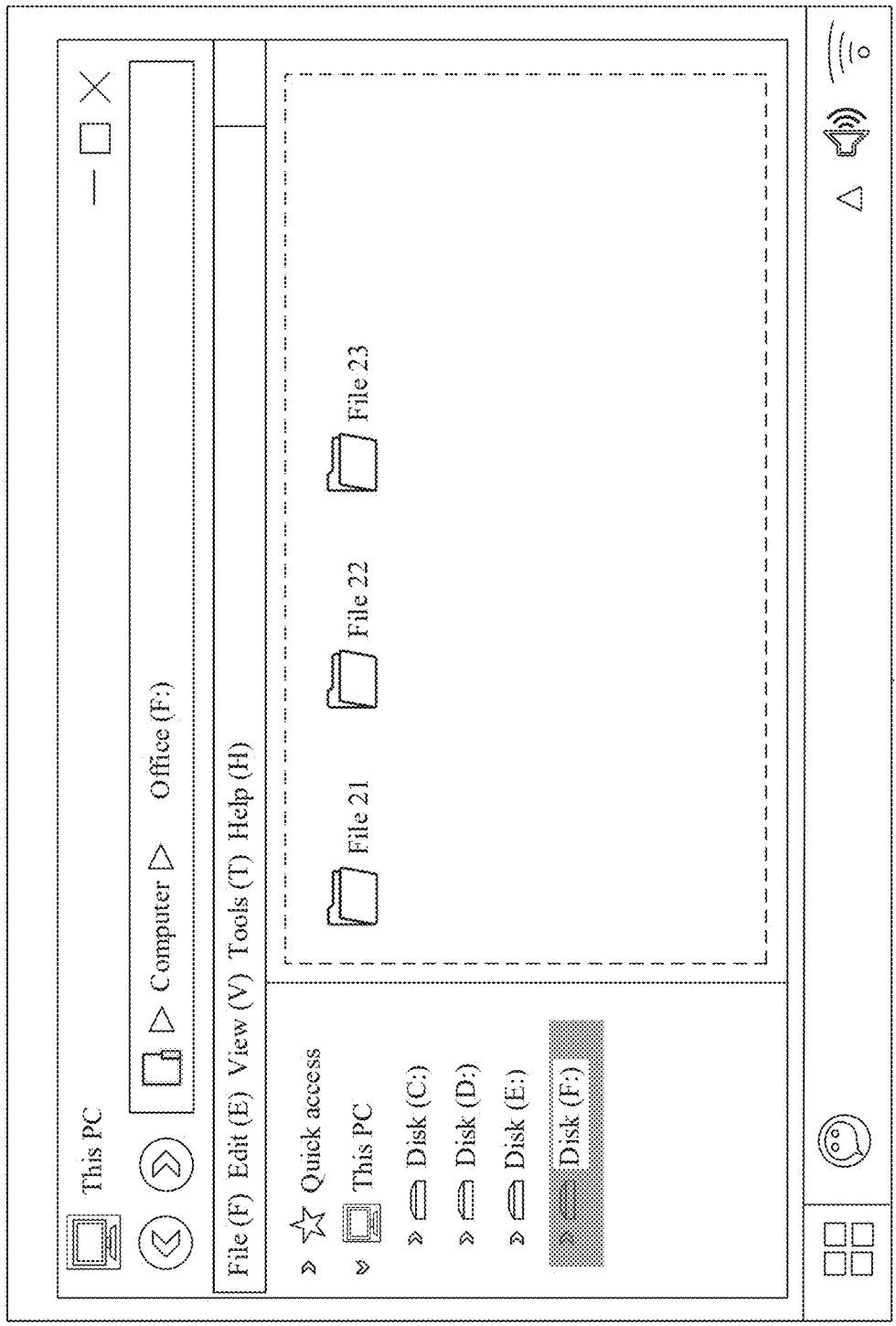

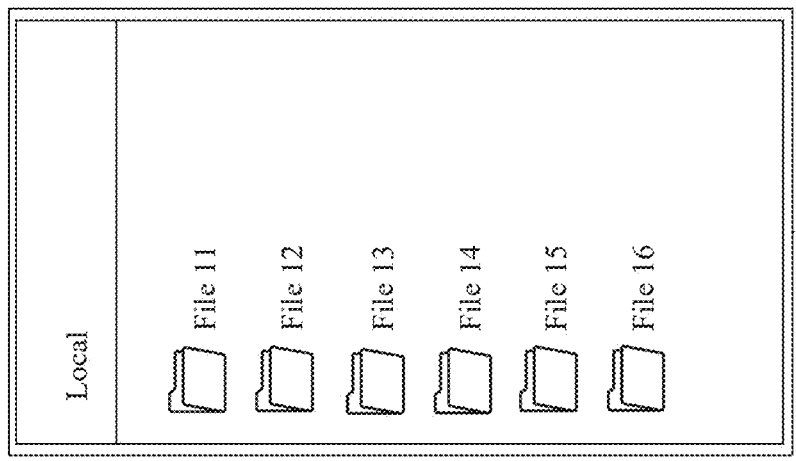

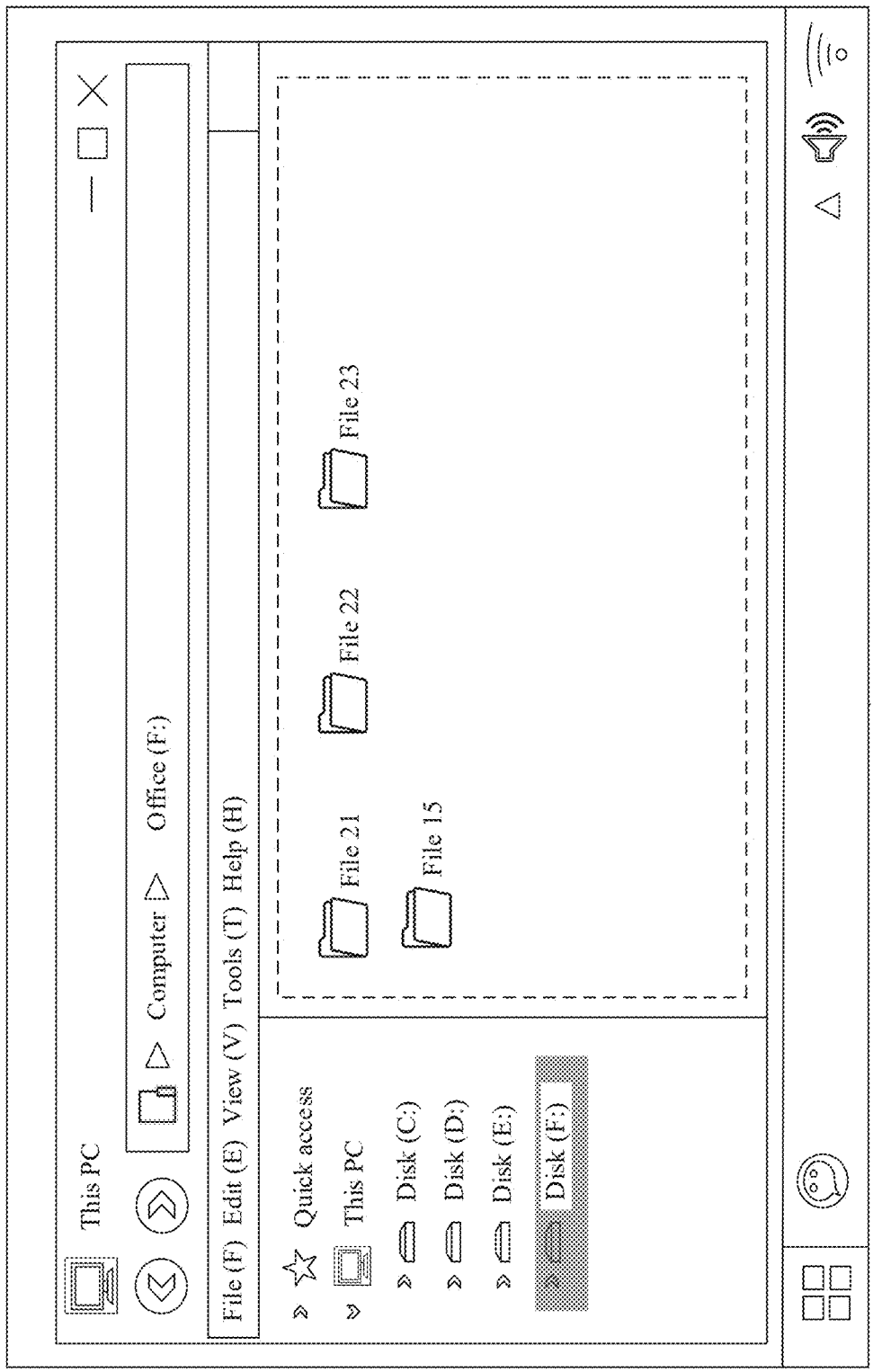

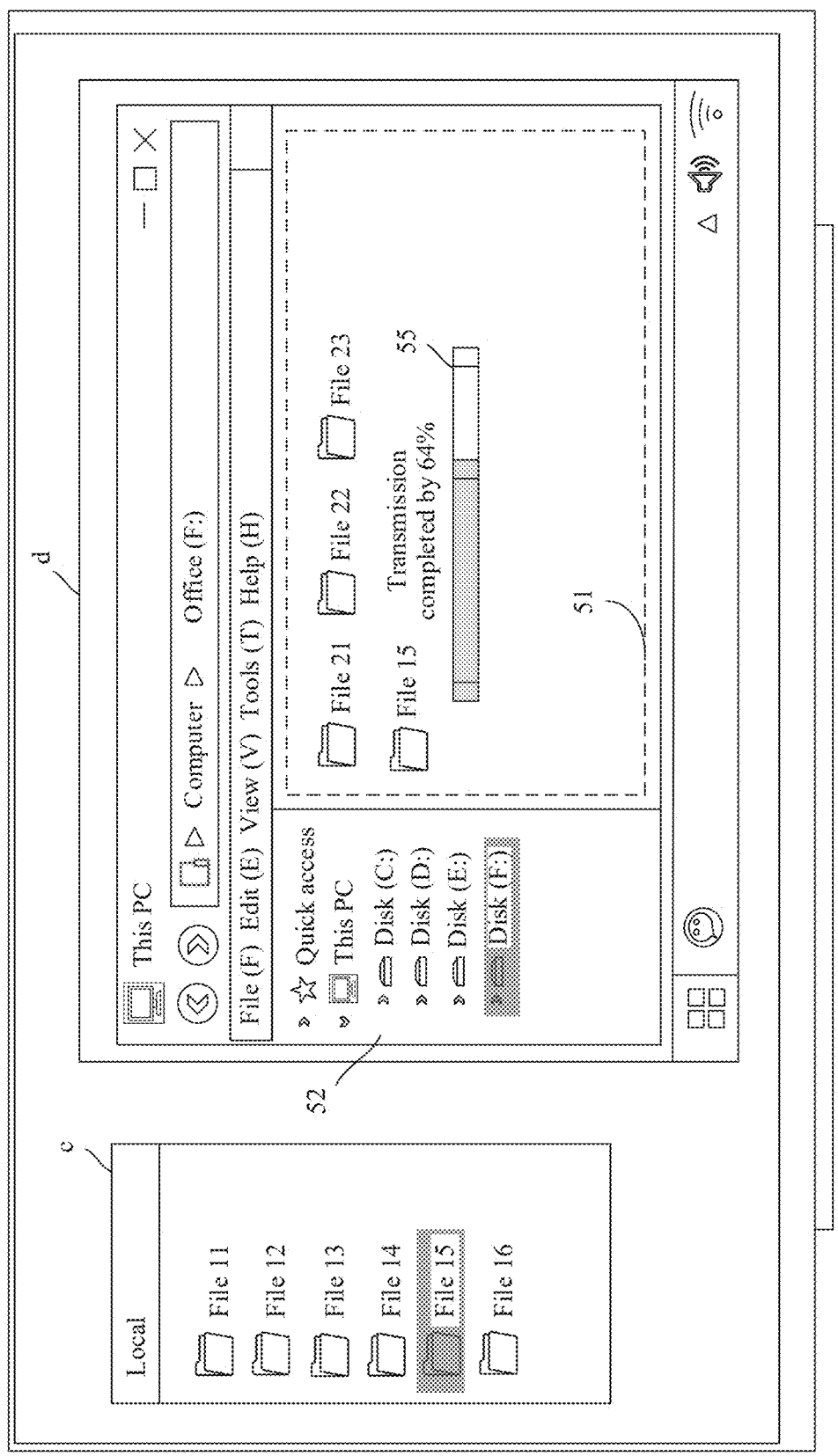

PROJECTED INTERFACES OF ELECTRONIC DEVICES

CROSS-REFERENCE TO RELATED APPLICATIONS

This application is a national stage U.S. National Stage of International Patent Application No. PCT/CN2021/109972 filed on Aug. 2, 2021, which claims priority to Chinese Patent Application No. 202010803731.5 filed on Aug. 11, 2020. The disclosures of the aforementioned applications are hereby incorporated by reference in their entireties.

TECHNICAL FIELD

This application relates to the field of electronic technologies, and in particular, to a data transmission method and a device.

BACKGROUND

With the development of terminal technologies, more devices support a projection function. In a projection scenario, one or more terminals may project a user interface onto another device. A device that projects a user interface may be referred to as a source device, and a device that receives a projected user interface may be referred to as a destination device.

In a projection example, a mobile phone and a notebook computer are used as source devices and project user interfaces onto a television. A television display provides two windows. One window displays a user interface projected by the mobile phone, and the other window displays a user interface projected by the notebook computer. In this scenario, sometimes data in the user interface of the mobile phone needs to be transmitted to the notebook computer, or sometimes data in the user interface of the notebook computer needs to be transmitted to the mobile phone. Because the television is only a display device of the user interfaces projected by the mobile phone and the notebook computer, it is difficult to implement data transmission between the mobile phone and the notebook computer by performing an operation on the television.

SUMMARY

This application provides a data transmission method and a device, to implement data transmission between source devices by performing an operation on a destination device.

According to a first aspect, an embodiment of this application provides a data transmission method. The method is applied to a first electronic device, and includes: displaying a first window and a second window, where the first window is used to display a projected interface of a second electronic device, and the second window is used to display a projected interface of a third electronic device; detecting a first input instruction that acts on first information in the first window: sending a second input instruction to the second electronic device based on the first input instruction, where the second input instruction is used to determine the first information: receiving first transmission information that is sent by the second electronic device and that is about the first information; detecting a third input instruction acting on the second window; and sending, to the third electronic device based on the third input instruction, second transmission information generated based on the first transmission information.

Embodiments of this application are applied to a projection scenario. The second electronic device and the third electronic device send the projected interfaces to the first electronic device. The projected interfaces may be user interfaces (user interface, UI) projected by the second electronic device and the third electronic device onto the first electronic device. In some embodiments, the second electronic device and/or the third electronic device each project/projects, onto the first electronic device, a user interface of an application displayed on a display. In some embodiments, the second electronic device and/or the third electronic device may also project, onto the electronic device, a user interface of an application running in a background. Optionally, the first third electronic device and/or the second electronic device may record a user interface that needs to be projected, and send the recorded user interface as a projected interface to the first electronic device.

The user interface is a medium interface for interaction and information exchange between an application or an operating system and a user, and implements conversion between an internal form of information and a form that can be accepted by the user. A user interface of an application is source code written in a specific computer language, for example, Java or an extensible markup language (extensible markup language, XML). Interface source code is parsed and rendered on an electronic device, and is finally presented as content that can be identified by the user, for example, a control such as an image, a text, or a button. A control (control) is a basic element of a user interface. Typical controls include a button (button), a widget (widget), a toolbar (toolbar), a menu bar (menu bar), a text box (text box), a scrollbar (scrollbar), an image, and a text. The user interface is usually represented in a form of a graphical user interface (graphic user interface. GUI), which is a user interface that is related to a computer operation and that is displayed in a graphic manner.

A window is a basic unit that is set by an application in a graphical user interface to use data. The application and data are integrated in the window. The user can operate the application in the window to manage, generate, and edit the data.

In this embodiment of this application, the first electronic device receives the projected interfaces of the second electronic device and the third electronic device. The first electronic device displays two windows. The first electronic device displays the projected interfaces of the second electronic device and the third electronic device by using the two windows.

In this embodiment of this application, the first electronic device detects an input instruction that acts on the first window or the second window. In some embodiments, the first electronic device detects the first input instruction that acts on the first information in the first window. The first information may be data in a user interface displayed in the first window. The first information may be a file, a text, a table, an image, or the like. In some embodiments, the first electronic device may convert the first input instruction into the second input instruction based on a coordinate conversion relationship between the first window and the display of the second electronic device. In some embodiments, the first electronic device may convert the first input instruction into an instruction that can be identified by the second electronic device. The first electronic device sends the second input instruction to the second electronic device. The second electronic device determines the first information based on the second input instruction. The second electronic device provides the first transmission information about the first information for the first electronic device. If the first electronic device detects the third input instruction acting on the second window, the first electronic device sends the second transmission information determined based on the first transmission information to the third electronic device. The third electronic device obtains the first information from the first electronic device based on the second transmission information.

In this embodiment of this application, data transmission between the first electronic device and the second electronic device is implemented by triggering the input instruction on the first electronic device.

With reference to the first aspect, in some implementations of the first aspect, the second electronic device and the third electronic device are a same electronic device, and projected interfaces of different applications are displayed in the first window and the second window.

In this embodiment of this application, different applications of a same electronic device may be projected onto the first electronic device. Data transmission between different applications of a same electronic device may be implemented by performing an operation on the first electronic device.

With reference to the first aspect, in some implementations of the first aspect, the first input instruction includes a long press instruction triggered by a long press gesture, and the third input instruction includes a drag instruction triggered by a drag gesture and a release instruction triggered by a release gesture: or the first input instruction includes a first instruction triggered by a tap operation acting on the first information, and the third input instruction includes a second instruction triggered by a drag operation and a third instruction triggered by a release operation.

In this embodiment of this application, data transmission between the second electronic device and the third electronic device may be triggered in different manners. In some embodiments. data transmission between the second electronic device and the third electronic device may be triggered by using a gesture operation on the first electronic device. The gesture operation may be a long press-drag-release gesture. In some embodiments, the gesture operation may be a tap-drag-release gesture. Certainly, the gesture operation may alternatively be other possible gestures, which are not listed one by one herein. In some embodiments, data transmission between the second electronic device and the third electronic device may alternatively be triggered by using an input device. The input device may be, for example, a mouse, a keyboard, a laser pen, or an electronic pen.

With reference to the first aspect, in some implementations of the first aspect, both the first transmission information and the second transmission information include an access address of the first information. The first information may be obtained from the second electronic device by using the access address of the first information. In some embodiments, both the first transmission information and the second transmission information may include a device identifier and/or an application identifier providing the first information. In some embodiments, the first transmission information and the second transmission information may include a storage location of the first information, and the like. In some embodiments, the access address of the first information is a uniform resource locator (Uniform Resource Locator. URL).

With reference to the first aspect, in some implementations of the first aspect, the first transmission information and the second transmission information further include first verification information, and the first verification information is used by the second electronic device to perform security verification on the third electronic device. In some embodiments, the first verification information may be a verification password. In some embodiments, the first verification information may be a key factor. When requesting the first information from the second electronic device, the third electronic device may send the verification password to the second electronic device. Alternatively, the third electronic device may generate verification data based on the key factor, and send the verification data to the second electronic device. The second electronic device performs security verification on the third electronic device by using the verification password or the verification data. After verification succeeds, the first information is sent to the third electronic device. In this way, validity of the third electronic device can be ensured during transmission of the first information, and security of the first information can be ensured.

With reference to the first aspect, in some implementations of the first aspect, the first transmission information further includes a thumbnail of the first information; and the method further includes: displaying the thumbnail based on coordinates of the third input instruction.

In this embodiment of this application, the second electronic device may send the thumbnail of the first information to the first electronic device. The first electronic device may display the thumbnail based on the coordinates of the third input instruction. In some embodiments, the third input instruction includes a drag instruction. The first electronic device may display the thumbnail based on coordinates of the drag instruction. A process of transmitting the first information from the second electronic device to the third electronic device may be intuitively presented by displaying the thumbnail.

With reference to the first aspect, in some implementations of the first aspect, the first transmission information further includes description information of the first information; and the method further includes: generating a thumbnail of the first information based on the description information; and displaying the thumbnail based on coordinates of the third input instruction.

In this embodiment of this application, the second electronic device may send the description information of the first information to the first electronic device. The first electronic device may determine a name, a type, a data size, and the like of the first information based on the description information. In some embodiments, the first electronic device may generate the thumbnail of the first information based on the description information. The first electronic device may present, by using the thumbnail, a process of transmitting the first information from the second electronic device to the third electronic device. In some embodiments, the first electronic device may include the description information of the first information in the second transmission information, and send the second transmission information to the third electronic device. The third electronic device may determine a name, a type, a data size, and the like of the first information based on the description information of the first information. In some embodiments, the third electronic device may determine, based on the description information of the first information, whether receiving of the first information is supported, and the like.

With reference to the first aspect, in some implementations of the first aspect, the method further includes: sending input location information determined based on the third input instruction to the third electronic device. The third electronic device may determine, based on the input location information, a third application that receives the first information and a location at which the third application displays the first information.

According to a second aspect, an embodiment of this application provides a data transmission method. The method is applied to a second electronic device, and includes: sending a projected interface to a first electronic device; receiving a second input instruction sent by the first electronic device: determining first information from the projected interface based on the second input instruction: sending first transmission information about the first information to the first electronic device: receiving request information that is sent by a third electronic device and that is used to obtain the first information; and sending the first information to the third electronic device based on the request information.

In this embodiment of this application, the second electronic device sends the projected interface to the first electronic device. The second electronic device determines the first information based on an input instruction sent by the first electronic device, and sends the first transmission information about the first information to the first electronic device. When the second electronic device receives the request information of the third electronic device, the second electronic device sends the first information to the third electronic device. That is, the second electronic device implements data transmission between the second electronic device and the third electronic device through control of the first electronic device.

With reference to the second aspect, in some implementations of the second aspect, the projected interface is an interface of an application running in a background.

With reference to the second aspect, in some implementations of the second aspect, the determining first information from the projected interface based on the second input instruction includes: determining application information included in the projected interface; and determining. based on the application information and the second input instruction, the first information from an application displayed in the projected interface.

With reference to the second aspect, in some implementations of the second aspect, the projected interface includes an interface of a first application and an interface of a second application that are displayed in a split-screen mode; and the determining the first information from an application displayed in the projected interface includes: determining the first information from the first application or the second application.

With reference to the second aspect, in some implementations of the second aspect, the first transmission information includes an access address of the first information: the request information includes the access address of the first information; and before the sending the first information to the third electronic device, the method further includes: determining the first information based on the access address included in the request information.

With reference to the second aspect, in some implementations of the second aspect, the first transmission information further includes first verification information; the request information includes the first verification information or includes second verification information generated based on the first verification information; and the method further includes: performing verification on the third electronic device based on the first verification information or the second verification information before sending the first information to the third electronic device.

In this embodiment of this application, before sending the first information to the third electronic device, the second electronic device verifies the third electronic device based on the first verification information or the second verification information, to ensure validity of an identity of the third electronic device and ensure security of the first information.

With reference to the second aspect, in some implementations of the second aspect, the first transmission information further includes a thumbnail of the first information.

With reference to the second aspect, in some implementations of the second aspect, the first transmission information further includes description information of the first information.

With reference to the second aspect, in some implementations of the second aspect, the second electronic device and the third electronic device are a same electronic device: the request information includes second transmission information and input location information that are sent by the first electronic device, where the second transmission information includes an access address of the first information; and the sending the first information to the third electronic device based on the request information includes: determining, based on the access address, that the first application in the second electronic device provides the first information; determining, based on the input location information, that the second application in the second electronic device receives the first information; and providing the first information for the second application, and displaying the first information in the second application.

With reference to the second aspect, in some implementations of the second aspect, the displaying the first information in the second application includes: determining whether an input location indicated by the input location information is in an information receiving area of the second application; and if the input location is in the information receiving area of the second application, displaying the first information in the information receiving area, or inputting the first information into the information receiving area and displaying the first information in a display area of the second application; or if the input location is not in the information receiving area of the second application, displaying a prohibition identifier indicating that the first information cannot be received.

With reference to the second aspect, in some implementations of the second aspect, after the sending the first information to the third electronic device, the method further includes: deleting the first information from an application that provides the first information.

In this embodiment of this application, after the second electronic device sends the first information to the third electronic device, the second electronic device may delete the first information from the second electronic device, to implement an effect of moving the first information from the second electronic device to the third electronic device.

According to a third aspect, an embodiment of this application provides a data transmission method. The method is applied to a third electronic device, and includes: sending a projected interface to a first electronic device: receiving second transmission information sent by the first electronic device: sending, to a second electronic device based on the second transmission information, request information used to obtain first information: receiving the first information sent by the second electronic device based on the request information; and displaying the first information in the projected interface.

In this embodiment of this application, the third electronic device sends the projected interface to the first electronic device. The third electronic device receives the second transmission information sent by the first electronic device. The third electronic device obtains the first information from the second electronic device based on the second transmission information, and displays the first information in the projected interface. In a projection scenario, the third electronic device implements data transmission with the second electronic device through control of the first electronic device.

With reference to the third aspect, in some implementations of the third aspect, the projected interface is an interface of an application running in a background. In this embodiment of this application, the third electronic device may project, onto the first electronic device, the interface of the application running in the background. Through control of the first electronic device, data from the second electronic device may be provided for the application running in the background.

With reference to the third aspect, in some implementations of the third aspect, the second transmission information includes an access address of the first information; and the sending, to a second electronic device, request information used to obtain first information includes: sending the request information to the second electronic device based on the access address.

With reference to the third aspect, in some implementations of the third aspect, the second transmission information further includes first verification information, and the request information includes the first verification information or includes second verification information generated based on the first verification information. In this embodiment of this application, the request information sent by the third electronic device to the second electronic device includes verification information. Optionally, the verification information may be the first verification information or the second verification information generated based on the first verification information. The second electronic device may verify the third electronic device based on the first verification information or the second verification information, to ensure validity of an identity of the third electronic device and ensure security of the first information.

With reference to the third aspect, in some implementations of the third aspect, the method further includes: receiving input location information sent by the first electronic device; and the displaying the first information in the projected interface includes: determining, based on the input location information, a third application for displaying the first information; and displaying the first information in the third application.

With reference to the third aspect, in some implementations of the third aspect, the determining, based on the input location information, a third application for displaying the first information includes: determining application information included in the projected interface; and determining, based on the application information and the input location information, the third application from an application displayed in the projected interface.

With reference to the third aspect, in some implementations of the third aspect, the displaying the first information in the third application includes: determining whether an input location indicated by the input location information is in an information receiving area of the third application; and if the input location is in the information receiving area of the third application, displaying the first information in the information receiving area, or inputting the first information into the information receiving area and displaying the first information in a display area of the third application: or if the input location is not in the information receiving area of the third application, displaying a prohibition identifier indicating that the first information cannot be received.

With reference to the third aspect, in some implementations of the third aspect, the first information includes first format information.

The displaying the first information in the projected interface includes: displaying the first information based on the first format information and/or second format information that is set by the third electronic device.

With reference to the third aspect, in some implementations of the third aspect, the first information includes a plurality of segments of texts; and the displaying the first information in the projected interface includes: stitching the plurality of segments of texts into one segment of text and displaying the segment of text in the projected interface.

With reference to the third aspect, in some implementations of the third aspect, the method further includes: receiving, within a preset time period after the second transmission information is received, third transmission information sent by the first electronic device, where the third transmission information includes an access address of second information; sending, to a fourth electronic device based on the access address of the second information. request information used to obtain the second information; receiving the second information sent by the fourth electronic device; and displaying the first information and the second information in a projected interface of a same application.

In this embodiment of this application, the first electronic device may provide a third window. The third window displays a projected interface of the fourth electronic device. In some embodiments, a selection operation may be performed on the first information in the first window and the second information in the third window approximately at the same time. The first electronic device obtains transmission information of the second information from the fourth electronic device. The first electronic device sends the obtained transmission information of the second information to the second electronic device as the third transmission information. The second electronic device obtains the second information from the fourth electronic device. The second electronic device displays the first information and the second information in a projected interface of a same application. That is, in this embodiment of this application, data of a plurality of electronic devices may be transmitted to a same electronic device approximately at the same time and displayed in a projected interface of the electronic device.

According to a fourth aspect, an embodiment of this application provides an electronic device. The electronic device includes one or more processors, a memory, and a display, where the memory is coupled to the one or more processors, the memory is configured to store program code, and the one or more processors invoke the program code. so that the electronic device performs the method according to any one of the first aspect or the possible implementations of the first aspect.

According to a fifth aspect, an embodiment of this application provides an electronic device. The electronic device includes one or more processors, a memory, and a display, where the memory is coupled to the one or more processors, the memory is configured to store program code. and the one or more processors invoke the program code, so that the electronic device performs the method according to any one of the second aspect or the possible implementations of the second aspect.

According to a sixth aspect, an embodiment of this application provides an electronic device. The electronic device includes one or more processors, a memory, and a display, where the memory is coupled to the one or more processors, the memory is configured to store program code, and the one or more processors invoke the program code, so that the electronic device performs the method according to any one of the third aspect or the possible implementations of the third aspect.

According to a seventh aspect, an embodiment of this application provides a chip. The chip includes a processor and a data interface. The processor reads, through the data interface.

instructions stored in a memory, to perform the method according to any one of the first aspect to third aspect or the possible implementations of the first aspect to third aspect.

Optionally, in an implementation, the chip may further include the memory. The memory stores instructions. The processor is configured to execute the instructions stored in the memory. When the instructions are executed, the processor is configured to perform the method according to any one of the first aspect to third aspect or the possible implementations of the first aspect to third aspect.

According to an eighth aspect, this technical solution provides a computer-readable storage medium. The computer-readable medium stores program code to be executed by a device, and the program code includes instructions used to perform the method according to any one of the first aspect to third aspect or the possible implementations of the first aspect to third aspect

DESCRIPTION OF EMBODIMENTS

The following describes technical solutions of this application with reference to accompanying drawings.

Figure 1A:
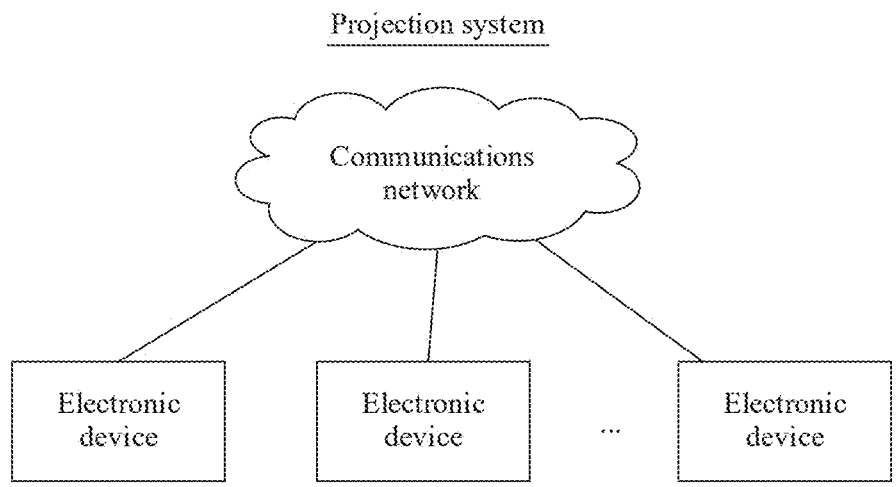
FIG. 1A is a schematic diagram of a projection system according to an embodiment of this application.
Figures 1, 6A:
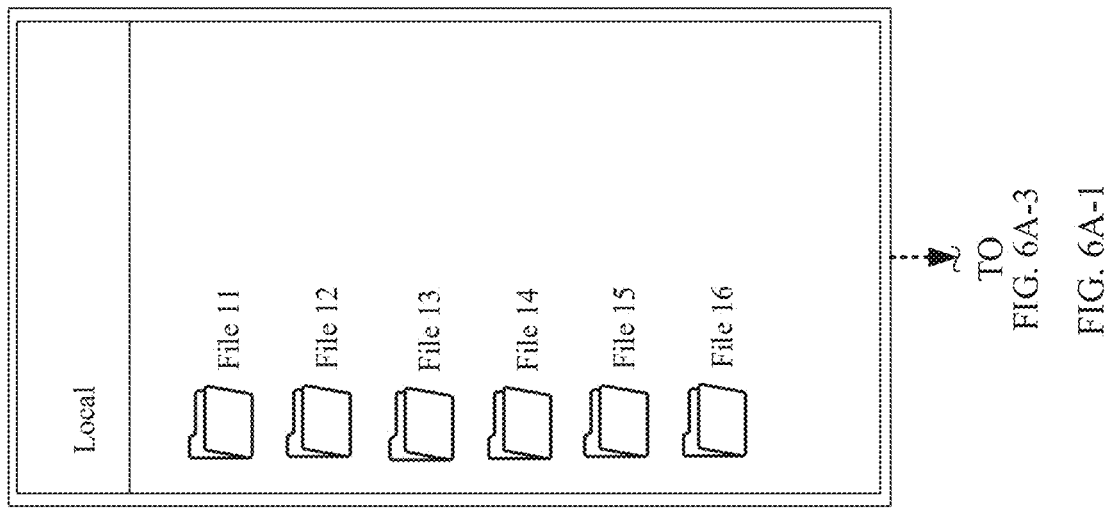
FIG. 6A-1 to FIG. 6A-3 to FIG. 6D-1 to FIG. 6D-3 are schematic diagrams of data transmission in a projection scenario 3 according to an embodiment of this application.

FIG. 1A is a schematic diagram of a projection system according to an embodiment of this application. As shown in FIG. 1, the system includes a plurality of electronic devices. The plurality of electronic devices may be interconnected through a communications network. For example, the communications network may be a wired network, or may be a wireless network. For example, the communications network may be a local area network (Local Area Networks, LAN) or a wide area network (Wide Area Networks, WAN). The communications network may be implemented by using any known network communications protocol, and the communications network protocol may be various wired or wireless communications protocols.

In the system shown in FIG. 1A, one or more of the plurality of electronic devices may project, onto another electronic device, a user interface that is currently displayed on a display or a user interface of an application running in a background. For ease of description, an electronic device that projects a user interface is referred to as a source device, and an electronic device that receives a user interface projected by a source device is referred to as a destination device.

For example, the source device may be a mobile terminal, a wearable device, a tablet computer, or the like. Optionally, the source device may be equipped with an operating system such as Android, IOS, Windows Phone, Linux, or Windows. The destination device may be a tablet computer, a personal computer, a palmtop computer, a projector, a television, an electronic whiteboard, or the like. Optionally, the destination device may be equipped with an operating system such as Android. IOS, Windows Phone. Windows, or Linux. In this embodiment of this application, there may be one or more source devices. When there are a plurality of source devices. operating systems of the plurality of source devices may be the same or may be different operating systems. Further, operating systems of the destination device and the source device may be the same, or may be different.

In embodiments of this application, the source device and the destination device may establish a connection by using a near field discovery technology such as Bluetooth (Bluetooth, BT), a wireless local area network (wireless local area networks, WLAN) (for example, a wireless fidelity (wireless fidelity, Wi-Fi) network), or near field communication (near field communication, NFC). After the connection is established between the source device and the destination device, data transmission may be performed by using technologies such as BT, Wi-Fi, and NFC. It should be noted that a technology for establishing the connection between the source device and the destination device may be the same as or may be different from a technology used for data transmission. For example, the source device and the destination device may establish a connection relationship by using a Bluetooth technology. Then, the source device and the destination device may transmit data by using a Wi-Fi technology. Certainly, the source device and the destination device may alternatively be connected in a wired manner, and transmit data based on a wired communications protocol after being connected in the wired manner.

Figure 1B:
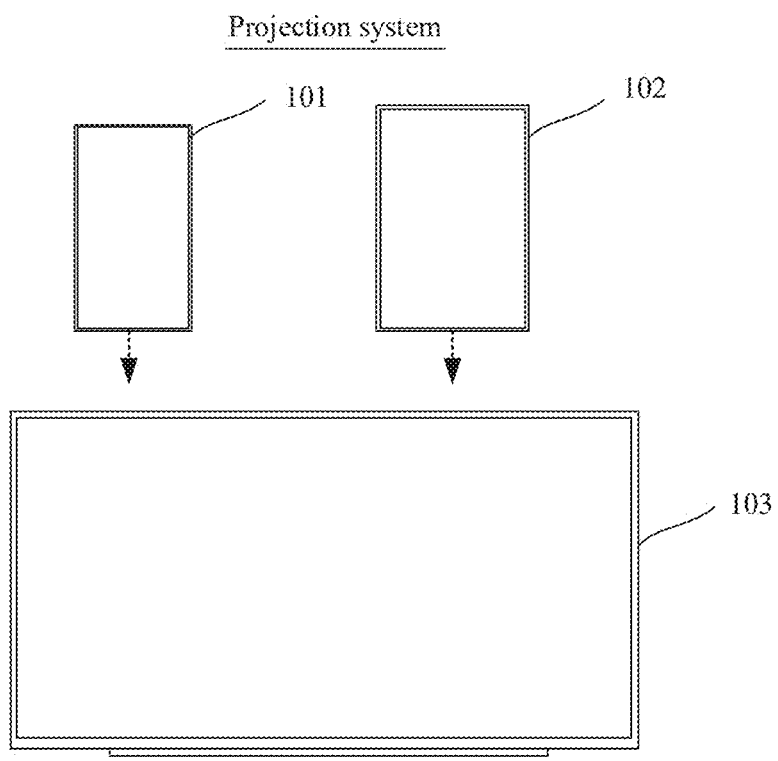
FIG. 1B is a schematic diagram of another projection system according to an embodiment of this application.

FIG. 1B is a schematic diagram of another projection system according to an embodiment of this application. As shown in FIG. 1B, the projection system includes an electronic device 101, an electronic device 102, and an electronic device 103. The electronic device 101 and the electronic device 102 are used as source devices and project user interfaces onto the electronic device 103. The electronic device 103 serves as a destination device and provides at least two windows. In the at least two windows, one part of the windows is used to display a user interface projected by the electronic device 101, and the other part of the windows is used to display a user interface projected by the electronic device 102. A user interface projected by an electronic device is also referred to as a projected interface. In an example, the electronic device 103 provides a first window and a second window. The first window displays a projected interface of the electronic device 101. The second window displays a projected interface of the electronic device 102. In another example, the electronic device 103 provides three windows. Two of the three windows display a projected interface of the electronic device 101, and the other window displays a projected interface of the electronic device 102. For example, the electronic device 101 displays a user interface of a first application and a user interface of a second application in a split-screen mode. The first application and the second application are different applications. After projection, two windows of the electronic device 103 respectively display a projected interface of the first application and a projected interface of the second application. It should be noted that projected interfaces sent by the electronic device 101 and the electronic device 102 to the electronic device 103 may be interfaces of applications running in foregrounds of the electronic device 101 and the electronic device 102, or may be interfaces of applications running in backgrounds of the electronic device 101 and the electronic device 102. For example, the electronic device 101 and the electronic device 102 support a plurality of operation modes. The electronic device 101 and the electronic device 102 each may project, onto the electronic device 103, a user interface of an application opened in a first working mode. Then, the electronic device 101 and the electronic device 102 may switch to a second working mode. The electronic device 101 and the electronic device 102 each display a user interface of another application in the second working mode. That is, projected interfaces projected by the electronic device 101 and the electronic device 102 onto the electronic device 103 may not be user interfaces of applications that are currently displayed on displays.

In a projection scenario shown in FIG. 1B, when data in the electronic device 101 needs to be transmitted to the electronic device 102, or data in the electronic device 102 needs to be transmitted to the electronic device 101, an operation may be performed on the electronic device 103. The operation on the electronic device 103 may be an operation entered based on an input device, or may be a gesture operation performed by a user on a display of the electronic device 103.

In an example, the electronic device 103 continuously detects a gesture action of the user on the display. When the electronic device 103 detects a press action, the electronic device 103 determines a window corresponding to the press action. For example, if the electronic device 103 determines that the press action corresponds to the first window, the electronic device 103 sends a press (Press) instruction triggered by the press action and coordinates to the electronic device 101. If the user maintains the action after performing the press action on the electronic device 103, the electronic device 103 may send the press (Press) instruction and the coordinates to the electronic device 101 at a preset time interval. Alternatively, after duration of maintaining the press action meets a specific threshold, the electronic device 103 sends a long press (Long Press) instruction triggered by the press action and coordinates to the electronic device 101. In some embodiments, the electronic device 103 uses the press instruction or the long press instruction as a first input instruction. Before sending the first input instruction to the electronic device 101, the electronic device 103 converts the first input instruction into a second input instruction. Optionally, the electronic device 103 converts the first input instruction into the second input instruction based on a coordinate conversion relationship between the first window and a display of the electronic device 101. The electronic device 103 sends the second input instruction to the electronic device 101.

The electronic device 101 determines, based on the second input instruction sent by the electronic device 103, that the instruction is an instruction for triggering data sending. Then, the electronic device 101 determines first information on which the second input instruction acts. The first information may be a file, a text, an image, a chart, or the like displayed in the projected interface of the electronic device 101. In some embodiments, the electronic device 101 determines the first application based on the second input instruction. The electronic device 101 determines the first information by using the first application. That the electronic device 101 determines the first application may be: The electronic device 101 determines applications included in the projected interface sent to the electronic device 103. The electronic device 101 determines the first application from the applications included in the projected interface. The first application determines the first information in a data area of the first application based on coordinates of the second input instruction.

After determining the first information, the electronic device 101 sends first transmission information about the first information to the electronic device 103. Specifically, the first transmission information may include an access address of the first information. The first information may be obtained from the electronic device 101 based on the access address of the first information. In some embodiments, the first transmission information may further include first verification information. Security verification may be performed, based on the first verification information, on an electronic device that requests to access the first information. In some embodiments, the first transmission information may further include a thumbnail of the first information. The electronic device 101 may display the thumbnail of the first information. Optionally, the electronic device 103 may present a transmission track of the first information by presenting the thumbnail of the first information. In some embodiments, the first transmission information may further include description information of the first information. For example, the description information may be a name, a size, a type, or the like of the first information. The electronic device 103 determines the name, the type, the size, and the like of the first information based on the description information of the first information. Optionally, the electronic device 103 generates a thumbnail of the first information based on the description information, and displays the thumbnail. In an example, when the first information meets a specified requirement, the first transmission information may further include the first information. The specified requirement may be, for example, that the first information is data of a preset type, or a data size of the first information is less than a specific value.

In some embodiments, the electronic device 103 detects a drag action performed by the user on the display. The electronic device 103 obtains a drag (Drag) instruction triggered by the drag action. The electronic device 103 detects a release action, and the electronic device 103 obtains a release (Release) instruction. The electronic device 103 may determine the drag instruction and the release instruction as a third input instruction. The electronic device 103 determines, based on the third input instruction, to transmit the first information to the electronic device 102. Specifically, the electronic device 103 determines, based on coordinates of the release instruction, that the release instruction acts on the second window. The second window displays the projected interface of the electronic device 102. The electronic device 103 sends second transmission information to the electronic device 102. The second transmission information is generated based on the first transmission information. Optionally, the second transmission information includes the access address of the first information. In some embodiments, the second transmission information includes the first verification information. The first verification information is used to perform security verification on an electronic device that requests to obtain the first information. In some embodiments, the second transmission information may further include the description information of the first information. The electronic device 102 determines a name, a type, a size, or the like of to-be-obtained first information based on the description information of the first information. Optionally, the electronic device 102 may determine, based on the description information of the first information, whether the electronic device 102 supports obtaining of the first information. In some embodiments, the electronic device 103 further determines input location information based on the third input instruction. The electronic device 103 sends the input location information to the electronic device 102. In a specific implementation, the input location information is determined based on the release instruction.

The electronic device 102 determines, based on the input location information, the second application that receives the first information. Optionally, the electronic device 102 determines applications included in the projected interface sent to the electronic device 103, and the electronic device 102 determines the second application from the applications. When the projected interface sent to the electronic device 103 includes an interface of only one application, the application is an application that receives the first information. If the projected interface sent to the electronic device 103 includes interfaces of a plurality of applications, the electronic device 102 determines the second application based on the input location information. Optionally, the input location information includes the coordinates of the release instruction. The electronic device 102 determines, based on the coordinates of the release instruction, the second application on which the release instruction acts. Further, the second application determines an input location in an information receiving area of the second application based on the coordinates of the release instruction and coordinates of the information receiving area of the second application. When obtaining the first information from the electronic device 101, the electronic device 102 displays the first information based on the input location.

That the electronic device 102 obtains the first information from the electronic device 101 may be: The electronic device 102 sends request information to the electronic device 101 based on the access address of the first information. The electronic device 101 sends the first information to the electronic device 102 based on the request information. Optionally, the access address of the first information may further include a device identifier of the electronic device 101, a storage location of the first information, and the like. The device identifier and the storage location may be set in a same access link. The access link may be, for example, a URL. In some embodiments, the electronic device 102 accesses the electronic device 101 based on the URL.

In some embodiments, the request information sent by the electronic device 102 includes the first verification information or includes second verification information generated based on the first verification information. Before the electronic device 101 sends the first information to the electronic device 102, the electronic device 101 performs security verification on the electronic device 102 based on the first verification information or the second verification information. In some embodiments, the first verification information may be a verification password. In some other embodiments, the first verification information may be a first key factor. The electronic device 102 generates a verification password based on the first key factor. The electronic device 102 may send the verification password to the electronic device 101. When the verification password sent by the electronic device 102 is consistent with a password set by the electronic device 101, verification on the electronic device 102 succeeds. For another example, the first verification information is a public key of the electronic device 101. The electronic device 102 encrypts data by using the public key of the electronic device 101. The electronic device 102 sends encrypted data to the electronic device 101. If the electronic device 101 successfully decrypts the encrypted data by using a private key, verification on the electronic device 102 succeeds. After obtaining the first information, the electronic device 102 displays the first information in the second application based on the determined input location. In this way, data transmission between the electronic device 101 and the electronic device 102 is implemented by performing an operation on the electronic device 103. Certainly, the operation on the electronic device 103 may be an operation triggered by an input device such as a keyboard or a mouse.

Figure 2A:
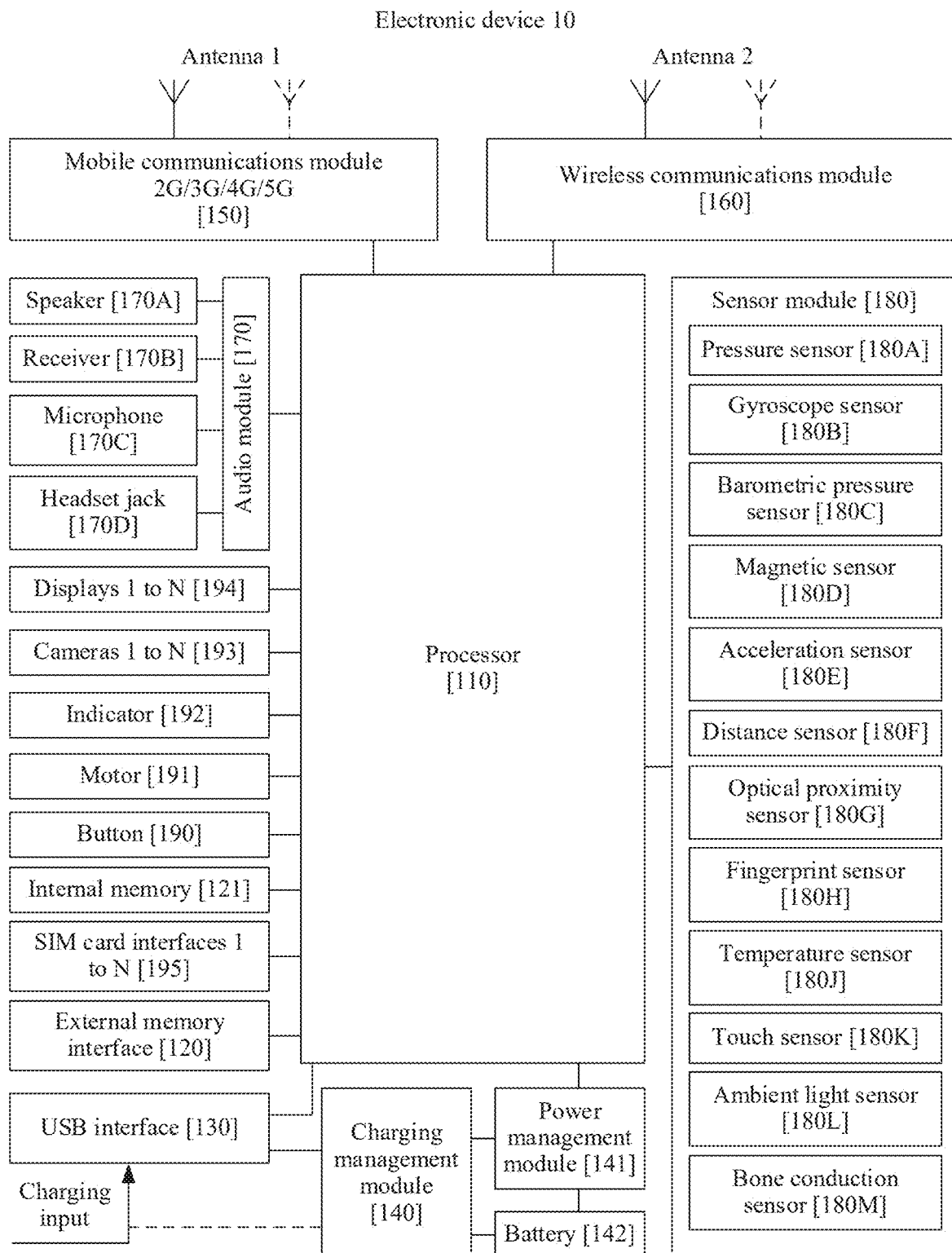
FIG. 2A is a schematic diagram of a structure of an electronic device according to an embodiment of this application.

FIG. 2A is a schematic diagram of a structure of an electronic device according to an embodiment of this application. The electronic device shown in FIG. 2A may be used as a source device (that is, the electronic device 101 or the electronic device 102) in the system shown in FIG. 1B. Certainly, the electronic device may alternatively be used as a destination device (that is, the electronic device 103) in the system shown in FIG. 1B. In this embodiment of this application, the structure of the electronic device shown in FIG. 2A is used as an example to describe structures of a source device and a destination device. As shown in FIG. 2A, an electronic device 10 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C. a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be understood that the electronic device 10 shown in FIG. 2A is merely an example, and the electronic device 10 may include more or fewer components than those shown in FIG. 1 FIG. 2A, may combine two or more components, or may have different component configurations. Various components shown in the figure may be implemented in hardware, software, or a combination of hardware and software that includes one or more signal processing and/or application-specific integrated circuits. For example, in an example, the electronic device includes the processor 110, the external memory interface 120, the internal memory 121, the universal serial bus (universal serial bus, USB) interface 130, the power management module 141, the antenna 2, the wireless communications module 160, the audio module 170, the speaker 170A, the sensor module 180, the button 190, the camera 193, the display 194, and the like.

The processor 110 may include one or more processing units. For example, the processor 110 may include an application processor (application processor. AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 10. The controller may generate an operation control signal based on an instruction operation code and a time sequence signal, to complete control of instruction fetching and instruction execution. A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation. PCM) interface, a universal asynchronous receiver/transmitter (universal asynchronous receiver/transmitter. UART) interface, a mobile industry processor interface (mobile industry processor interface. MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between modules that is shown in this embodiment of the present invention is merely an example for description, and does not constitute a limitation on the structure of the electronic device 10. In some other embodiments of this application, the electronic device 10 may alternatively use an interface connection manner different from that in the foregoing embodiment, or a combination of a plurality of interface connection manners.

A wireless communication function of the electronic device 10 may be implemented by using the antenna 1, the antenna 2, the mobile communications module 150, the wireless communications module 160, the modem processor, the baseband processor, and the like.

The wireless communications module 160 may provide a wireless communication solution that includes a wireless local area network (wireless local area networks, WLAN) (for example, a wireless fidelity (wireless fidelity. Wi-Fi) network), Bluetooth (Bluetooth, BT), a global navigation satellite system (global navigation satellite system, GNSS), frequency modulation (frequency modulation, FM), a near field communication (near field communication. NFC) technology, an infrared (infrared, IR) technology, or the like and that is applied to the electronic device 10. The wireless communications module 160 may be one or more components integrating at least one communications processor module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 10 are coupled, and the antenna 2 and the wireless communications module 160 in the electronic device 10 are coupled, so that the electronic device 10 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access. WCDMA), time-division code division multiple access (time-division code division multiple access. TD-SCDMA), long term evolution (long term evolution, LTE), BT, a GNSS, a WLAN, NFC, FM, an IR technology, and/or the like.

The electronic device 10 implements a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diodes. QLED), or the like. In some embodiments, the electronic device 10 may include one or N displays 194, where N is a positive integer greater than 1.

The electronic device 10 may implement an image shooting function by using the ISP, the camera 193, the video codec, the GPU, the display 194, the application processor, and the like.

The external memory interface 120 may be configured to connect to an external memory card, for example, a micro SD card, to extend a storage capability of the electronic device 10. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121 to perform various function applications of the electronic device 10 and process data. The internal memory 121 may include a program storage area and a data storage area. The program storage area may store an operating system, an application required by at least one function (for example, a voice playing function or an image playing function), and the like. The data storage area may store data (such as audio data and a phone book) and the like that are created during use of the electronic device 10. In addition, the internal memory 121 may include a high-speed random access memory, or may include a nonvolatile memory, for example, at least one magnetic disk storage device, a flash memory, or a universal flash storage (universal flash storage, UFS).

The electronic device 10 may implement an audio function such as music playing or recording by using the audio module 170, the speaker 170A, the receiver 170B, the microphone 170C, the headset jack 170D, the application processor, and the like.

The touch sensor 180K is also referred to as a touch panel. The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of a touch event. For example, the touch event type may be a tap event, a double-tap event, a long press event, a press (press) event, a drag event, or the like A visual output related to the touch operation may be provided through the display 194. In some other embodiments, the touch sensor 180K may alternatively be disposed on a surface of the electronic device 10 at a location different from a location of the display 194

It may be understood that the structure shown in FIG. 2A does not constitute any specific limitation on the electronic device. In some other embodiments of this application, the electronic device may include more or fewer components than those shown in the figure, or combine some components, or split some components, or have a different component arrangement. The components shown in the figure may be implemented by hardware, software, or a combination of software and hardware.

In embodiments of this application, a software system of each of the source device and the destination device may use a layered architecture, an event-driven architecture, a micro kernel architecture, a micro service architecture, or a cloud architecture. In embodiments of this application, an Android system with a layered architecture is used as an example to describe a software structure of the source device. A Windows system is used as an example to describe a software structure of the destination device.

Figure 2B:
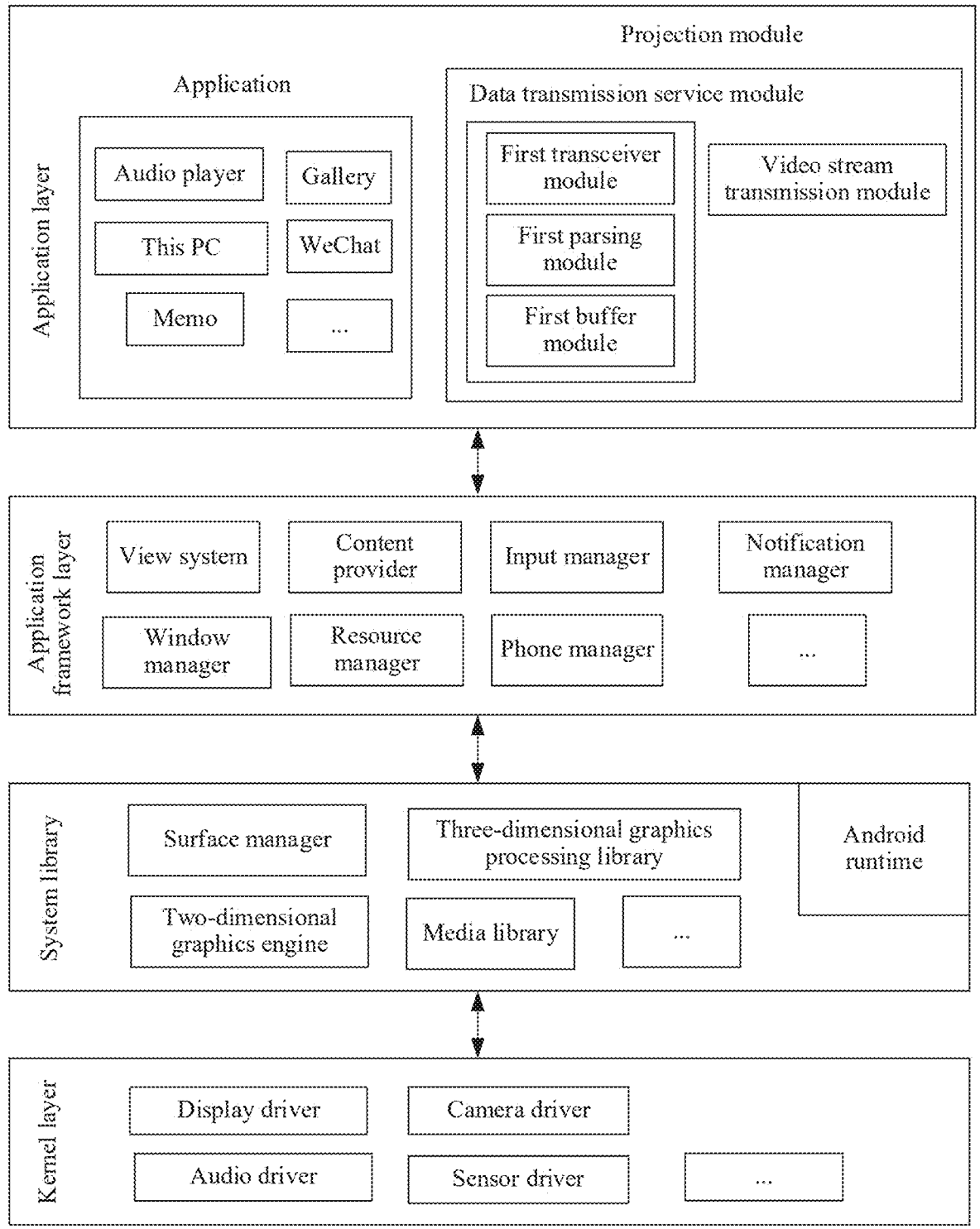
FIG. 2B is a block diagram of a software structure of an electronic device according to an embodiment of this application.

FIG. 2B is a block diagram of a software structure of an electronic device according to an embodiment of this application. The electronic device may be used as a source device in a projection system. As shown in FIG. 2B. software is divided into several layers by using a layered architecture, and each layer has a clear role and task. The layers communicate with each other through a software interface. In some embodiments, an Android system is divided into four layers: an application layer, an application framework layer, an Android runtime (Android runtime) and system library, and a kernel layer, from top to bottom.

The application layer may include one or more applications and a projection module.

FIG. 2B shows an example of applications such as an audio player, WeChat, Gallery. This PC, and Memo.

The projection module may be a service or a function provided by the source device. The projection module may provide the source device with a function of performing data transmission with a destination device in a projection scenario, to implement projection. The projection module may include a video stream transmission module and a data transmission service module.

The video stream transmission module may be configured to: obtain projection data of the source device, and send the projection data to the destination device, to implement projection on the destination device.

The data transmission service module may be configured to implement a data transmission method in embodiments of this application. The data transmission service module may specifically include a first transceiver module, a first parsing module, and a buffer module.

The first transceiver module may be configured to receive a message from the destination device or another source device, and may send a message to the destination device or another source device. For example, the first transceiver module may receive an input instruction sent by the destination device. For another example, the first transceiver module may send first information or first transmission information about the first information to the destination device or another source device. The first transmission information may be, for example, a data type, a name, a size, an access path, and the like of the first information. Specifically, the first transceiver module may further be divided into different units based on types of received and sent data. For example, the first transceiver module may include a message transceiver unit and a file transceiver unit. The file transceiver unit is configured to receive and send files in a preset format. The message transceiver unit is configured to receive and send other data and/or messages that are not in the preset format. Certainly, the first transceiver module may be alternatively divided into units according to another rule. Division forms of the first transceiver module are not listed one by one in this embodiment of this application.

The first parsing module may be configured to parse a message received by the first transceiver module and make a response based on a parsing result. For example, the first parsing module determines, based on parsing of the input instruction, whether the input instruction is an instruction for triggering data sending or data receiving. For another example, after the input instruction is an instruction for triggering data sending, the first parsing module may further determine an application that provides the first information. After determining the application that provides the first information, the first parsing module may determine the first information by using the application. Specifically, the first information and the first transmission information about the first information may be sent to another device by using the first transceiver module. For another example, after the input instruction is an instruction for triggering data receiving, the first parsing module may further determine an application for displaying the first information. In addition, the first information may be displayed by using the determined application.

Before the first information and/or the first transmission information are/is sent to another device, the first parsing module may buffer the first information and/or the first transmission information in the first buffer module.

The application framework layer provides an application programming interface (application programming interface, API) and a programming framework for an application at the application layer. The application framework layer includes some predefined functions. As shown in FIG. 2B, the application framework layer may include a multi-screen framework, a window manager, a content provider, a view system, a phone manager, an input manager, a notification manager, and the like.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer are run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The kernel layer is a layer between hardware and software. The kernel layer includes at least a display driver, a camera driver, an audio driver, and a sensor driver.

The data transmission method in embodiments of this application relates to applications (such as Word and WeChat) of the software system shown in FIG. 2B, a projection module, a WLAN service and a Bluetooth service provided by the application framework layer, a WLAN capability, a Bluetooth capability, and a basic communications protocol that are provided by a kernel and a bottom layer, and the like. It should be noted that the software architecture of the electronic device shown in FIG. 2B is merely an implementation of embodiments of this application During actual application, the electronic device may alternatively include more or fewer software modules. This is not limited herein.

In this embodiment of this application, based on the software structure shown in FIG. 2B, the electronic device may further include a display module. The display module is configured to display a corresponding user interface based on running of each software module. For user interfaces displayed by the display module, refer to user interfaces of a source device shown in FIG. 3A, FIG. 3C to FIG. 6A-1 to FIG. 6A-3, and FIG. 6C-1 to FIG. 6C-3 to FIG. 11D. The display module may be specifically implemented as the display 194 in FIG. 2A.

Figure 2C:
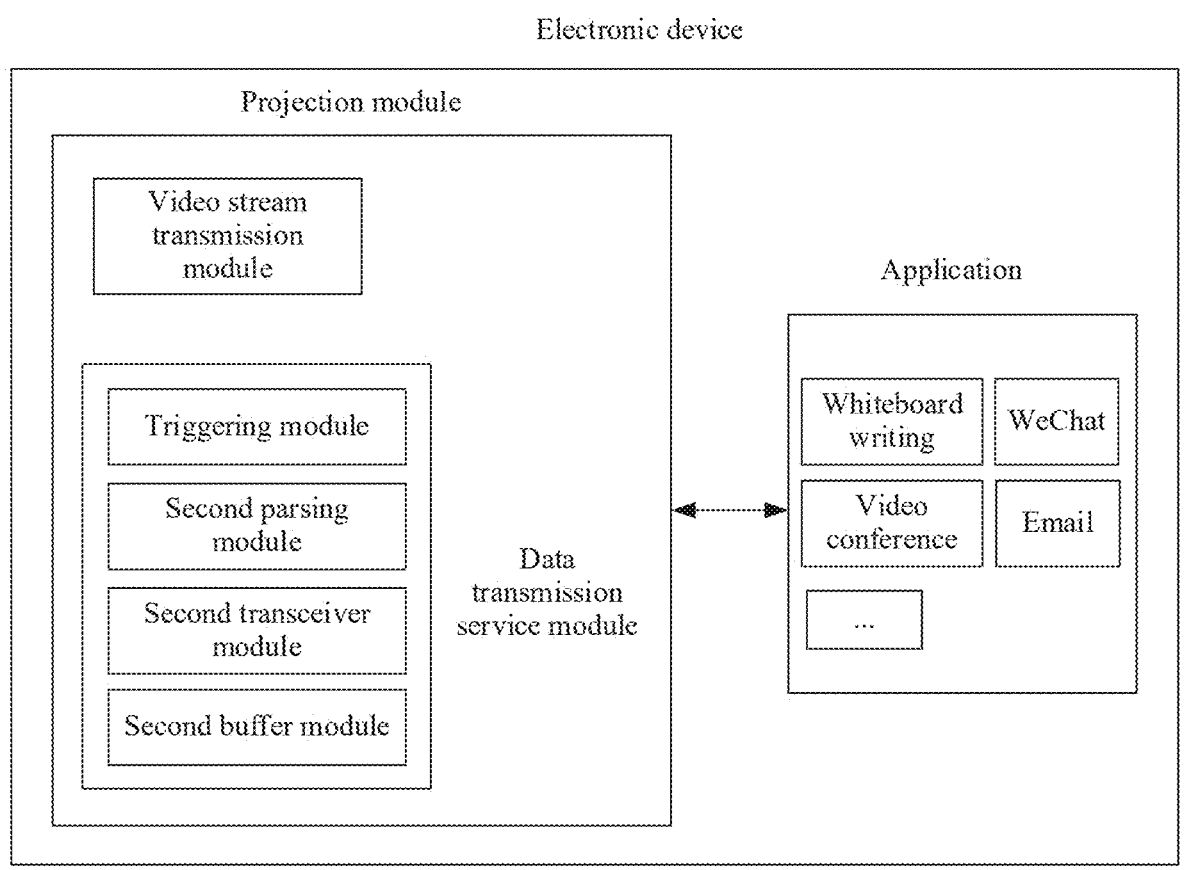
FIG. 2C is a block diagram of a software structure of another electronic device according to an embodiment of this application.

FIG. 2C is a block diagram of a software structure of another electronic device according to an embodiment of this application. The electronic device may be used as a destination device in a projection system. As shown in FIG. 2C, in a scenario in which a source device projects a user interface onto the destination device, the destination device may implement, based on a data transmission service module, the data transmission method provided in embodiments of this application.

As shown in FIG. 2C, the destination device may include one or more applications and a projection module.

FIG. 2C shows an example of applications such as Whiteboard writing, Video conference, WeChat, and Email. Certainly, there may also be applications such as PowerPoint and Word, which are not listed one by one herein.

The projection module may be a service or a function provided by the destination device. The projection module may provide a projection function for the destination device, and provide a function of performing data transmission with the source device for the destination device in a projection scenario. The projection module may include a video stream transmission module and a data transmission service module.

The video stream transmission module may be configured to receive a user interface projected by the source device, and send the user interface to a display for display, to implement the projection function.

The data transmission service module may include a triggering module, a second parsing module, a second transceiver module, and a second buffer module.

The triggering module may be configured to monitor an input operation received on the destination device. The input operation may be a gesture action of a user, or may be an operation entered by an input device. The input device may be, for example, a keyboard or a mouse.

The triggering module may further be configured to convert the received input operation into a corresponding input instruction and determine coordinates of the input instruction. The triggering module sends the input instruction and the coordinates to the second parsing module.

The second parsing module may determine, based on the input instruction, whether the instruction is an instruction for triggering data sending, or determine whether the instruction is an instruction for triggering data receiving. Further, the second parsing module may further determine, based on the coordinates of the input instruction, a window on which the input instruction acts. The second parsing module determines, based on the window on which the input instruction acts. a device that provides first information or a device for receiving first information. The second parsing module may further convert the input instruction. The second parsing module sends a converted input instruction to the second transceiver module, to send the input instruction to a corresponding device by using the second transceiver module.

The second transceiver module may be configured to send a message to the source device. For example, the converted input instruction is sent to a corresponding source device according to an indication of the second parsing module. The second transceiver module may be further configured to receive a message sent by the source device. The message sent by the source device may be, for example, first transmission information about the first information. The second transceiver module may further generate second transmission information by using the second parsing module. The second transceiver module sends the second transmission information to another source device according to an indication of the second parsing module. A source device that receives the second transmission information obtains the first information.

The second buffer module may be configured to buffer a message received by the second transceiver module.

The software system shown in FIG. 2C relates to a projection module that provides a projection function and a data transmission function. It should be noted that the software architecture of the electronic device shown in FIG. 2C is merely an implementation of embodiments of this application. During actual application, the electronic device may alternatively include more or fewer software modules. This is not limited herein.

In this embodiment of this application, the destination device may further include a display module. The display module is configured to display corresponding interface content based on running of each software module. For the interface content displayed by the display module, refer to user interfaces of a destination device shown in FIG. 3A, FIG. 3C to FIG. 6A-I to FIG. 6A-3, and FIG. 6C-1 to FIG. 6C-3 to FIG. 11D. The display module may be specifically implemented as the display 194 in FIG. 2A

The following describes in detail, based on the projection system described in the foregoing content and with reference to other accompanying drawings, the data transmission method provided in embodiments of this application. In a projection scenario, a projection system includes two source devices and one destination device. The two source devices are, for example, a smartphone and a tablet computer. The destination device is, for example, an electronic whiteboard. It should be noted that a quantity and types of source devices may be set based on a requirement. For example, there may be three or four source devices. The destination device may be a television, a notebook computer, a projector, or the like. In embodiments of this application, the electronic whiteboard is used as an example for description.

Figure 3A:
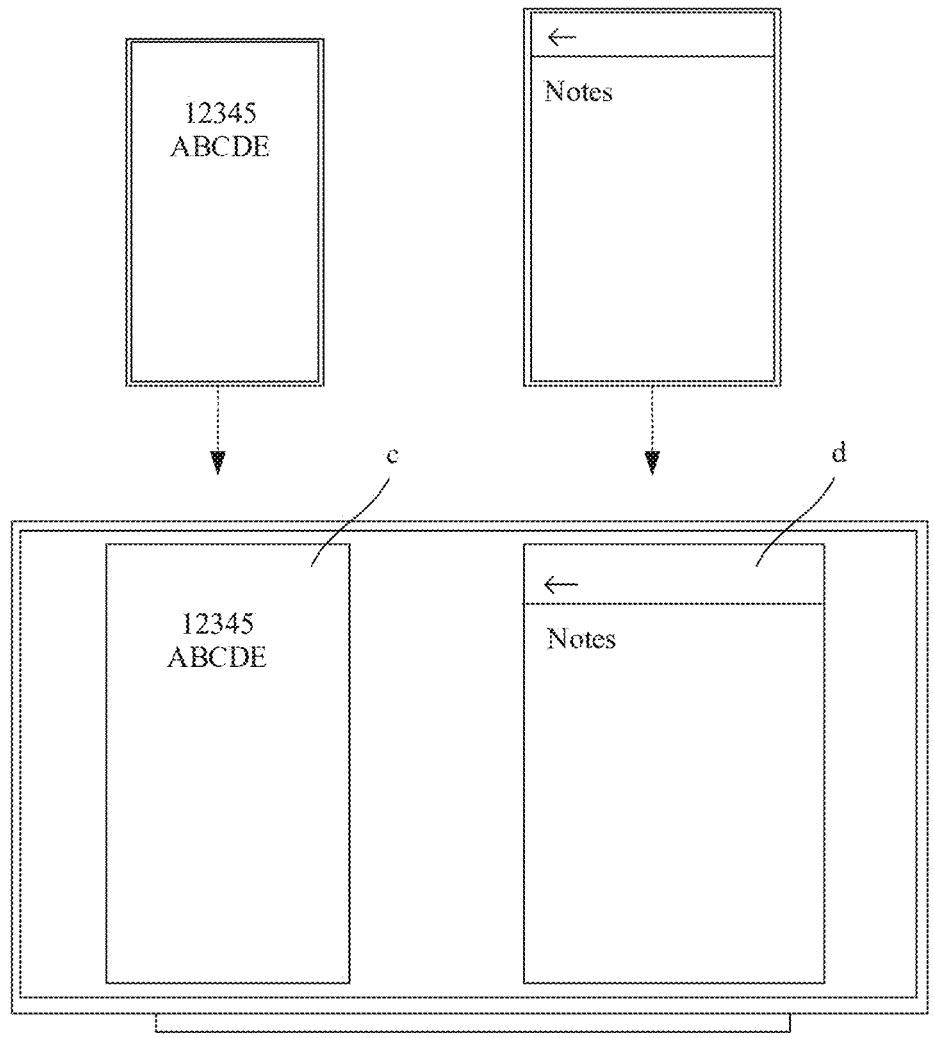
FIG. 3A to FIG. 3G are schematic diagrams of data transmission in a projection scenario 1 according to an embodiment of this application.

Projection scenario 1: As shown in FIG. 3A, a display of the smartphone displays a first user interface of an electronic document. A second user interface of Memo is displayed on a display of the tablet computer. After the smartphone establishes a wireless connection for projection to the electronic whiteboard, and the tablet computer establishes a wireless connection for projection to the electronic whiteboard, user interfaces of the smartphone and the tablet computer are displayed on a display of the electronic whiteboard. The display of the electronic whiteboard provides a window c and a window d. An area other than the window c and the window d in the electronic whiteboard may be displayed as a background interface, for example displayed as a whiteboard or a wallpaper. The window c in the electronic whiteboard displays a user interface of an electronic document projected by the smartphone. The window d displays a user interface of Memo projected by the tablet computer. The electronic document may be a local document in the smartphone, for example, a Word document. The electronic document may alternatively be a network document. For example, the electronic document is web page content opened in a search engine. For another example, the electronic document is an official account document opened in WeChat. The electronic document may include data content such as a text, an image, and a table. An example in which the electronic document shown in FIG. 3A includes only text content is used. As shown in FIG. 3A, "12345ABCDE" is displayed in the user interface of the electronic document.

Figure 3B:
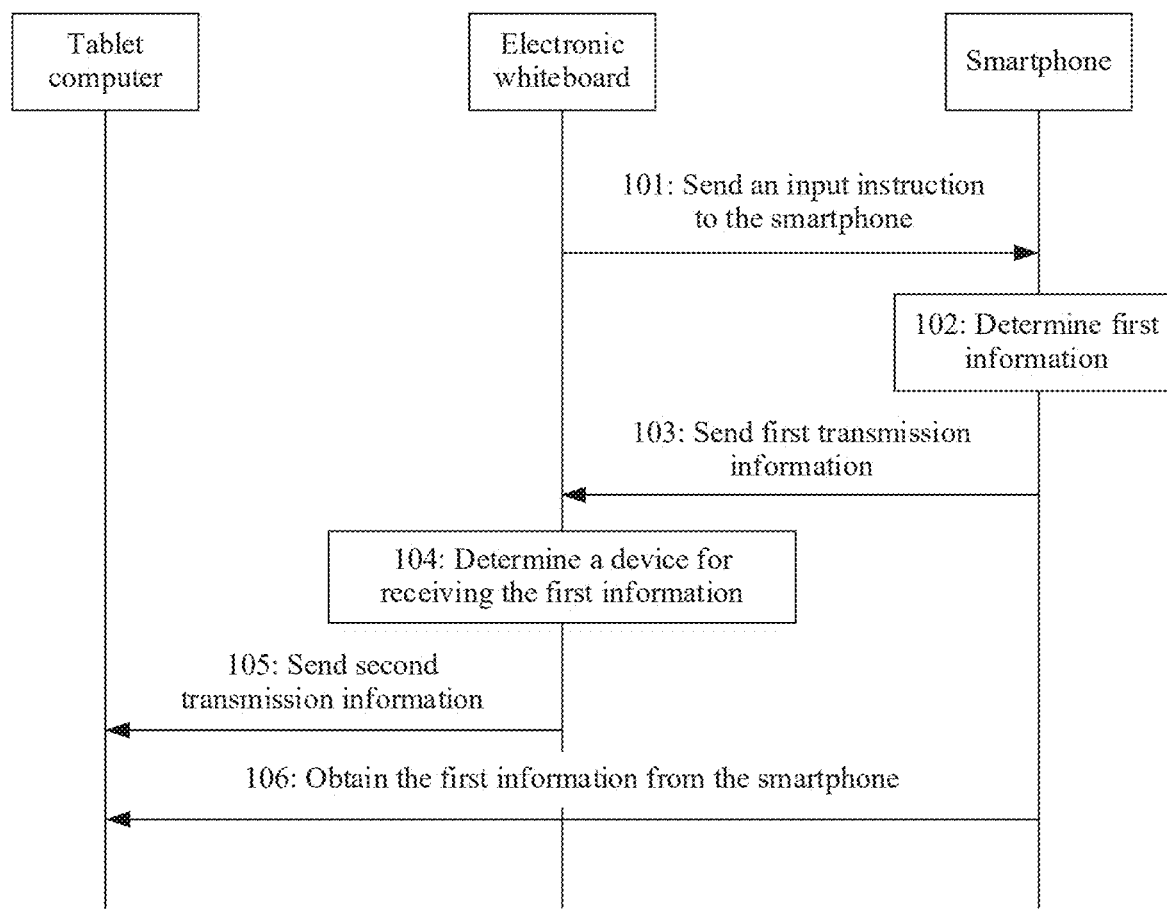

The following uses the projection scenario shown in FIG. 3A as an example to describe a process of transmitting data in the electronic document of the smartphone to Memo of the tablet computer. For this process, refer to a method flowchart shown in FIG. 3B. The method includes the following steps.

101: The electronic whiteboard detects an input instruction acting on first information, and sends the input instruction to the smartphone.

A triggering module in the electronic whiteboard continuously detects a gesture operation performed by a user on the display. When the gesture operation is a press action, the triggering module determines that an input instruction corresponding to the gesture operation is a press (Press) instruction. The triggering module determines an action location of the press action on the display as coordinates of the press instruction. The triggering module sends the press instruction and the coordinates to a second parsing module.

The second parsing module determines, based on the coordinates of the press instruction, a window on which the press action acts. It may be determined, based on the coordinates of the press instruction, that the press action is performed on the window c, the window d, or the background interface. If the press action is performed in the background interface, the electronic whiteboard may not respond to the gesture operation.

Figure 3C:
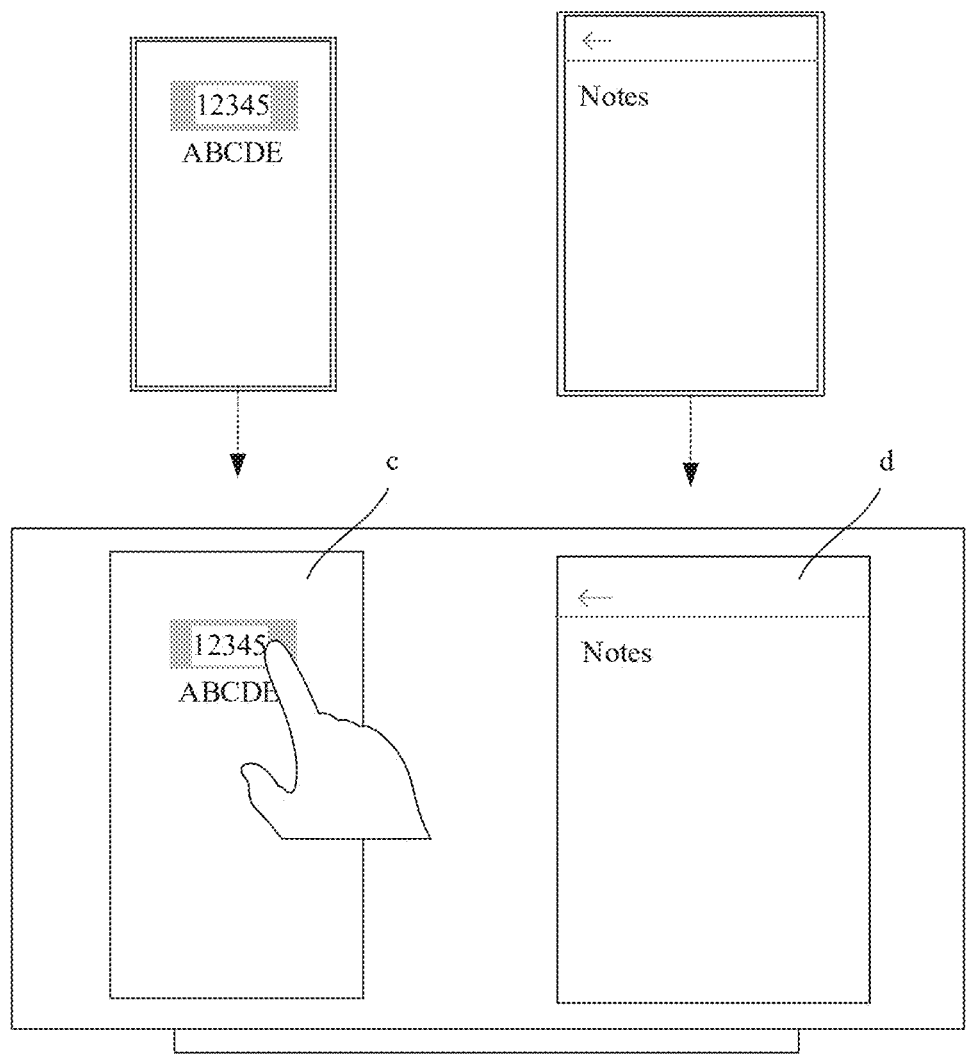

As shown in FIG. 3C, the second parsing module determines that the press action acts on the window c. Further, the second parsing module determines whether the press instruction is an instruction for triggering data sending. The second parsing module determines that the press instruction is the instruction for triggering data sending. The second parsing module sends the press instruction and the coordinates to a second transceiver module. The second transceiver module sends the press instruction and the coordinates to the smartphone. If the user maintains pressing on the display, the electronic whiteboard sends the press instruction and the coordinates to the smartphone at a preset interval.

In a possible design, after determining that the press instruction is detected, the second parsing module further detects duration of the press action. If the duration of the press action exceeds a preset value, the second parsing module determines that the gesture operation of the user triggers a long press instruction. The second parsing module determines that the long press instruction is an instruction for triggering data sending. The second parsing module sends the long press instruction and the coordinates to the smartphone by using the second transceiver module.

In some embodiments, the second parsing module uses the press instruction or the long press instruction as a first input instruction. Before sending the first input instruction to the smartphone, the second parsing module converts the first input instruction into a second input instruction that can be recognized by the smartphone. In some embodiments, the second parsing module performs coordinate conversion on the first input instruction based on a coordinate conversion relationship between the window c and the display of the smartphone, to obtain the second input instruction. The second parsing module sends the second input instruction to the smartphone by using the second transceiver module.

Similarly, if the press action of the user acts on the window d, the electronic whiteboard sends a corresponding input instruction to the tablet computer.

102: The smartphone determines to-be-transmitted first information.

A first transceiver module in the smartphone receives a second input instruction sent by the electronic whiteboard. The first transceiver module sends the second input instruction to a first parsing module. The first parsing module determines, based on a type of the second input instruction, whether the instruction is an instruction for triggering data transmission to another source device. If the press instruction or the long press instruction is the instruction for triggering data transmission to another source device, the first parsing module further determines an application that provides the first information. Optionally, a type of the instruction for triggering data transmission to another source device may be preset in the smartphone, for example, a press instruction, a long press instruction, a tap instruction, or a double-tap instruction. In this embodiment, the instruction for triggering data transmission to another source device is the long press instruction.

That the first parsing module determines an application that provides the first information may be: The first parsing module determines the application that provides the first information from an application that is projected onto the electronic whiteboard. Specifically, if the application projected by the smartphone onto the electronic whiteboard includes only one application, the first parsing module determines the application as the application that provides the first information. For example, if a user interface projected onto the electronic whiteboard includes only one document in an open state, the opened document is determined as the application that provides the first information. If a user interface projected onto the electronic whiteboard includes a plurality of applications, the first parsing module determines, based on the coordinates of the long press instruction, the application that provides the first information. For example, interfaces of a plurality of applications are simultaneously displayed in the user interface projected onto the electronic whiteboard. The first parsing module determines, based on coordinates of each interface and the coordinates of the long press instruction, the application that provides the first information. As shown in FIG. 3C, the first parsing module uses an electronic document as the application that provides the first information. An electronic document application is an application running in a foreground of the smartphone. That is, the display of the smartphone is displaying an interface of the electronic document. In another possible design, the user interface projected by the smartphone onto the electronic whiteboard may be an interface of an application running in a background of the smartphone. For example, the smartphone opens a Word document in the background. The smartphone projects a user interface of the Word document opened in the background onto the electronic whiteboard. At the same time, another application may run in the foreground of the smartphone. In this case, the smartphone determines, from applications running in the background, the application that provides the first information.

In this embodiment of this application, the second input instruction includes the long press instruction and the coordinates. The first parsing module provides the long press instruction and the coordinates to the electronic document. The electronic document determines the first information based on the coordinates of the long press instruction. The electronic document maps the coordinates of the long press instruction to a data area of the electronic document, to obtain a mapping area of the long press instruction in the data area. The electronic document uses data in the mapping area as the first information. As shown in FIG. 3C, the electronic document determines, based on the coordinates of the long press instruction, that the user long presses a number 5, and the electronic document may use the number 5 as the first information. Optionally, the electronic document may alternatively use an entire row or an entire segment of area that includes the coordinates of the long press instruction in the data area as a mapping area. The electronic document uses data in the mapping area as the first information. As shown in FIG. 3C, the user long presses the number 5, and the electronic document uses an entire row in which the number 5 is located as the first information. That is, the electronic document determines "12345" as the first information.

After the electronic document determines the first information, the first information may be set to a selected state. The selected state may be, for example, highlighting, displaying a thumbnail, or the like. As shown in FIG. 3C, the electronic document sets "12345" to a highlighted state. Optionally, the electronic document application may further buffer the first information "12345" in a clipboard. Optionally, the electronic document application may further provide the first information "12345" and/or related information about "12345" for the first parsing module. Related information of the first information may be, for example description information of the first information, a storage location of the first information, or the like.

103: The smartphone sends first transmission information to the electronic whiteboard.

The first parsing module generates the first transmission information after receiving the first information and/or the related information of the first information that are/is sent by the electronic document application. The first transmission information may include an access address of the first information. In some embodiments, the first transmission information further includes description information of the first information and/or a thumbnail of the first information. In some embodiments, the first transmission information further includes first verification information.

The access address of the first information may be generated by the electronic document or may be generated by the first parsing module. For example, the first parsing module generates the access address of the first information based on the storage location of the first information, a device identifier of the smartphone, and the like. The description information of the first information is used to describe a name, a type, a size, and the like of the first information.

Figure 3D:
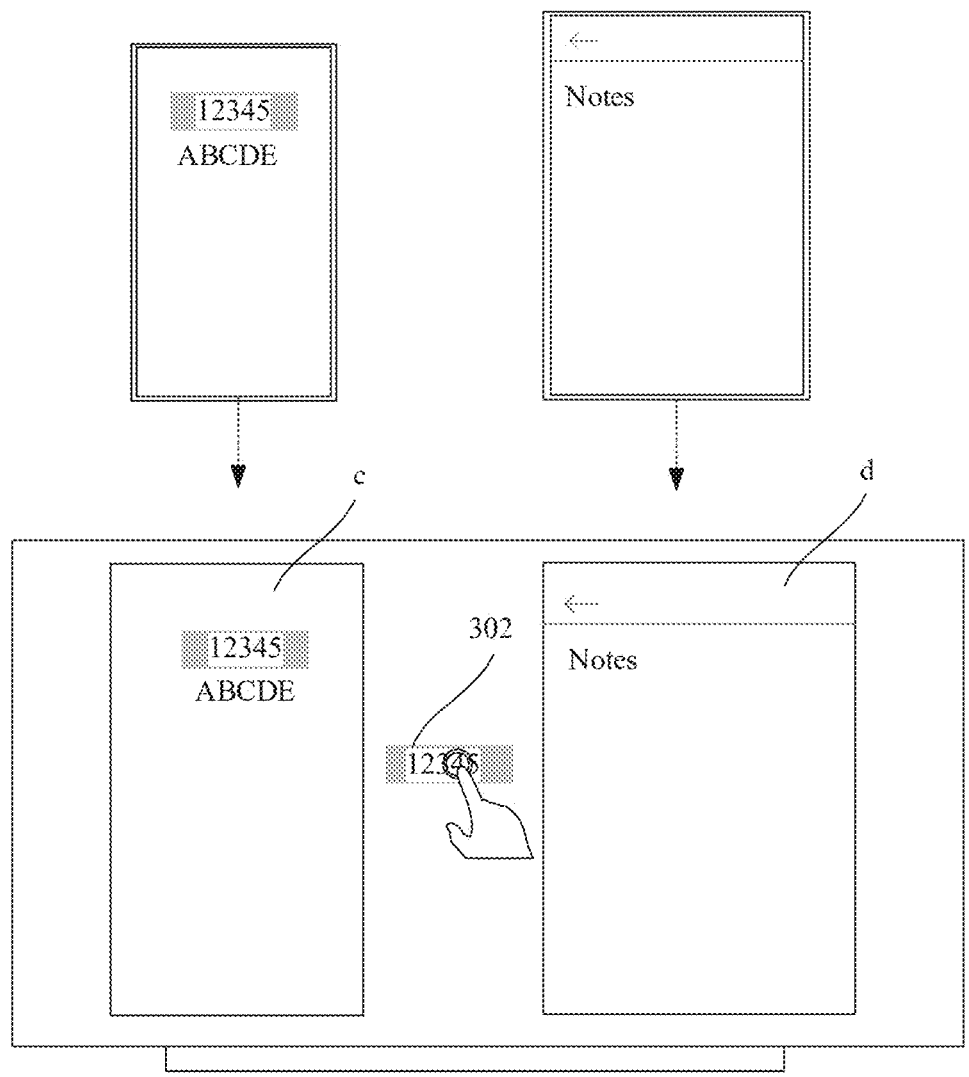

In some embodiments, the thumbnail of the first information may be determined based on the description information of the first information. Optionally, the thumbnail of the first information may be determined based on the type of the first information. For example, the first parsing module pre-stores a thumbnail, and each thumbnail is associated with at least one type of data. After obtaining the type of the first information, the first parsing module determines the thumbnail of the first information from the pre-stored thumbnail. Optionally, the thumbnail of the first information may alternatively be generated by the first parsing module based on data content. For example, the first parsing module generates a screenshot of data content of the first information. The first parsing module uses the screenshot of the data content as the thumbnail. As shown in FIG. 3D, the first parsing module may use a screenshot 302 of the first information "12345" as the thumbnail.

The first verification information may be used to perform validity verification on an electronic device that needs to obtain the first information. The first verification information may include a verification password, a key factor, and the like. The first parsing module in the smartphone sends the first transmission information to the first transceiver module. The first transceiver module sends the first transmission information to the electronic whiteboard.

104: The electronic whiteboard determines a device for receiving the first information.

The second transceiver module in the electronic whiteboard receives the first transmission information. The second transceiver module sends the first transmission information to the second parsing module. The second parsing module determines, based on the first transmission information, that the smartphone has to-be-transmitted first information. Optionally. the second parsing module may buffer the first transmission information in a second buffer module. to read the related information from the second buffer module during subsequent processing.

The triggering module in the electronic whiteboard continuously detects the gesture operation on the display of the electronic whiteboard. If the user performs a drag action based on the press action, the triggering module obtains a drag instruction and coordinates. The triggering module sends the drag instruction and the coordinates to the second parsing module.

In some embodiments, the second parsing module determines that the first transmission information includes the thumbnail of the first information. The second parsing module displays the screenshot 302 based on the drag instruction and the coordinates. In addition, a display location of the screenshot 302 is changed based on a change of the coordinates of the drag instruction. As shown in FIG. 3D, the screenshot 302 moves with the drag action of the user. In some embodiments, the second parsing module determines that the first transmission information includes the description information of the first information. The second parsing module generates the thumbnail of the first information based on the description information of the first information. In some embodiments, the thumbnail generated by the second parsing module is shown in FIG. 3D, and is the screenshot 302. The display location of the screenshot 302 is determined based on the coordinates of the drag instruction. Optionally, presentation information may be displayed on the display based on the coordinates of the long press instruction, for example, the screenshot 302 displayed in FIG. 3D. Optionally, the second parsing module may alternatively generate the presentation information based on the first transmission information. For example, a thumbnail of an image is generated based on image information.

Figure 3E:
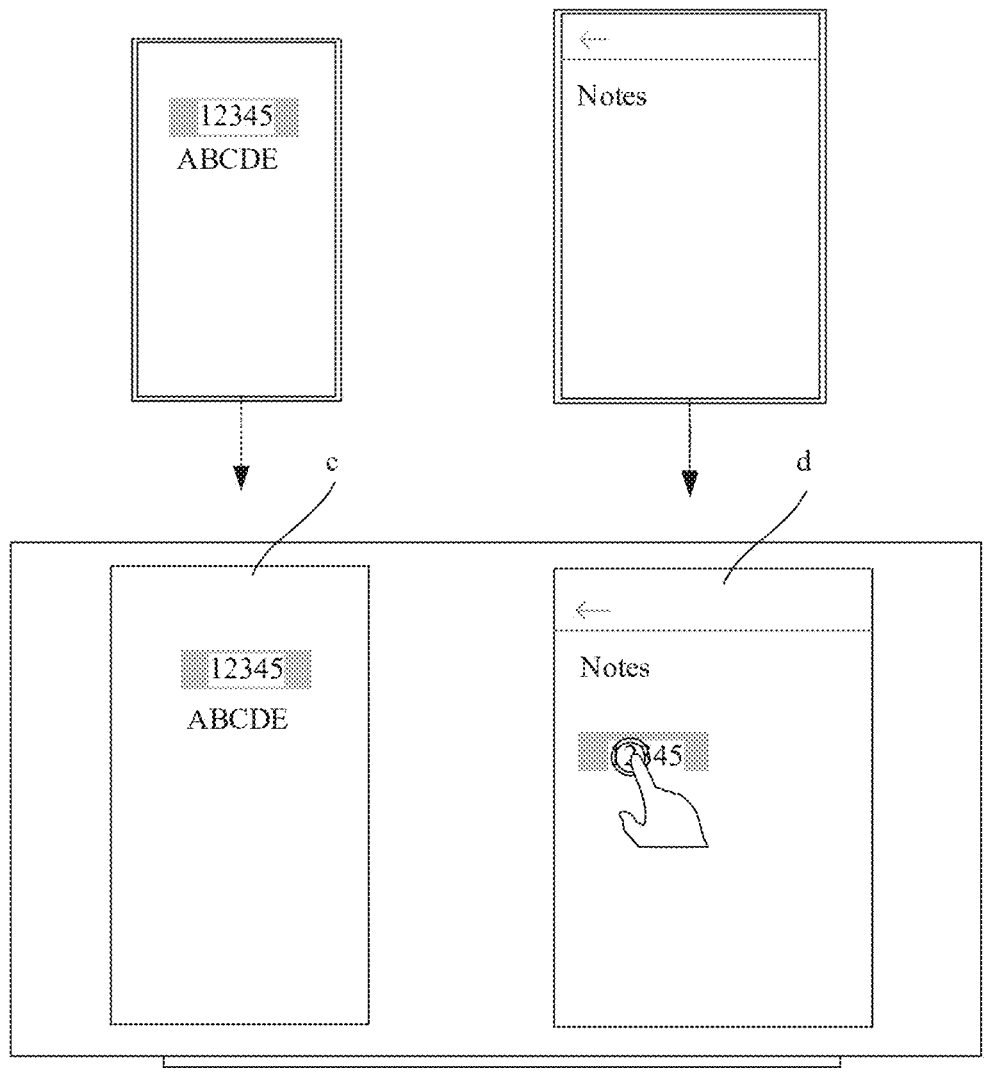

As shown in FIG. 3E, when the user performs a release action based on the drag action. the triggering module in the electronic whiteboard obtains a release instruction and coordinates. The triggering module sends the release instruction and the coordinates to the second parsing module. The second parsing module determines, based on the release instruction and the coordinates, that the release action of the user is located on the window d. The second parsing module determines that a projection device of the window d is the tablet computer.

105: The electronic whiteboard sends second transmission information to the tablet computer.

The second parsing module determines that a third input instruction is detected. The third input instruction includes the drag instruction and the release instruction. In this case, the second parsing module sends the second transmission information to the tablet computer. The second transmission information is generated based on the first transmission information. The second transmission information includes the access address of the first information. In some embodiments, the second transmission information includes the first verification information. In some embodiments, the electronic whiteboard further sends input location information to the tablet computer based on the third input instruction. The input location information may include, for example, the release instruction. In some embodiments, the second parsing module determines application information on which the release instruction acts. The second parsing module includes the application information in the input location information and sends the input location information to the tablet computer.

106: The tablet computer obtains the first information from the smartphone.

In some embodiments, after the tablet computer receives the second transmission information, the first parsing module in the tablet computer obtains the first information from the smartphone based on the access address of the first information. Specifically, the tablet computer sends a request for obtaining the first information to the smartphone by using the first transceiver module. The request may include the access address of the first information and the verification information. After the smartphone performs security verification on the tablet computer based on the verification information and the verification succeeds, the smartphone sends the first information "12345" to the tablet computer.

In some embodiments, the first transceiver module in the tablet computer receives the input location information sent by the electronic whiteboard. Optionally, an application for receiving the first information and an input location of the first information in the application may be determined based on the input location information. In this example, the tablet computer projects the user interface of Memo onto the electronic whiteboard, and the first parsing module determines Memo as the application for receiving the first information. The first parsing module sends the release instruction and the coordinates to Memo. Memo determines the input location in an editing area based on the coordinates of the release instruction and coordinates of the editing area of Memo. The input location may be displayed as a cursor.

Figure 3F:
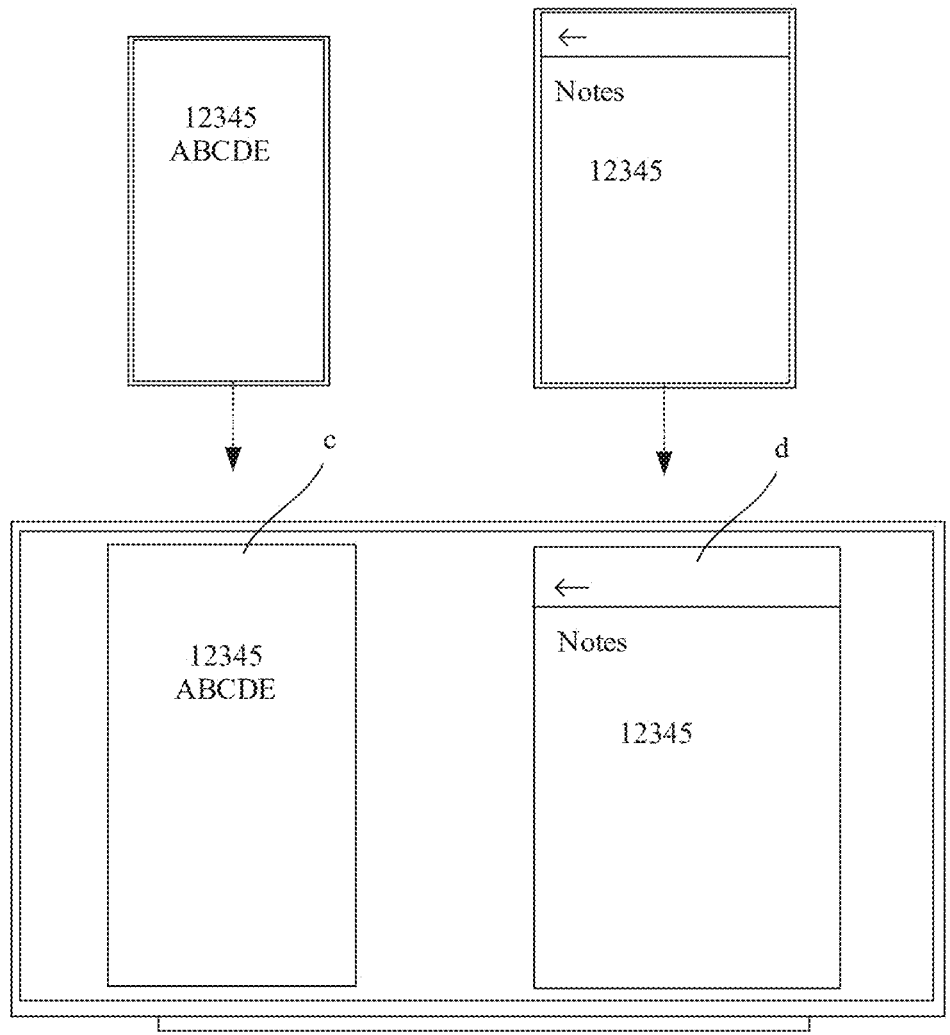

As shown in FIG. 3F, after receiving transmission data "12345", the tablet computer uses the determined input location as a start location, and enters "12345" from the start location.

Figure 3G:
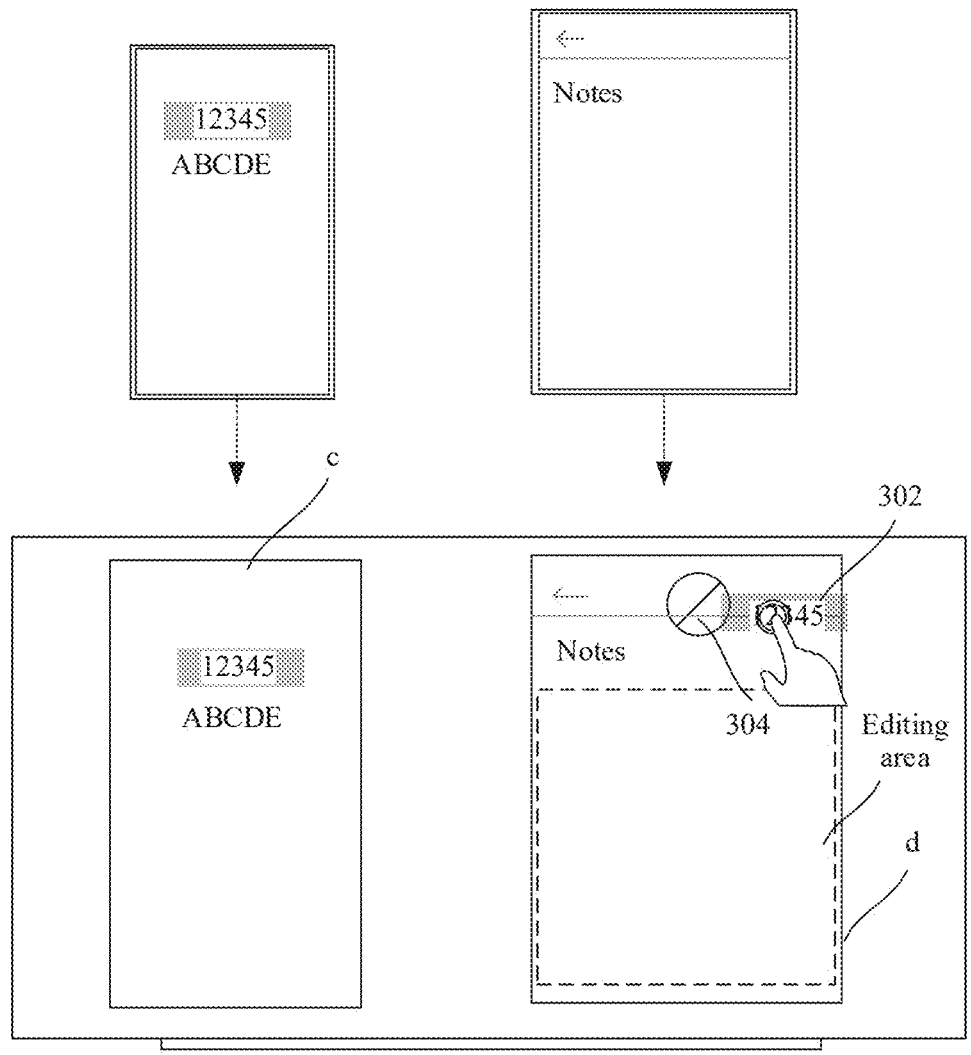

In some other embodiments, as shown in FIG. 3G, a Memo application interface includes an editing area and a non-editing area. An area enclosed by a dashed-line box in FIG. 3G is the editing area of Memo. An area other than the editing area in the Memo application interface is the non-editing area. If Memo detects that the input location is in the non-editing area, Memo displays a prohibition identifier 304. The prohibition identifier 304 is used to indicate that the input location is in the non-editing area of Memo, and the first information cannot be received in the non-editing area. The prohibition identifier is not limited to the identifier shown in FIG. 3F, and may alternatively be an "x"-shaped icon, a sound alarm, or the like. This is not limited in this embodiment of this application.

Figure 4A:
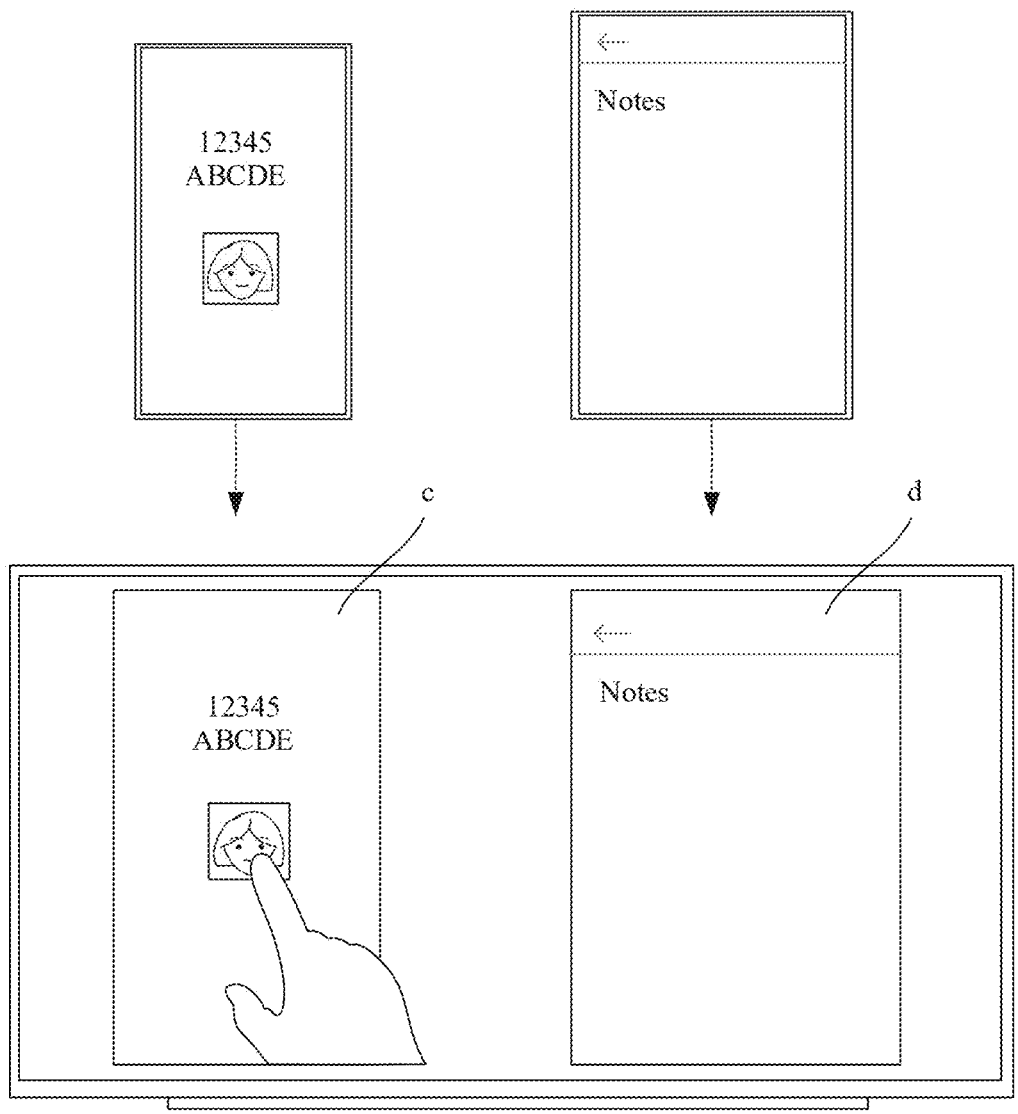
FIG. 4A to FIG. 4D are schematic diagrams of another type of data transmission in a projection scenario 1 according to an embodiment of this application.
Figure 4B:
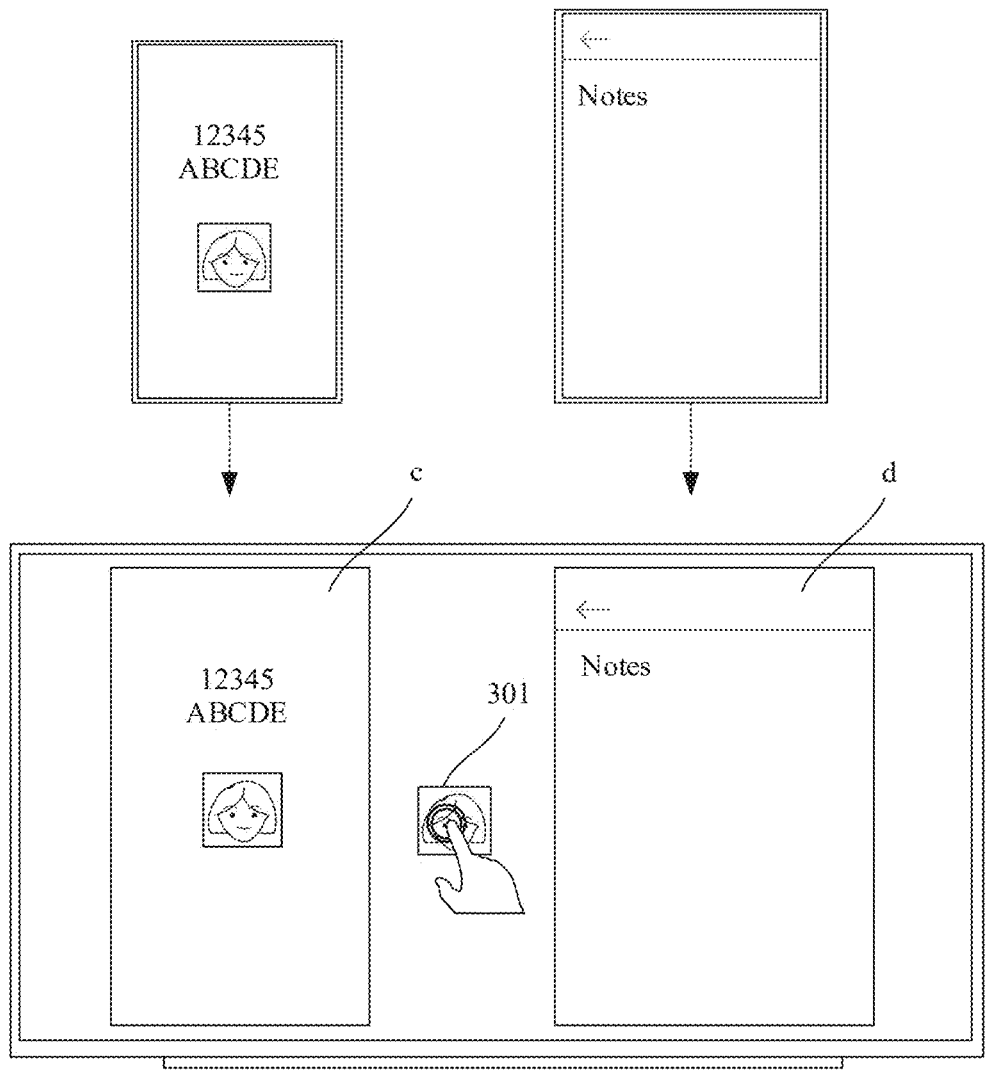
Figure 4C:
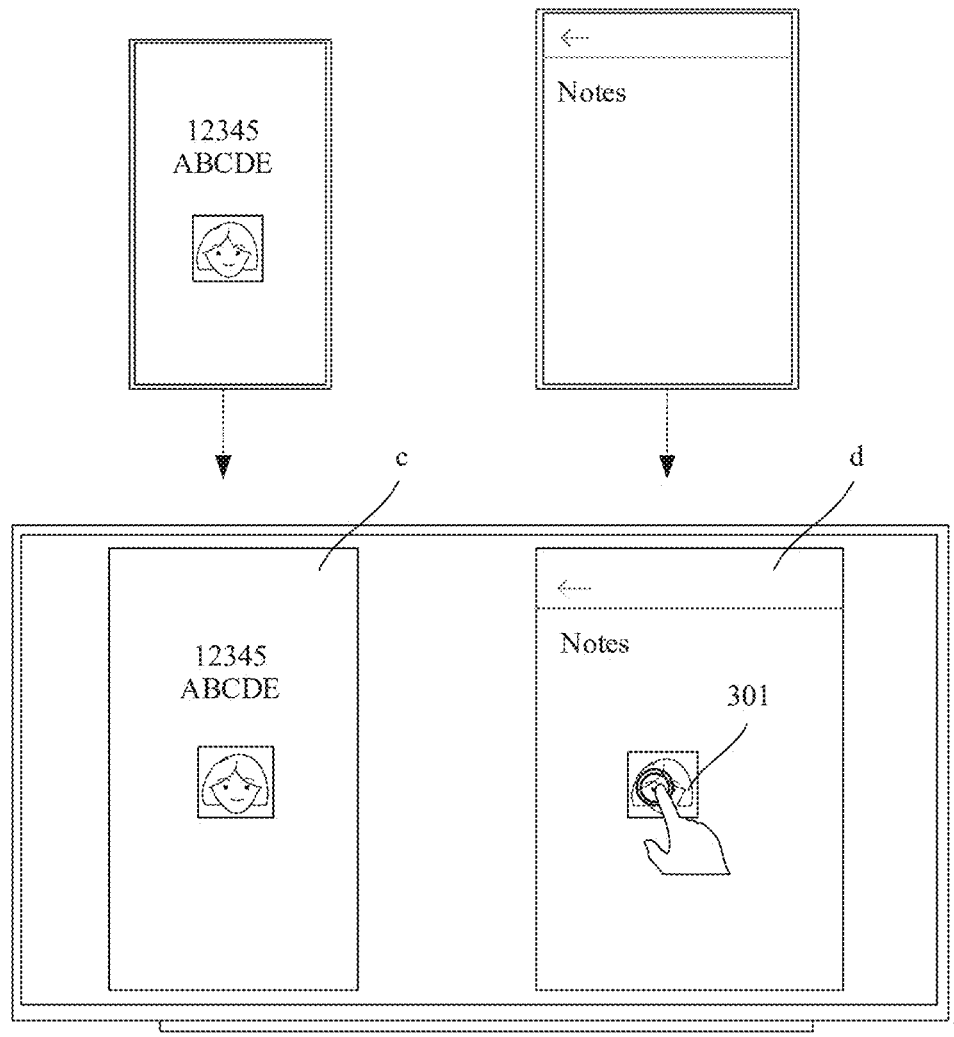
Figure 4D:
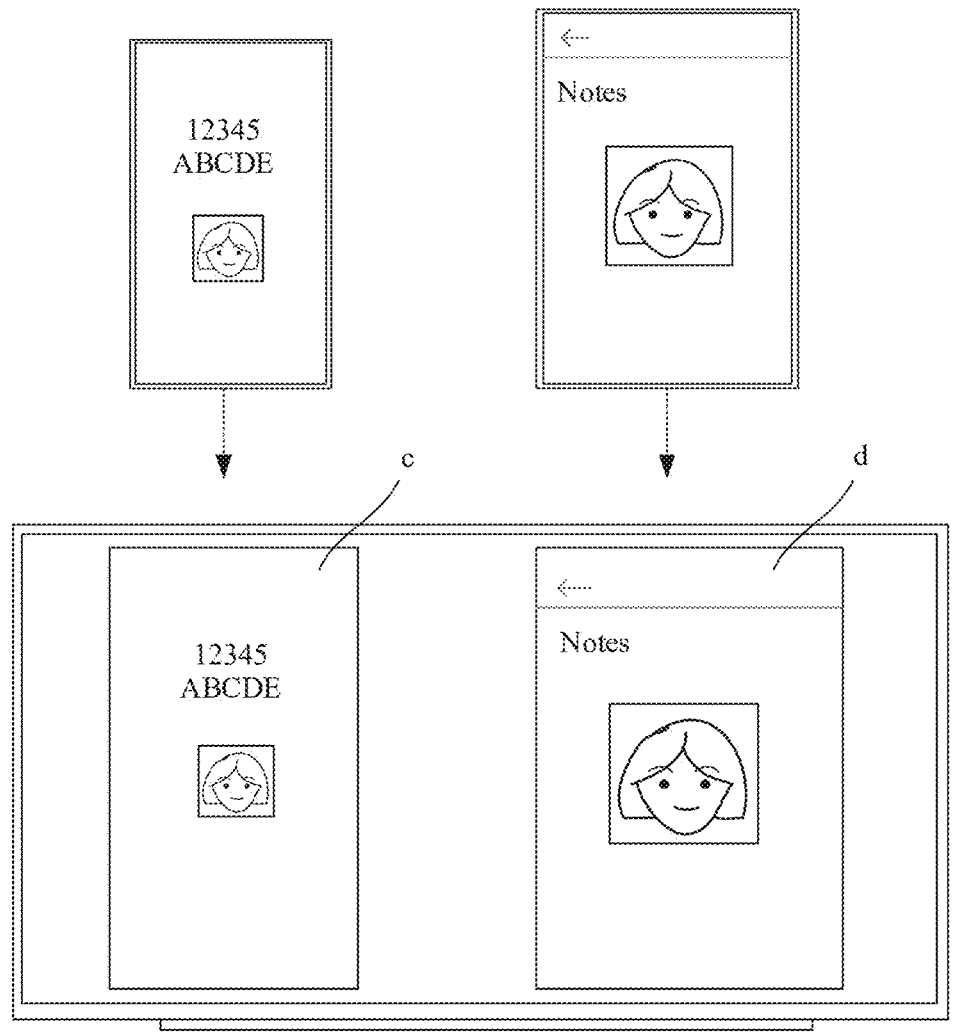

In some other embodiments, the first information selected by the user by performing the gesture operation may alternatively be an image in the electronic document. As shown in FIG. 4A, the electronic whiteboard sends, to the smartphone, an input instruction triggered by a gesture operation of the user. The smartphone determines a selected image based on the input instruction. The smartphone sends information about the image to the electronic whiteboard. The image information may include a name, a size, a format, an access path, and the like of the image. After receiving the image information, the electronic whiteboard generates an image thumbnail based on the image information. As shown in FIG. 4B, an image thumbnail 301 may move with a drag action of the user. As shown in FIG. 4C, when the user drags the image thumbnail 301 from the window c to the window d and then releases the image thumbnail, the electronic whiteboard sends the second transmission information to the tablet computer. For a process in which the tablet computer obtains the image from the smartphone based on the second transmission information.

refer to a manner of obtaining the text content in the scenario 1, and details are not described again. As shown in FIG. 4D, after obtaining image data from the smartphone, the tablet computer displays the image data in the editing area of Memo.

In some other possible implementations, the display of the tablet computer may alternatively display an interface of another application. The following describes other projection scenarios.

Figure 5A:
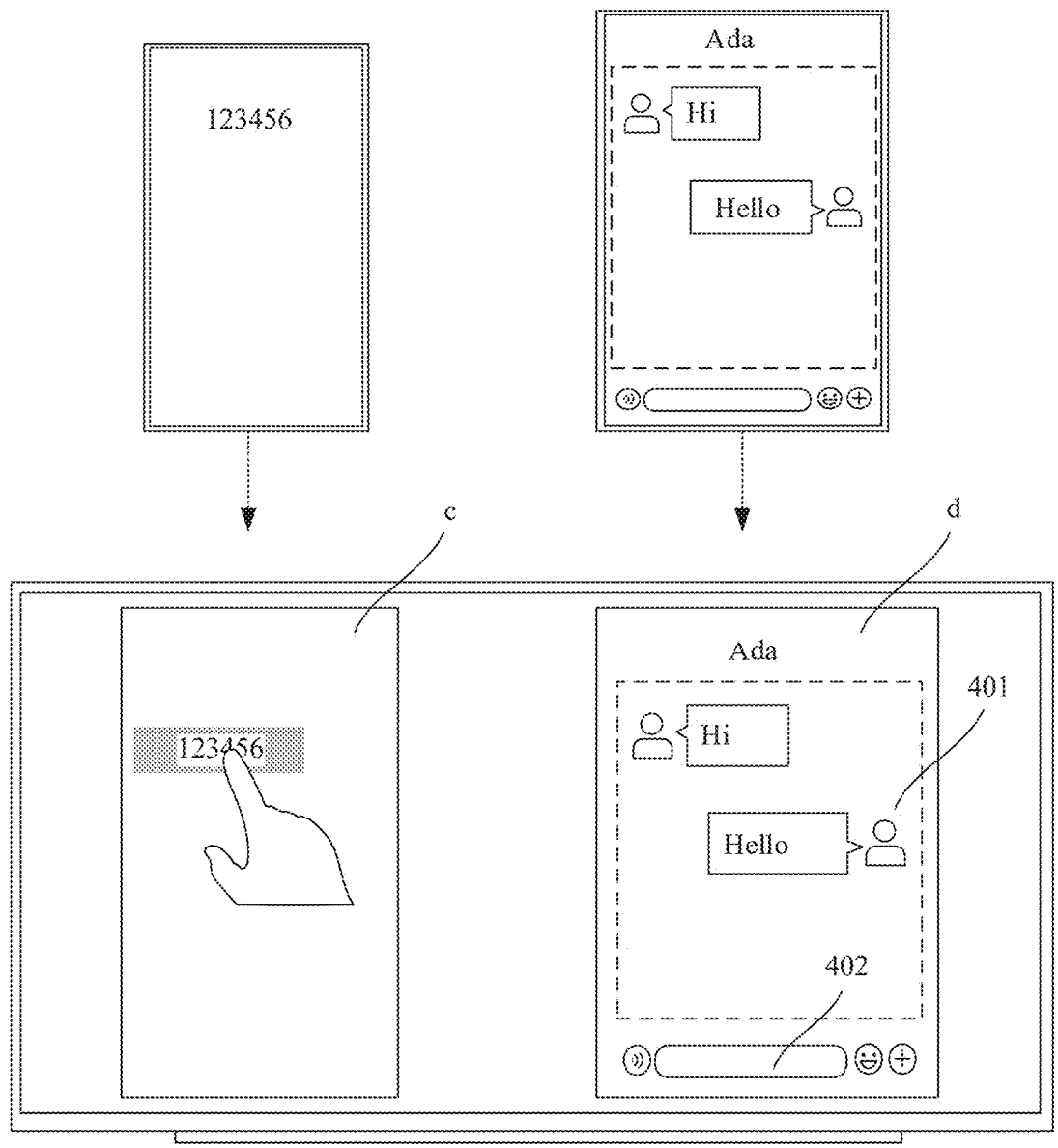
FIG. 5A to FIG. 5D are schematic diagrams of data transmission in a projection scenario 2 according to an embodiment of this application.

Projection scenario 2: As shown in FIG. 5A, a user interface of an electronic document is displayed in the smartphone. A segment of numbers, for example, 123456, is displayed in the user interface. A chat interface of WeChat is displayed on the tablet computer. The electronic document interface of the smartphone and the chat interface of the tablet computer are projected onto an electronic whiteboard. The electronic whiteboard provides a window c and a window d. The window c displays the electronic document interface, and the window d displays the chat interface. As shown in FIG. 5A, the chat interface includes a message display area 401 and an input box 402.

Figure 5B:
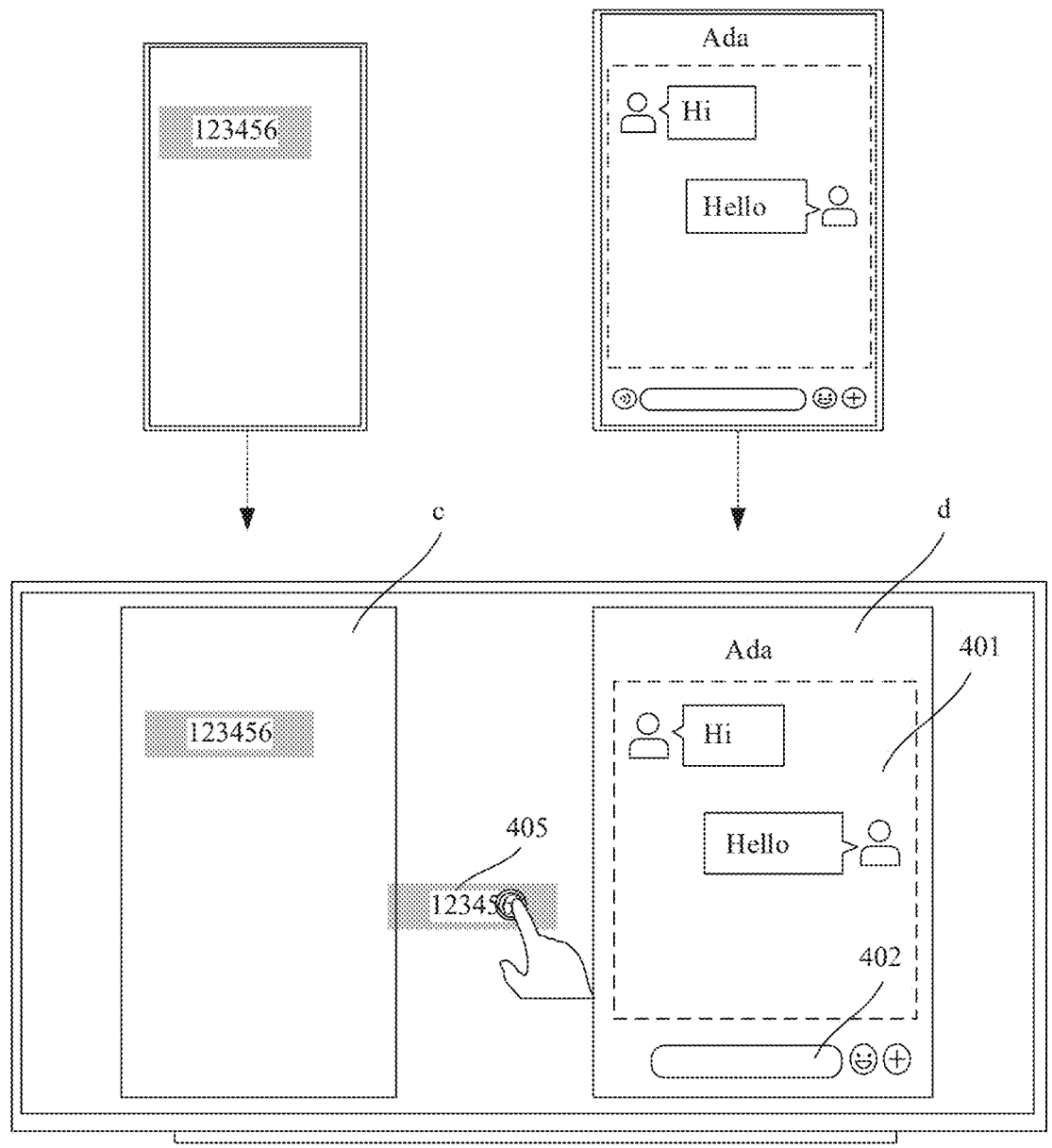
Figure 5C:
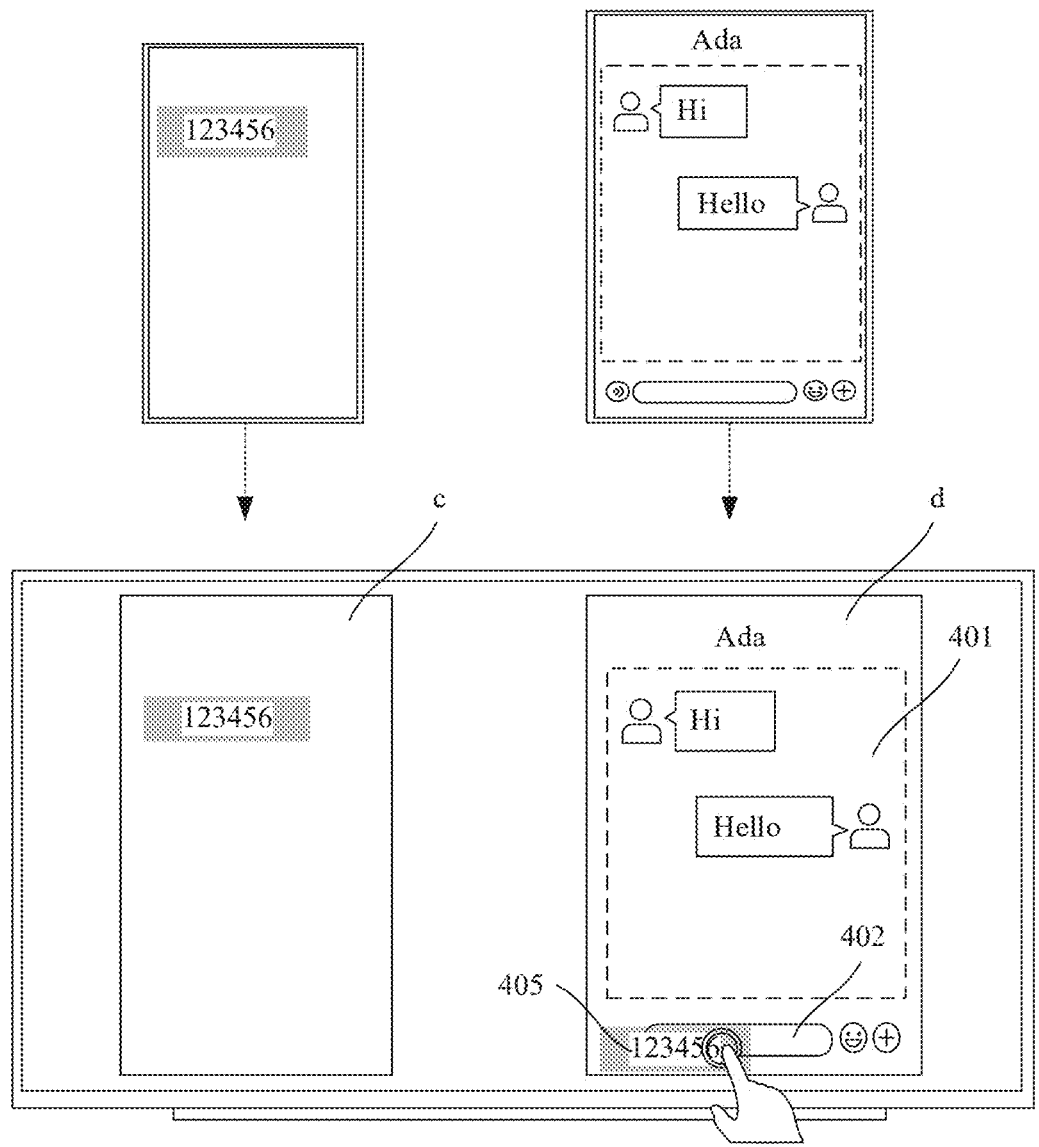
Figure 5D:
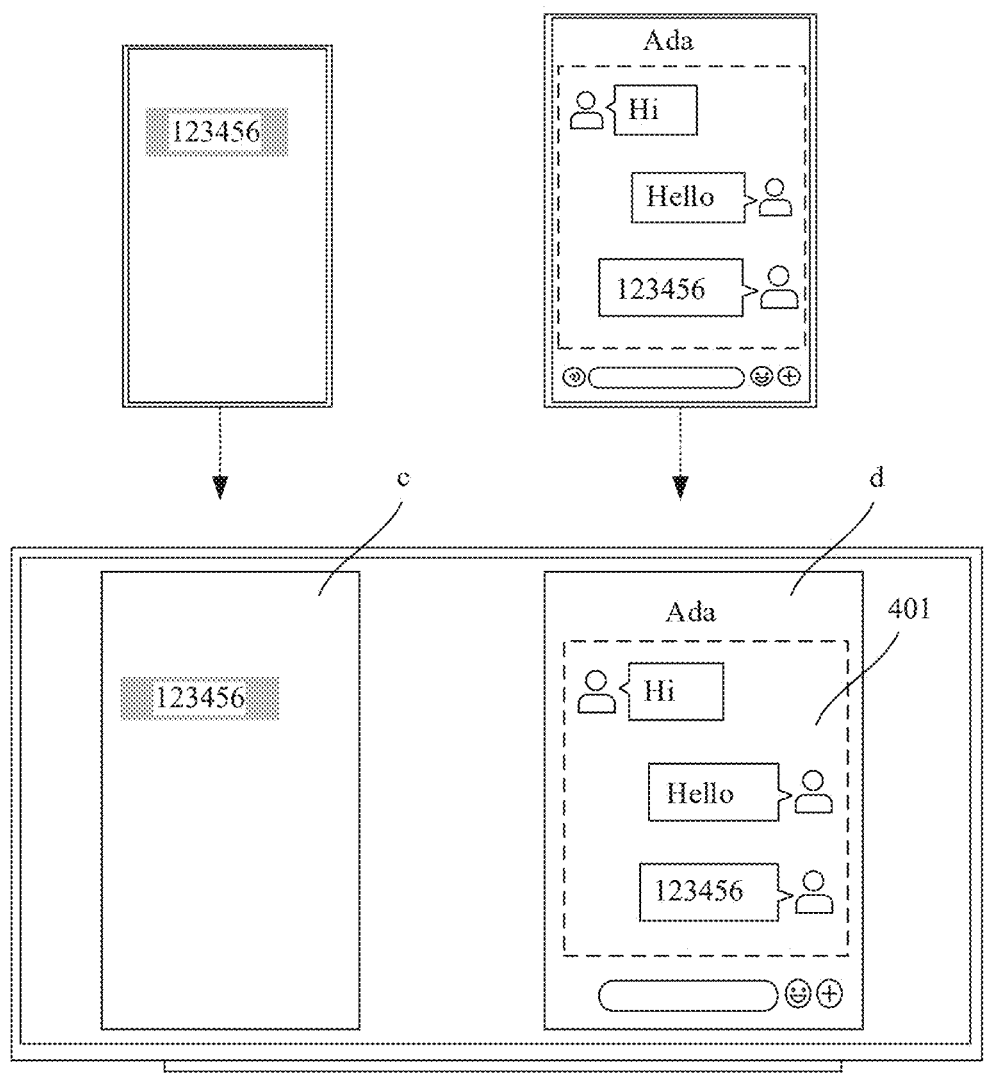

Referring to the data transmission manner described in the foregoing projection scenario 1, as shown in FIG. 5A, when a long press action of a user acts on a number in the window c, the electronic whiteboard detects a long press instruction. After converting the long press instruction, the electronic whiteboard sends a converted long press instruction to the smartphone. The smartphone determines first information "123456" based on the long press instruction and coordinates. Optionally, the smartphone may highlight the first information "123456". The smartphone sends first transmission information to the electronic whiteboard. The first transmission information includes an access address of the first information "123456" and a screenshot of "12345". As shown in FIG. 5B, the electronic whiteboard continuously detects a gesture operation of the user. When a drag action is detected, the electronic whiteboard determines a drag instruction and coordinates. The electronic whiteboard displays a screenshot 405 based on the coordinates of the drag instruction. In this way, the screenshot 405 moves with the drag action. As shown in FIG. 5C, when the user performs a release action on the window d based on the drag action, the electronic whiteboard obtains a release instruction and coordinates. The electronic whiteboard determines, based on the coordinates of the release instruction, that a release location is on the window d. The electronic whiteboard sends the release instruction and the coordinates to the tablet computer. When the tablet computer determines, based on the coordinates of the release instruction, that the release action acts on the input box 402, the tablet computer obtains the first information "123456" from the smartphone. WeChat on the tablet computer enters the first information "123456" into the input box 402. As shown in FIG. 5D. data "123456" entered into the input box 402 is sent to a message receiver as a message and displayed in the message display area 401.

Scenario 3: The smartphone displays a user interface of "File Manager". A notebook computer displays a user interface of "This PC". The user interface of "File Manager" on the smartphone and the user interface of "This PC" on the notebook computer are projected onto the electronic whiteboard. "File Manager" is an application for file resource management on the smartphone. "File Manager" can be used to view a file stored on the smartphone. "This PC" is an application for file resource management on the notebook computer. "This PC" can be used to view a file stored on the notebook computer.

Figures 3, 6A:
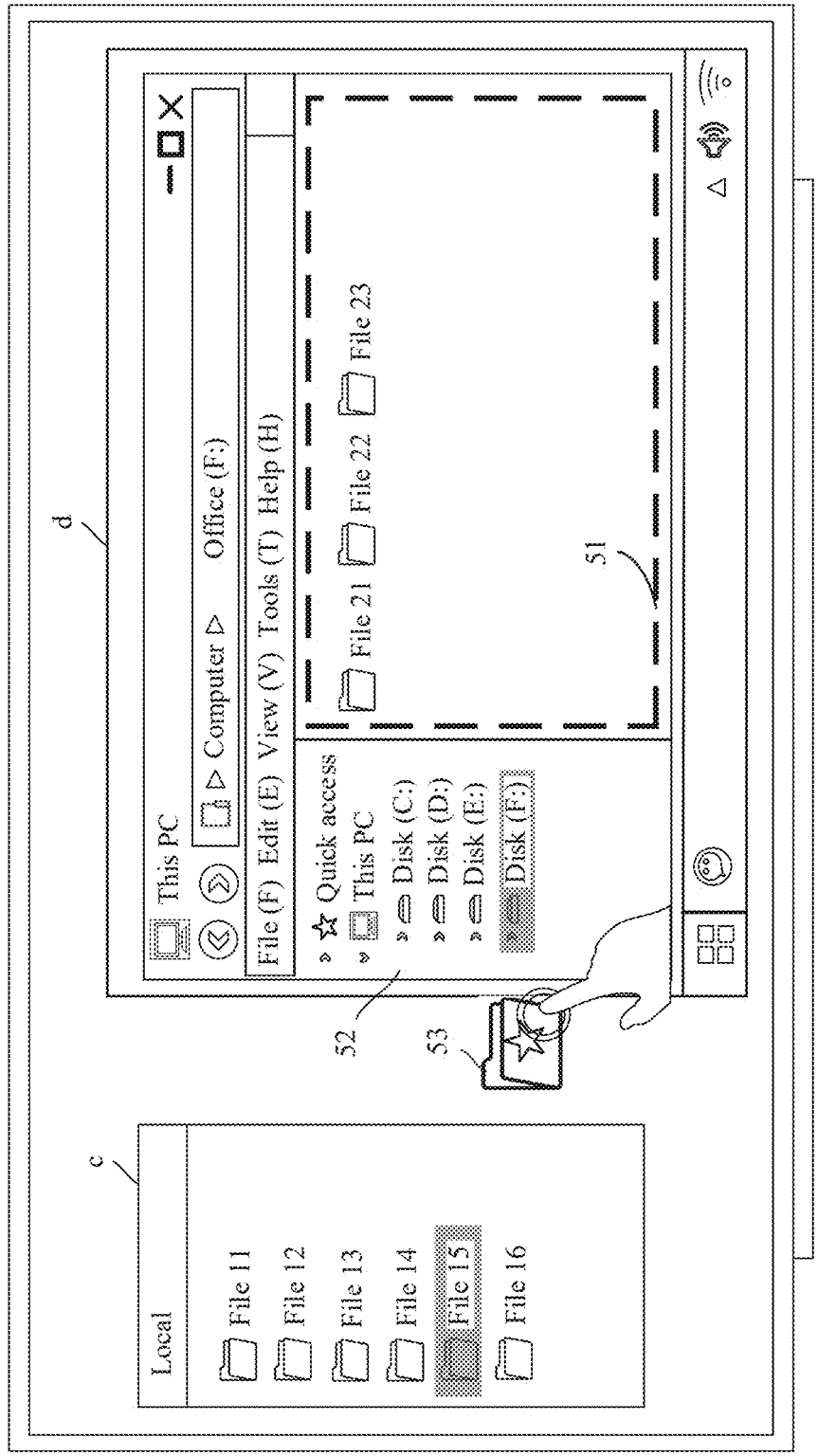

As shown in FIG. 6A-1 to FIG. 6A-3, the electronic whiteboard provides a window c and a window d. The window c displays a projected interface of "File Manager" on the smartphone. The window d displays a projected interface of "This PC" on the notebook computer. An interface of "This PC" includes a title bar, a menu bar, an address option bar 52, and a file display area 51. The address option bar 52 may display one or more address options. Address options in an example include Quick access, This PC, and more detailed addresses under. This PC (for example. Disk (C:) and Disk (D:)). The file display area 51 is used to display file information stored in a selected storage area (that is. Disk (F:)). As shown in FIG. 6A-1 to FIG. 6A-3, the file display area 51 displays icons and file names of files stored in the Disk (F:).

Figure 6B:
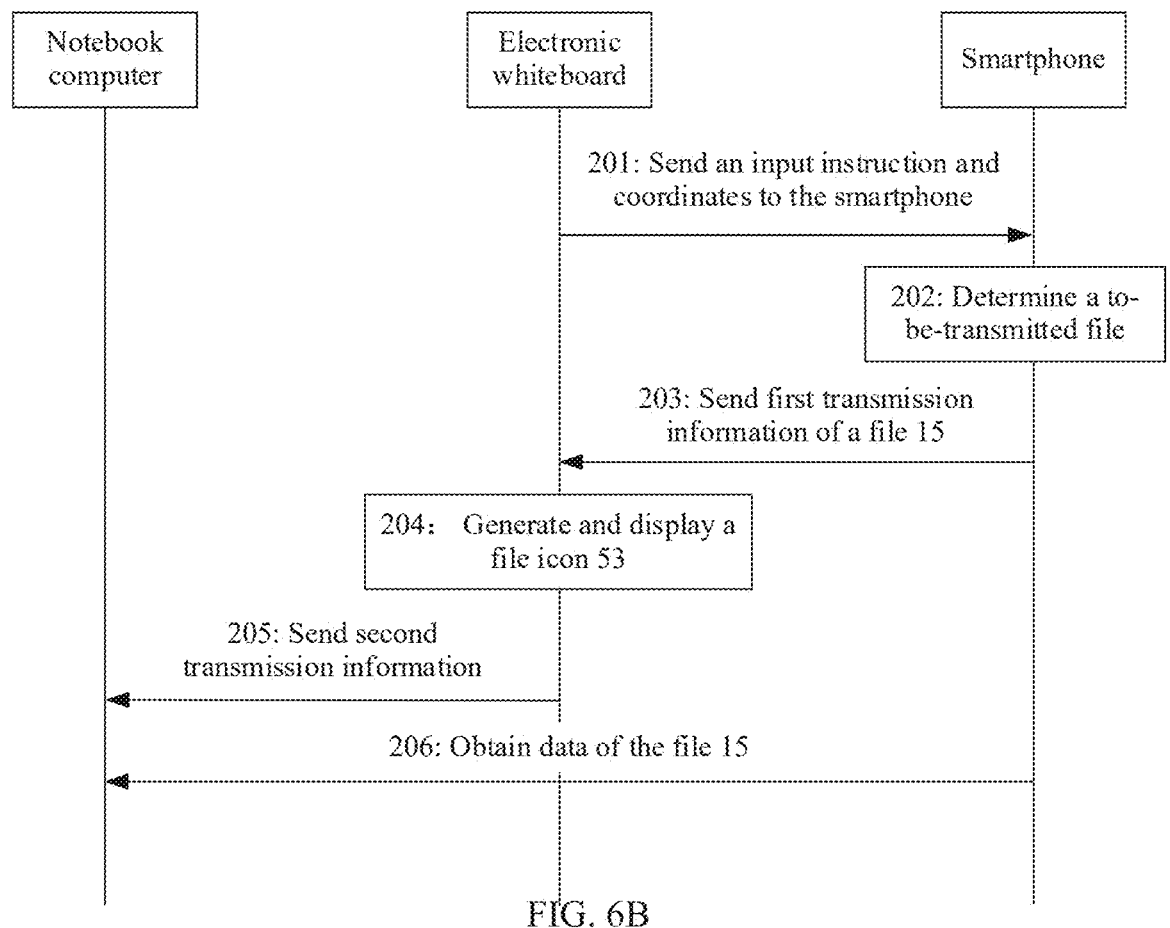

The following describes, by using a projection scenario shown in FIG. 6A-1 to FIG. 6A-3 as an example, a process of transferring a file in "File Manager" of the smartphone to "This PC" of the notebook computer. For this process, refer to a method flowchart shown in FIG. 6B. As shown in FIG. 6B, the method includes the following processing steps.

201: The electronic whiteboard detects an operation performed by a user on the "File Manager" application interface in the window c, and the electronic whiteboard sends an input instruction and coordinates that correspond to the operation to the smartphone.

The operation performed by the user on the File Manager application interface in the window c may be a long press operation. If the electronic whiteboard determines that a long press instruction triggered by the long press operation is an instruction for triggering data sending, the electronic whiteboard converts the long press instruction into an instruction that can be recognized by the smartphone. The electronic whiteboard sends a converted long press instruction to the smartphone.

202: The smartphone determines a to-be-transmitted file.

The smartphone determines, based on the long press instruction, that the long press instruction acts on the "File Manager" application interface. "File Manager" determines the to-be-transmitted file based on coordinates of the long press instruction. "File Manager" can highlight an icon of the to-be-transmitted file. For example, if the to-be-transferred file is a file 15, an icon of the file 15 may be highlighted.

203: The smartphone sends first transmission information related to the file 15 to the electronic whiteboard. The first transmission information may include description information such as a name, a size, and a format of the file 15. Further, the first transmission information may further include an access path of data in the file 15. In some embodiments, the first transmission information may further include first verification information. Optionally, the first verification information may be a verification password, a key factor, or the like.

204: The electronic whiteboard generates and displays a file icon 53 based on the description information of the file 15.

As shown in FIG. 6A-1 to FIG. 6A-3, the electronic whiteboard displays the file icon 53 based on a long press location of the user. When the user performs a drag action based on the long press action, a display location of the file icon 53 changes with movement of the drag action of the user. The electronic whiteboard may generate a file icon based on a file format of the file 15. A same icon can be displayed for drag objects of a same format. For example, data in formats such as a folder format, a compressed package format, a Word format, and an image format corresponds to respective icons. In another possible implementation, the file icon 53 may alternatively be sent by the smartphone to the electronic whiteboard. The electronic whiteboard displays the received file icon 53.

205: The electronic whiteboard sends second transmission information to the notebook computer in response to an operation of moving from the window c to the window d and releasing by the user. The second transmission information may include an access address of the file 15 and the first verification information. Optionally, the electronic whiteboard further sends a release instruction to the notebook computer. The electronic whiteboard sends, to the notebook computer, a release instruction that can be recognized by the notebook computer after conversion.

206: The notebook computer obtains data of the file 15 from the smartphone.

After the notebook computer receives the second transmission information and the release instruction, the notebook computer determines, based on coordinates of the release instruction, that an application for receiving the data is "This PC". "This computer" determines a storage location of the file 15 based on the coordinates of the release instruction.

Figures 3, 6C:
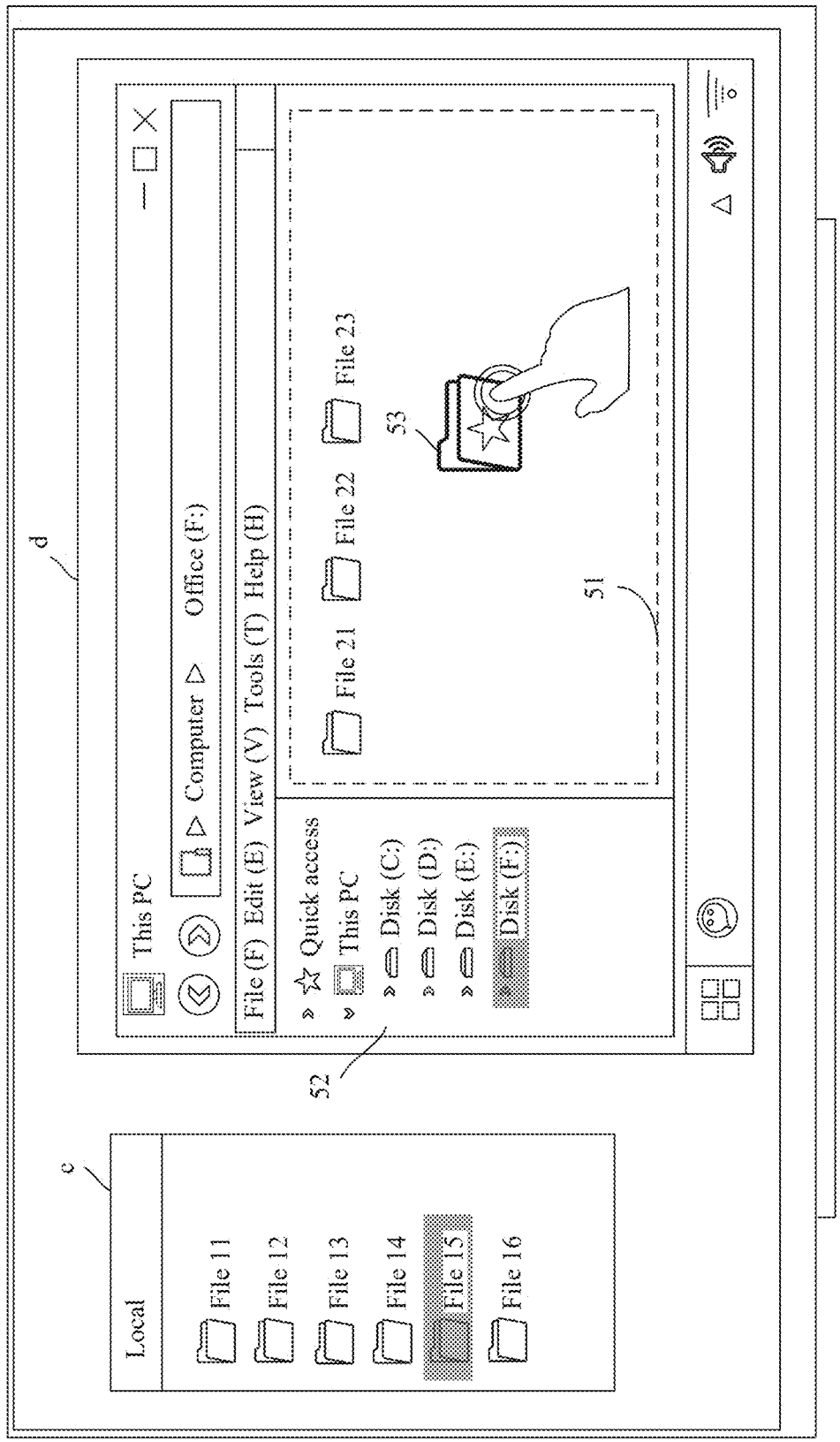

As shown in FIG. 6C-1 to FIG. 6C-3, when the coordinates of the release instruction are located in a blank area of the file display area 51, the storage location of the file 15 is a storage area currently selected in the address option bar, that is, Disk (F:). For another example, when the coordinates of the release instruction are at a folder 22 in the file display area 51, the storage location of the file 15 is the folder 22 in Disk (F:). For another example, when the coordinates of the release instruction are at Disk (D:) in the address option bar, the storage location of the file 15 is Disk (D:). In this example, the storage location of the file 15 is Disk (F:), and a display location is the file display area 51 of Disk (F:).

As shown in FIG. 6D-1 to FIG. 6D-3, the notebook computer generates the icon of the file 15 in the file display area 51. After receiving the data that is of the file 15 and that is sent by the smartphone, the notebook computer stores the data of the file 15 in the file 15 of Disk (F:). The display location of the icon of the file 15 may be determined based on a release location. That is. a location of the coordinates of the release instruction may be determined as an input location of the file 15.

In another possible design, the display location of the file 15 may be alternatively determined according to a display rule of a file icon in the file display area 51. As shown in FIG. 6C-1 to FIG. 6C-3, it is assumed that a release location of the drag action of the user is a location indicated by the file icon 53. As shown in FIG. 6D-1 to FIG. 6D-3, the icon of the file 15 is displayed at an end of a file list. In another possible file icon display rule, for example, according to a rule of increasing file names, the icon of the file 15 may be alternatively displayed before a file 21.

The notebook computer sends, to the smartphone, a request message for obtaining the file 15. Optionally, the request message may include the first verification information or second verification information generated based on the first verification information. After receiving the request message, the smartphone performs security verification on the notebook computer based on the first verification information or the second verification information. After security verification succeeds, the smartphone sends the data of the file 15 to the notebook computer based on access address information that is of the file 15 and that is sent by the notebook computer.

As shown in FIG. 6D-1 to FIG. 6D-3, in a process in which the notebook computer obtains the data of the file 15 from the smartphone, the notebook computer sends data transmission progress information to the electronic whiteboard. The electronic whiteboard generates and displays a transmission progress icon 55 based on the data transmission progress information. After determining that receiving of the data of the file 15 is completed, the notebook computer may send. to the electronic whiteboard, information indicating that transmission of the data of the file 15 is completed. After data transmission is complete, the electronic whiteboard may display a transmission completion prompt information. The transmission completion prompt information may be, for example, a transmission progress icon 55 indicating that transmission is completed by 100%.

In some other embodiments, in a process in which the notebook computer obtains the data of the file 15 from the smartphone, the notebook computer generates the transmission progress icon 55 based on a data transmission progress, and displays, by using a projection module in the window d of the electronic whiteboard. interface content including the icon of the file 15 and the transmission progress icon 55.

Figure 7A:
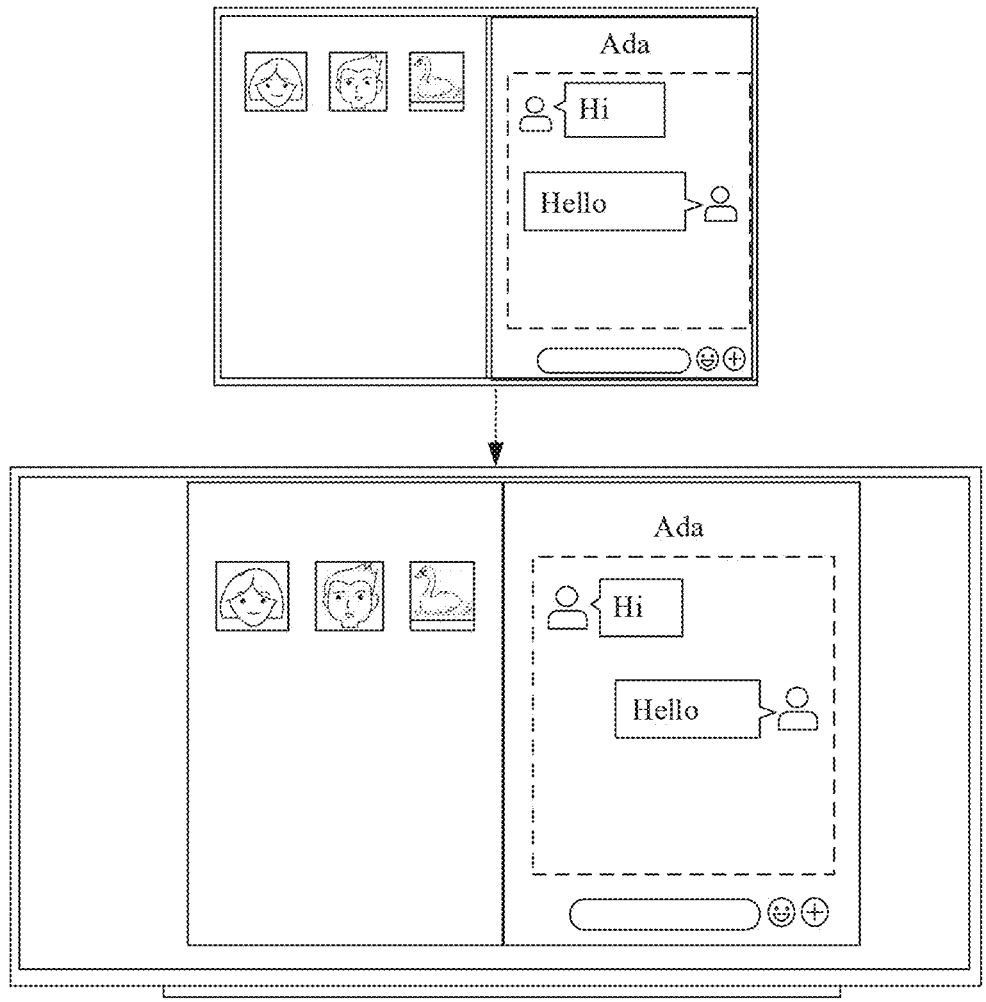
FIG. 7A to FIG. 7E are schematic diagrams of data transmission in a projection scenario 4 according to an embodiment of this application.
Figure 7B:
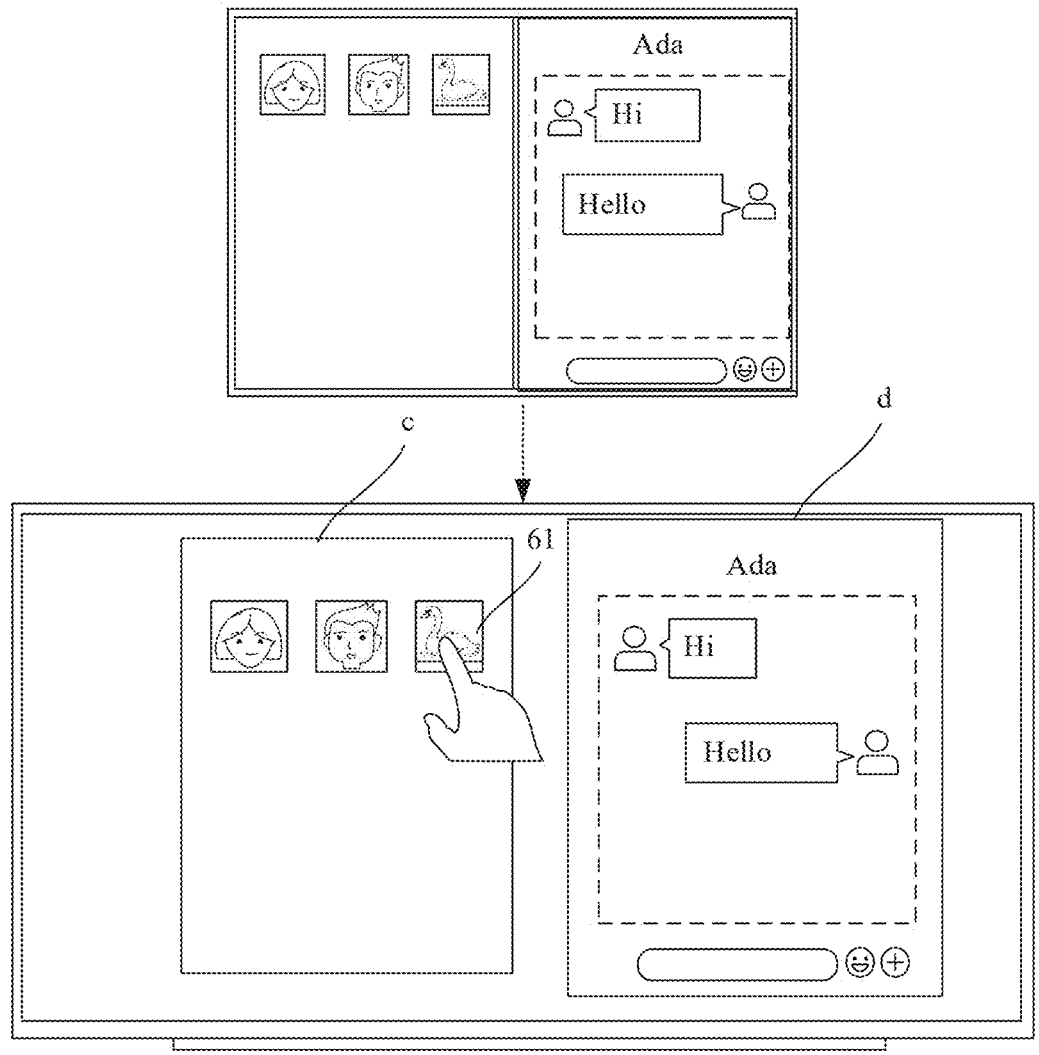

Scenario 4: The tablet computer displays a user interface of "Gallery" and a chat interface of "WeChat" in a split-screen mode. That is, the tablet computer provides two windows. where one window displays the user interface of "Gallery", and the other window displays the chat interface of "WeChat". The tablet computer projects user interfaces displayed in a split-screen mode onto the electronic whiteboard. As shown in FIG. 7A, the electronic whiteboard may provide one window, and a projected interface of the tablet computer is displayed in the window. As shown in FIG. 7B, the electronic whiteboard may alternatively provide two windows, that is, a window c and a window d. The window c displays a projected interface of "Gallery", and the window d displays a projected interface of the chat interface of "WeChat". In this embodiment, data transmission among a plurality of applications in a same device may be implemented by using an operation performed by a user on a destination device.

Figure 7C:
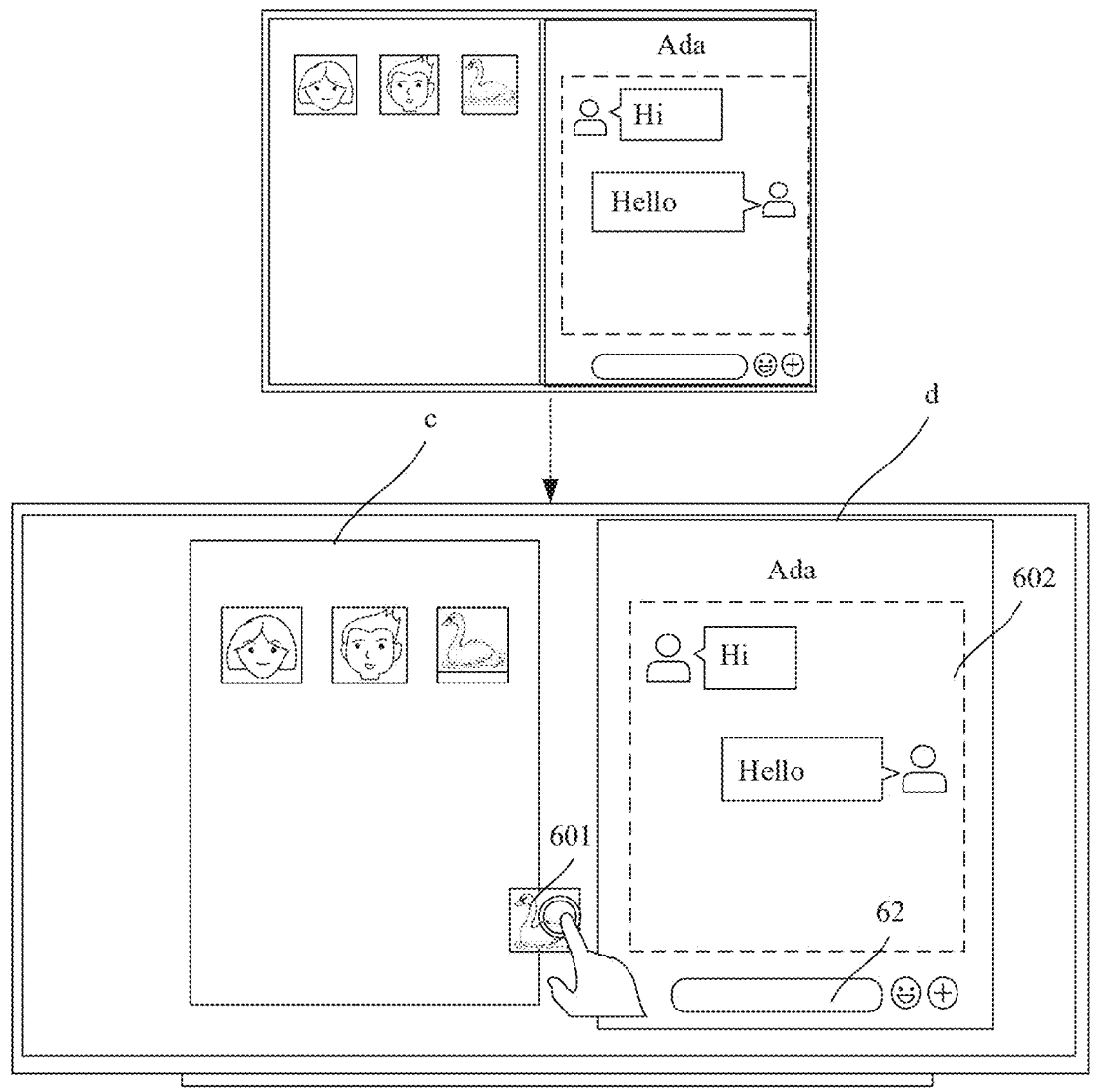
Figure 7D:
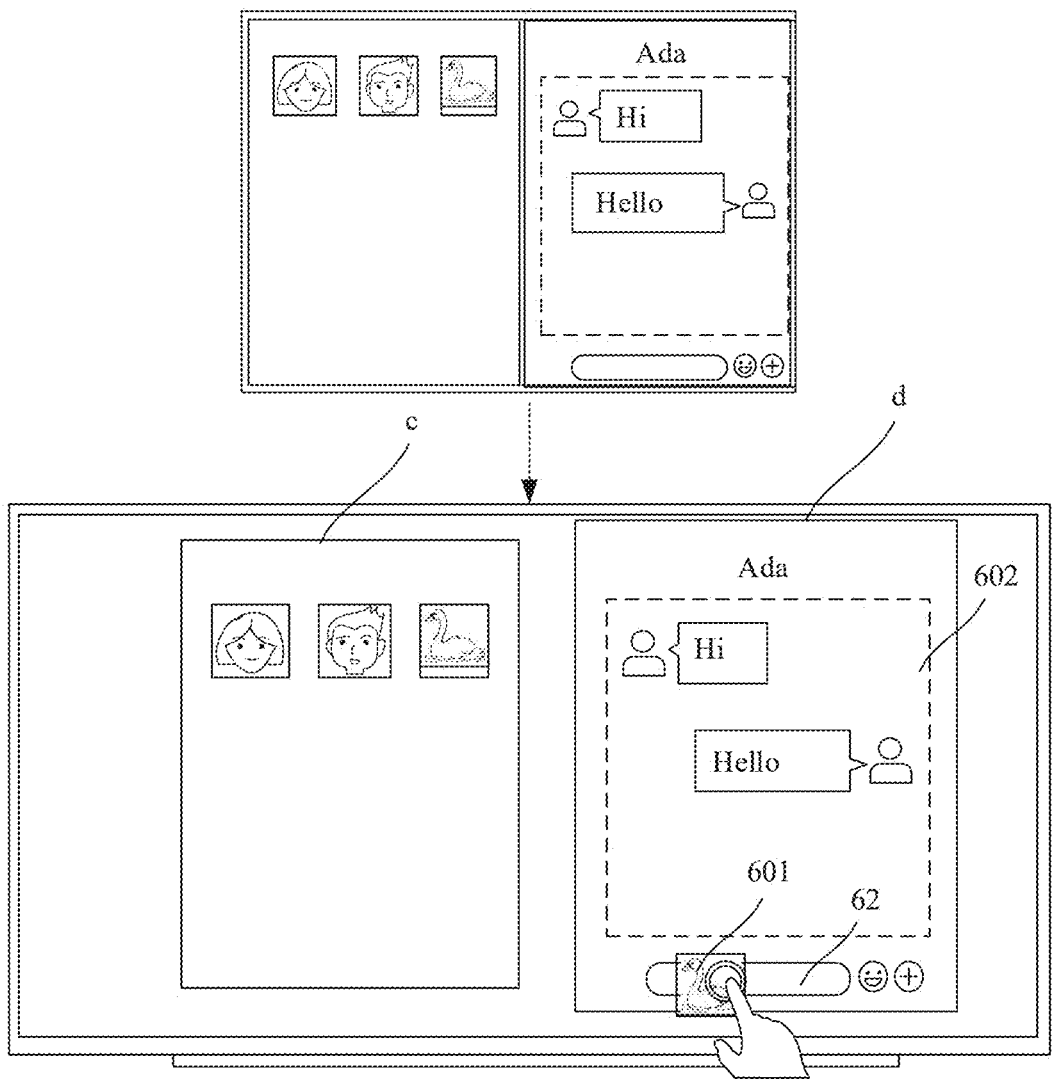

As shown in FIG. 7B, the user long presses a location at which an image 61 is displayed on the electronic whiteboard. The electronic whiteboard obtains a long press instruction. The electronic whiteboard sends the long press instruction to the tablet computer. The tablet computer determines that an application that provides first information is Gallery. Gallery determines, based on coordinates of the long press instruction, that to-be-transmitted first information is the image 61. The tablet computer sends information about the image 61 to the electronic whiteboard. The information about the image 61 may include a name, a size, a format, an access path, and the like of the image After receiving the information about the image 61, the electronic whiteboard generates an image thumbnail 601 based on the image information. As shown in FIG. 7C, the image thumbnail 601 may move with a drag action of the user. As shown in FIG. 7D, when the user drags the image thumbnail 601 from the window c to the window d and then releases the image thumbnail, the electronic whiteboard sends second transmission information to the tablet computer. The second transmission information includes the access path of the image 61. Optionally, the electronic whiteboard sends a release instruction to the tablet computer.

As shown in FIG. 7D, the tablet computer determines, based on the release instruction. that an application for receiving the image 61 is WeChat. WeChat determines, based on coordinates of the release instruction, that a release location of the user is an input box 62.

Figure 7E:
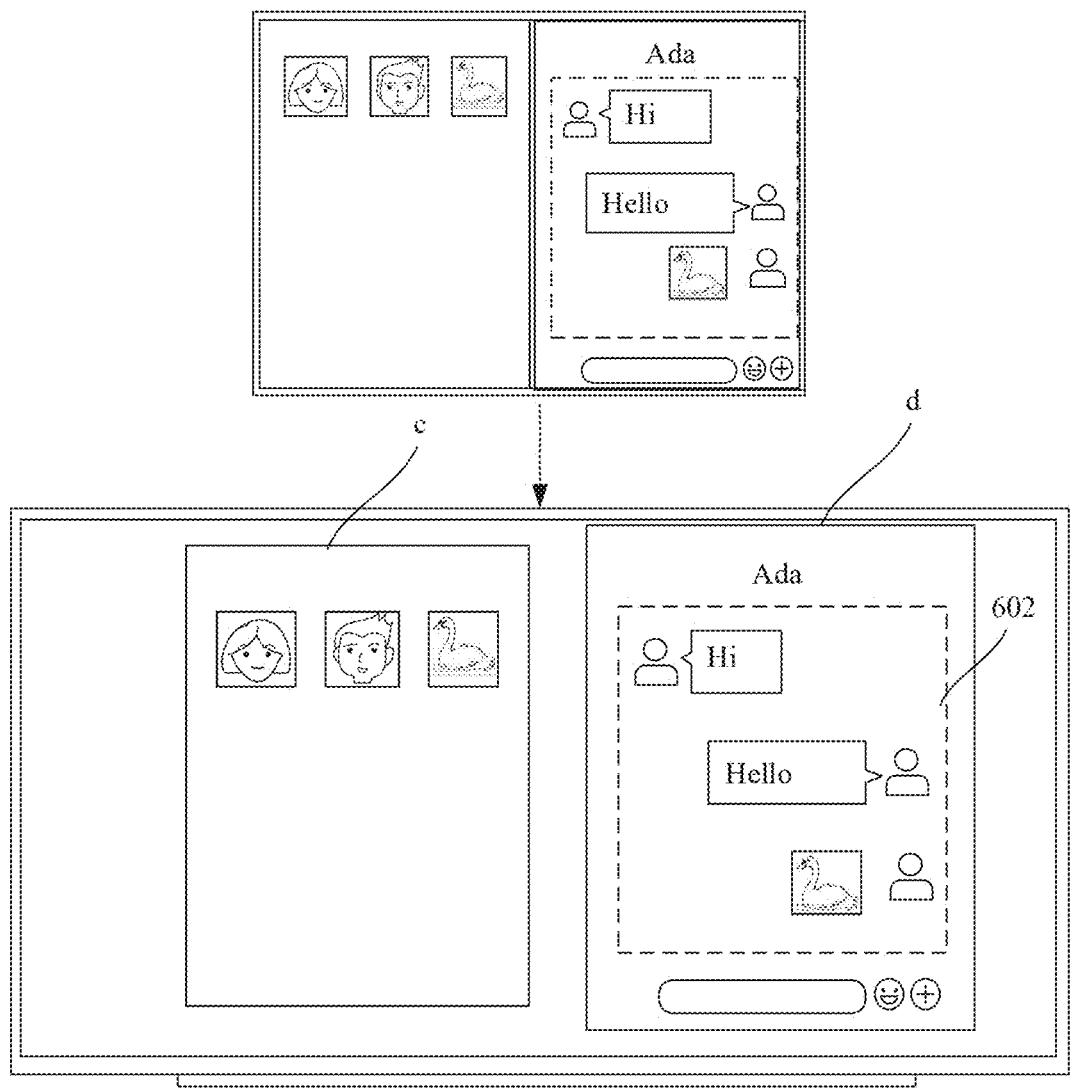

The tablet computer determines, based on the access path of the image 61, that an application that provides the image 61 is Gallery installed on the tablet computer. The tablet computer obtains data of the image 61 from Gallery of the tablet computer, and enters the data as input data into the input box 62 of the chat interface. As shown in FIG. 7E, the image data entered into the input box 62 is sent to a message receiver as a message and displayed in a message display area 602.

In a possible design, when WeChat determines, based on the coordinates of the release instruction, that the release location is in the message display area 602, WeChat determines the input box 62 as a receiving location of the image 61. After obtaining the data of the image 61, WeChat enters the data of the image 61 into the input box 62, and sends the data of the image 61 to the message receiver as a message.

Projection scenario 5: A display of the smartphone displays a user interface of an electronic document. A display of the tablet computer displays a user interface of Memo. The smartphone and tablet computer project the user interfaces displayed on the displays onto the whiteboard. A display of the electronic whiteboard provides a window c and a window d. The window c in the electronic whiteboard displays a projected interface of the smartphone, and the window d displays a projected interface of the tablet computer. In this embodiment, data in an electronic document can be transmitted between source devices by using an operation of an input device on a destination device.

Figure 8A:
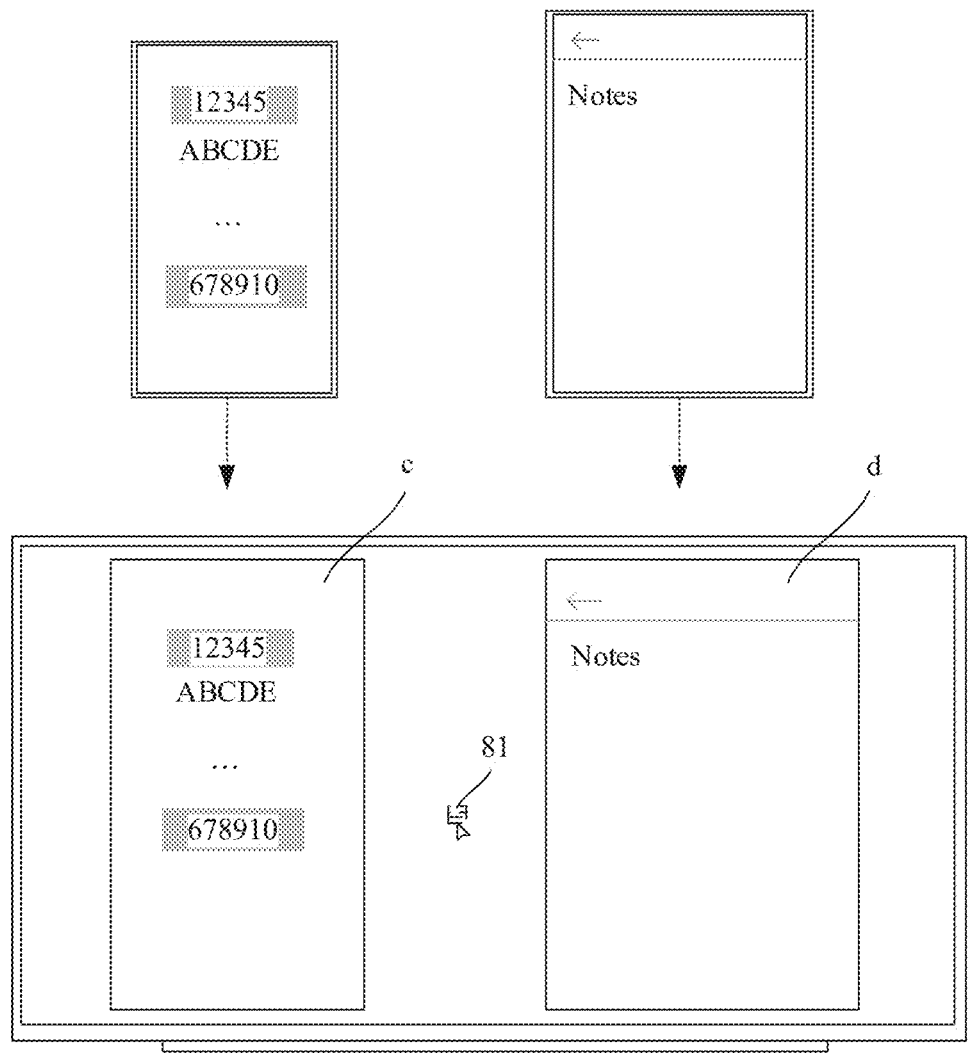
FIG. 8A to FIG. 8D are schematic diagrams of data transmission in a projection scenario 5 according to an embodiment of this application.

As shown in FIG. 8A, the user selects a plurality of segments of content in the electronic document by using a mouse. Specifically, the user presses a left mouse button and then moves and releases the button. The electronic whiteboard receives an input instruction triggered by the mouse operation. The electronic whiteboard sends the input instruction to the smartphone. The smartphone determines selected data content based on coordinates of the input instruction. Optionally, in a process of using the mouse, the user may alternatively select a plurality of segments of content in the electronic document with a keyboard. As shown in FIG. 8A, the smartphone determines, based on the input instruction, that first information is two segments of data: "12345" and "678910". The smartphone highlights the selected data content.

When the electronic whiteboard detects a moving operation of the mouse based on the selection of the content, the electronic whiteboard sends a moving instruction to the smartphone. When the electronic whiteboard detects that a mouse pointer moves to the window d and then is released, the electronic whiteboard sends a release instruction to the tablet computer. Further, the electronic whiteboard further sends an access path of the first information to the tablet computer.

The tablet computer obtains data "12345" and "678910" from the smartphone based on the access path.

Figure 8B:
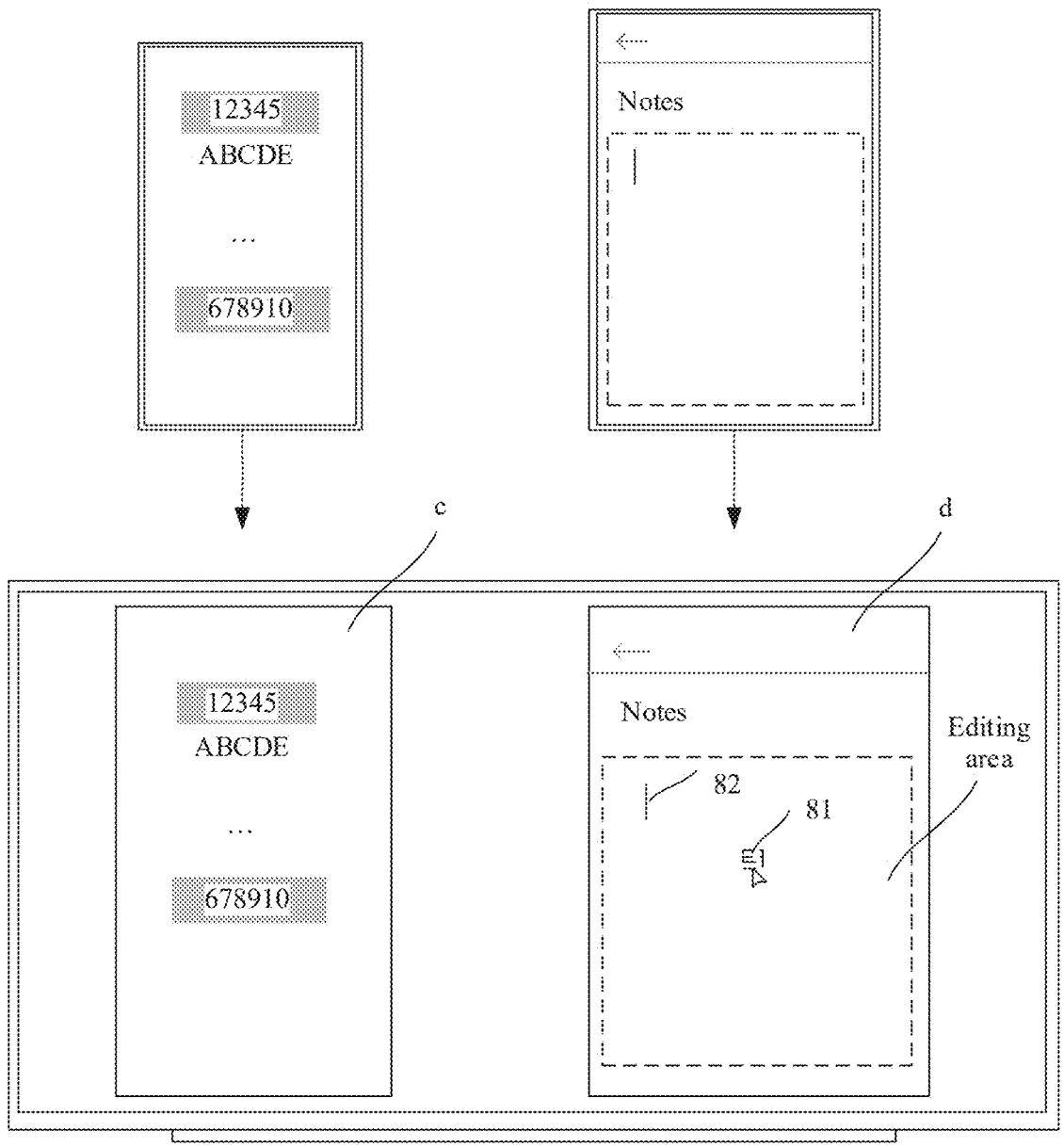

As shown in FIG. 8B, in a process of moving the mouse, the electronic whiteboard displays an icon 81 based on a location of the mouse. When the tablet computer determines, based on coordinates of the release instruction, that a release location is in an editing area of Memo, Memo displays a cursor 82 in the editing area. A location of the cursor 82 is an input location of the first information. Memo may use a location indicated by the coordinates of the release instruction as a display location of the cursor 82. Optionally, Memo may use an input start location of the editing area as the display location of the cursor 82. For example, the editing area of Memo is empty, and a start location of the first row of the editing area may be used as the display location of the cursor 82. For another example, when data already exists in the editing area of Memo, Memo may use a start location of a next row of the existing data as the display location of the cursor 82. Alternatively, Memo may use an end of the existing data as the display location of the cursor 82. That is, data obtained by the smartphone may be entered at the end of the existing data.

Figure 8C:
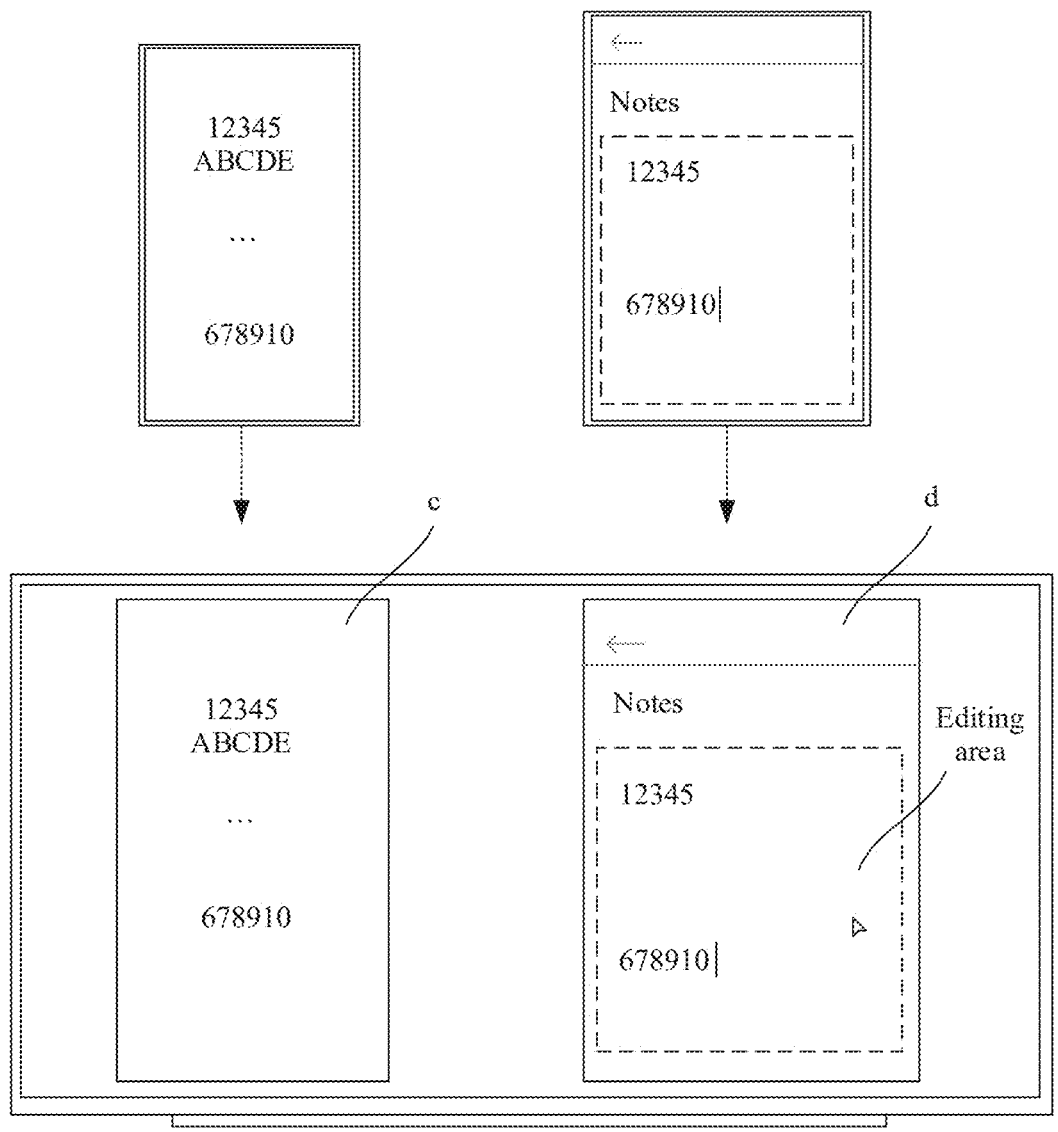

As shown in FIG. 8B, the editing area of Memo is empty. In this case, the start location of the first row of the editing area may be used as the display location of the cursor 82. In this embodiment, Memo obtains two segments of data: "12345" and "678910". As shown in FIG. 8C, Memo may display the two segments of data by segments in the editing area of Memo based on format information of the two segments of data in the electronic document. It may be understood that, when a plurality of segments of selected data are data of different types, a plurality of segments of received data may be displayed in Memo based on an original format of the received data and/or a format requirement of the editing area of Memo. For example, if the plurality of segments of data received by Memo include a text, a table, and an image, Memo may display the text, the table, and the image in Memo based on formats of the text, the table, and the image in the electronic document. Alternatively, Memo may display the received text, table, and image based on a format setting of Memo.

Figure 8D:
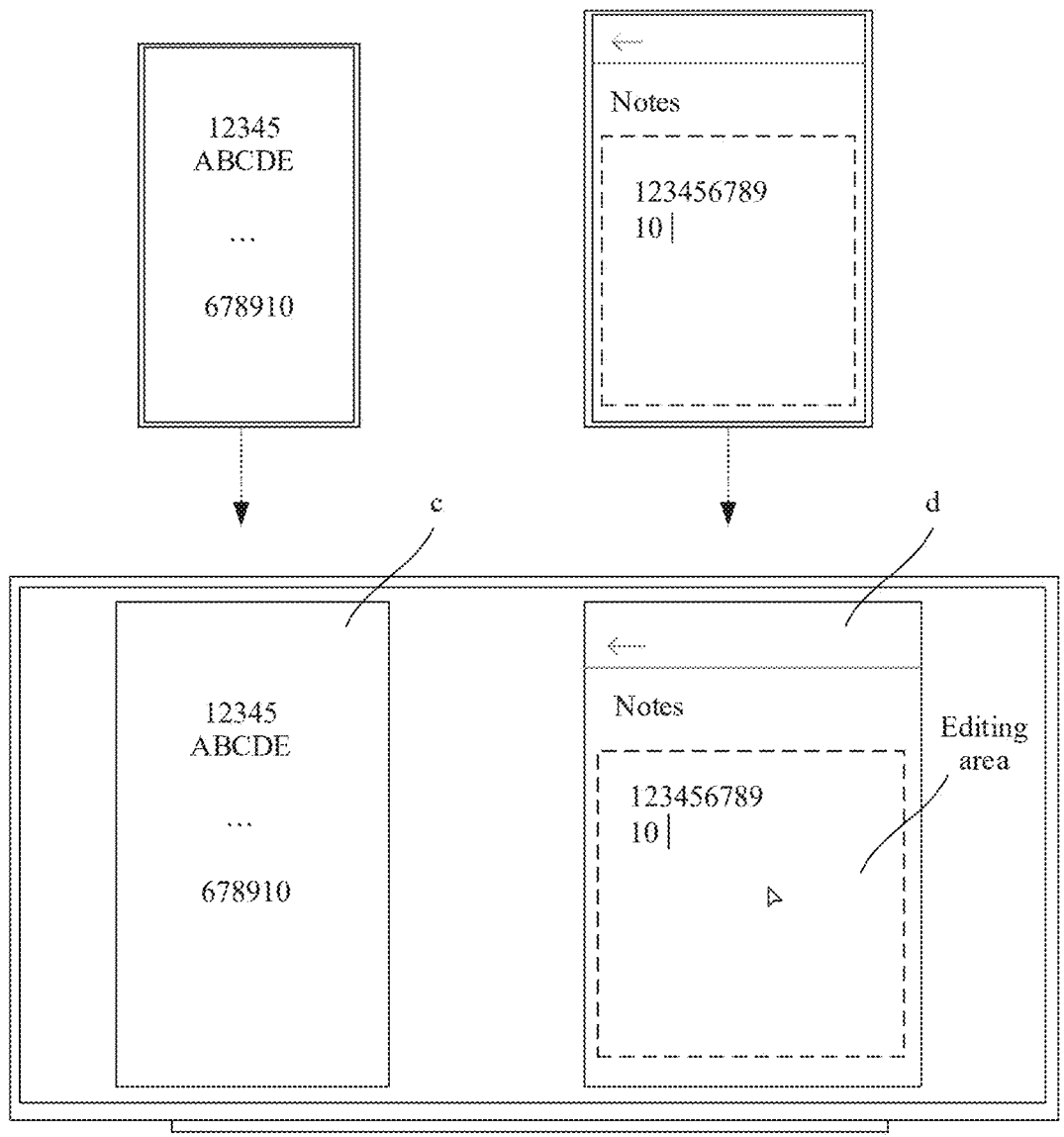

Optionally, Memo may stitch and display the two segments of received texts. As shown in FIG. 8D, after "12345" is entered and displayed. Memo uses an end of "12345" as an input location of "678910", and enters and displays "678910". Specifically, before stitching a plurality of segments of data, Memo may determine whether the plurality of segments of data support stitching, and if the plurality of segments of data do not support stitching, the plurality of segments of data may be displayed in rows. A rule about whether the plurality of segments of data support stitching may be preset. For example, data of a text type can be set to supporting stitching. For example, data of an image type is set to not supporting stitching. When a plurality of pieces of image data are received, after one image is displayed, another image is displayed in a next row of the image. For another example, if received data includes a text and an image, text content may be set to supporting stitching, and the image may be set to not supporting stitching. For another example, if received data includes a text and an image, the text and the image may be set to not supporting stitching. It may be understood that the foregoing is only an example of a display manner of a plurality of segments of data. How the plurality of segments of data are displayed in Memo, whether the plurality of segments of data support stitching, and a manner of stitching may be set based on an actual requirement. This is not specifically limited in this embodiment.

Projection scenario 6: In this projection scenario, a plurality of electronic devices are projected onto the electronic whiteboard. Data may be transmitted among a plurality of groups of source devices by using a gesture operation of a user on the electronic whiteboard.

Figure 9A:
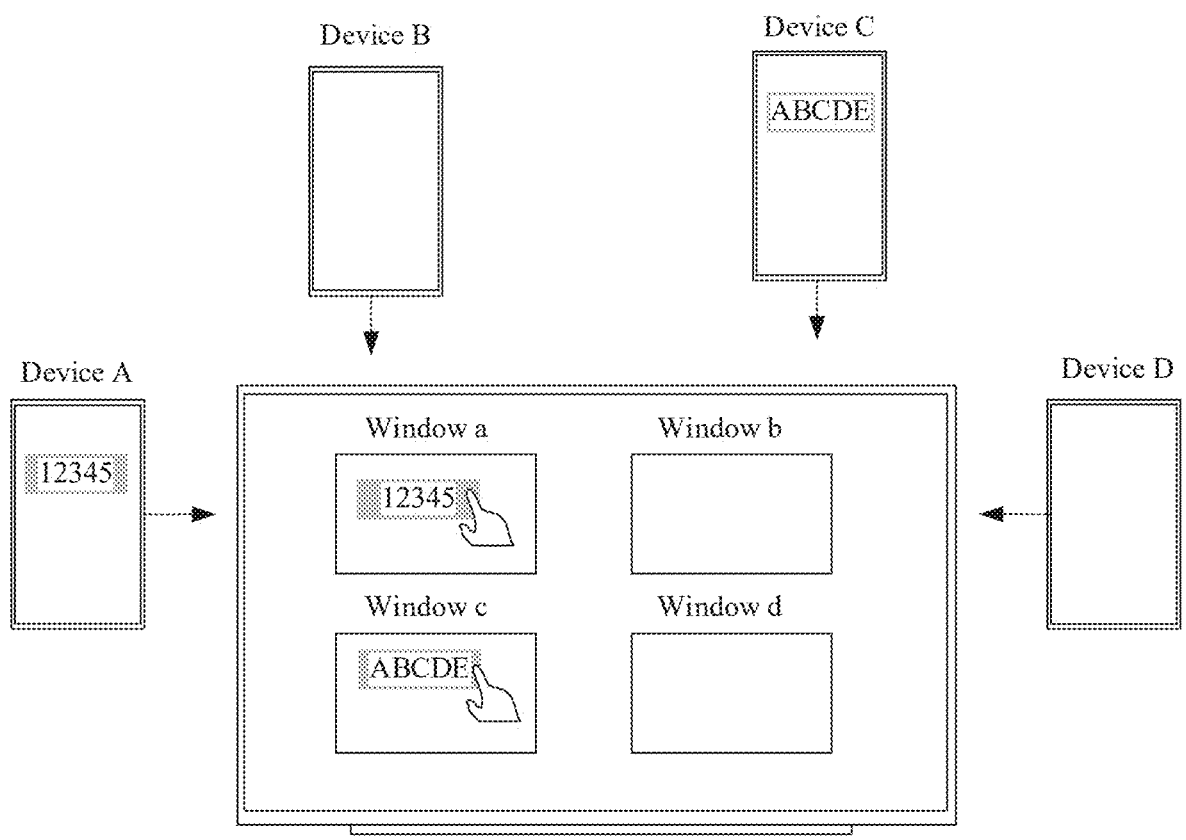
FIG. 9A to FIG. 9E are schematic diagrams of data transmission in a projection scenario 6 according to an embodiment of this application.

As shown in FIG. 9A, a device A, a device B, a device C, and a device D are projected onto the electronic whiteboard.

Figure 9B:
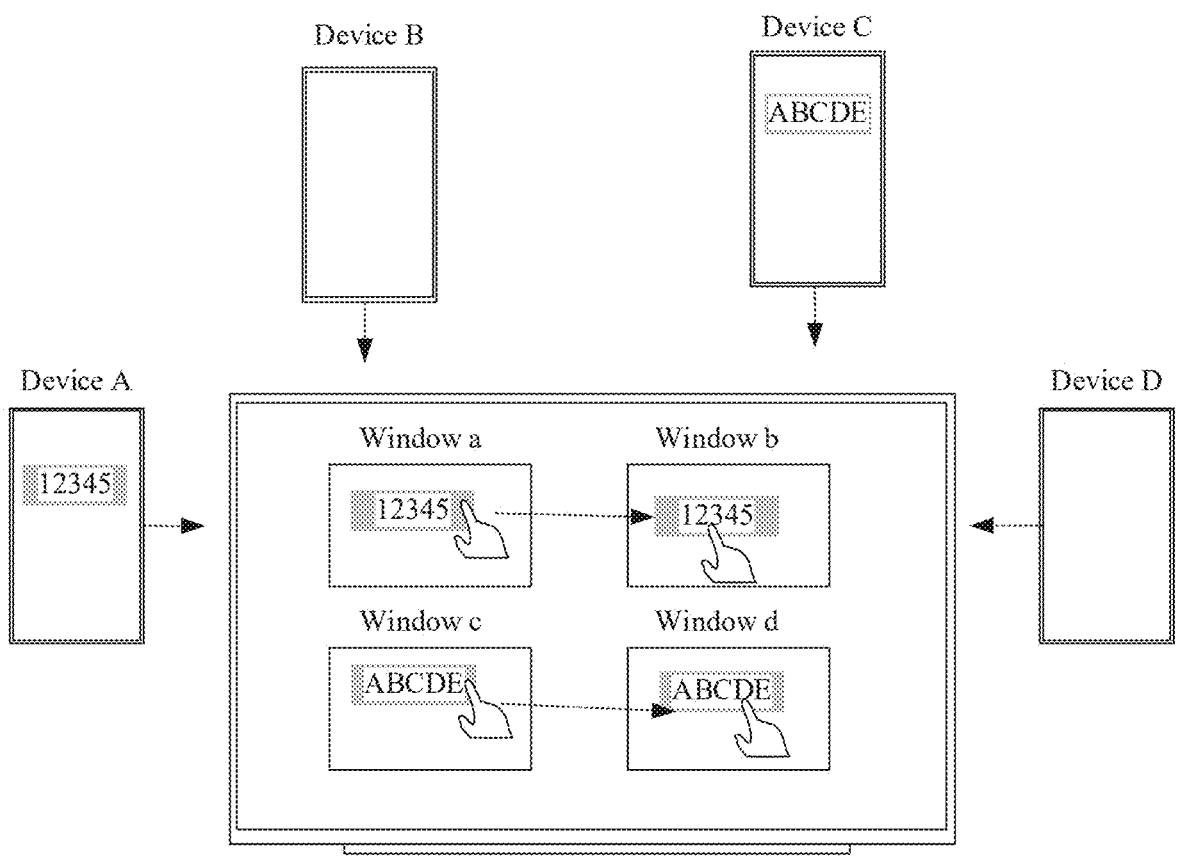
Figure 9C:
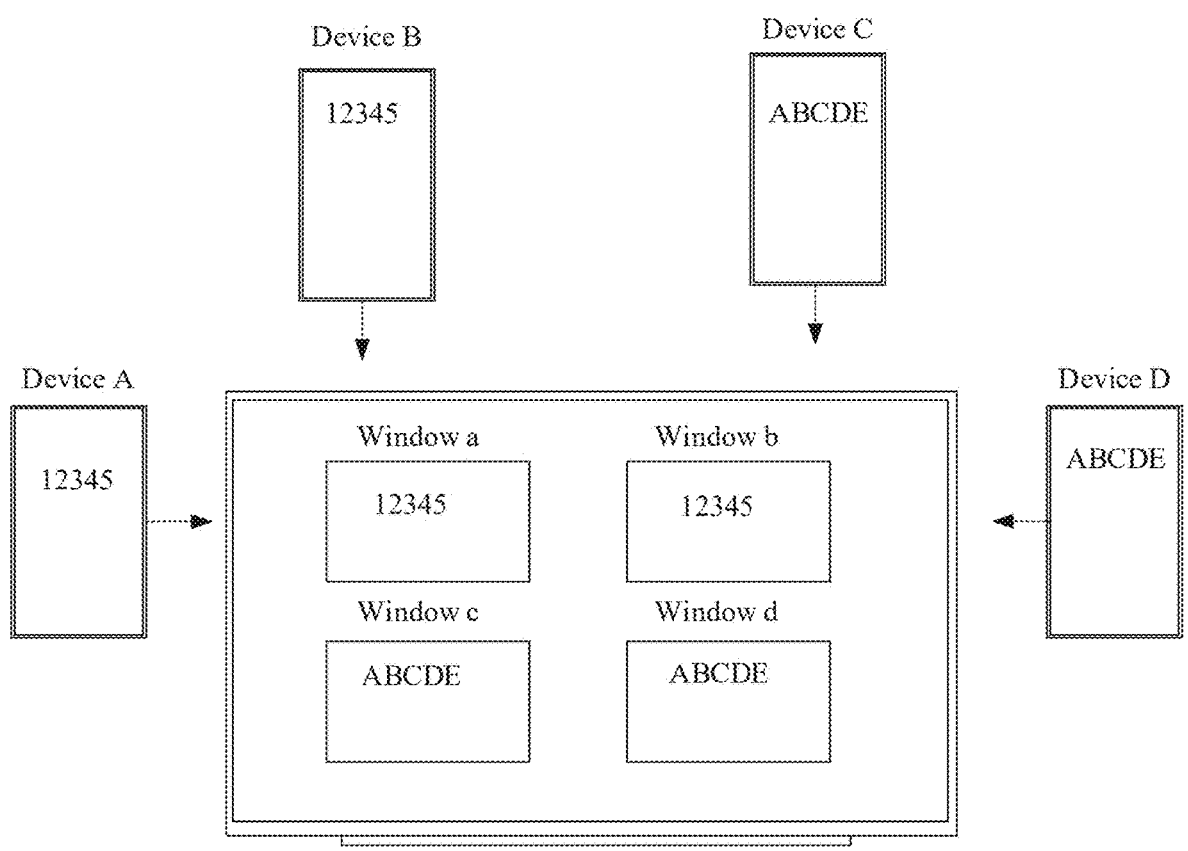

The electronic whiteboard provides a window a, a window b, a window c, and a window d. The window a displays a projected interface of the device A. The window b displays a projected interface of the device B. The window c displays a projected interface of the device C. The window d displays a projected interface of the device D. "12345" is displayed in the projected interface of the device A, and "ABCDE" is displayed in the projected interface of the device C. In this scenario, the user may separately trigger a long press instruction in the window a and the window c. The electronic whiteboard sends the long press instruction triggered in the window a and coordinates to the device A. The electronic whiteboard sends the long press instruction triggered in the window c and coordinates to the device C. As shown in FIG. 9B, on this basis, the user may perform an action of dragging from the window a to the window b and releasing based on long pressing on the window a. The user may perform an action of dragging from the window c to the window d and releasing based on long pressing on the window c. The electronic whiteboard sends a release instruction triggered by a release action acting on the window b and coordinates to the device B. The electronic whiteboard sends a release instruction triggered by a release action acting on the window d and coordinates to the device D. As shown in FIG. 9C. the device B and the device D respectively obtain data from the device A and the device B based on received release instructions and coordinates, and display the data. In this projection scenario. the device A, the device B, the device C, and the device D are divided into a plurality of groups, and data may be transmitted among the plurality of groups of devices by using the electronic whiteboard. In addition, data transmission between the plurality of groups of devices may be performed synchronously.

Figure 9D:
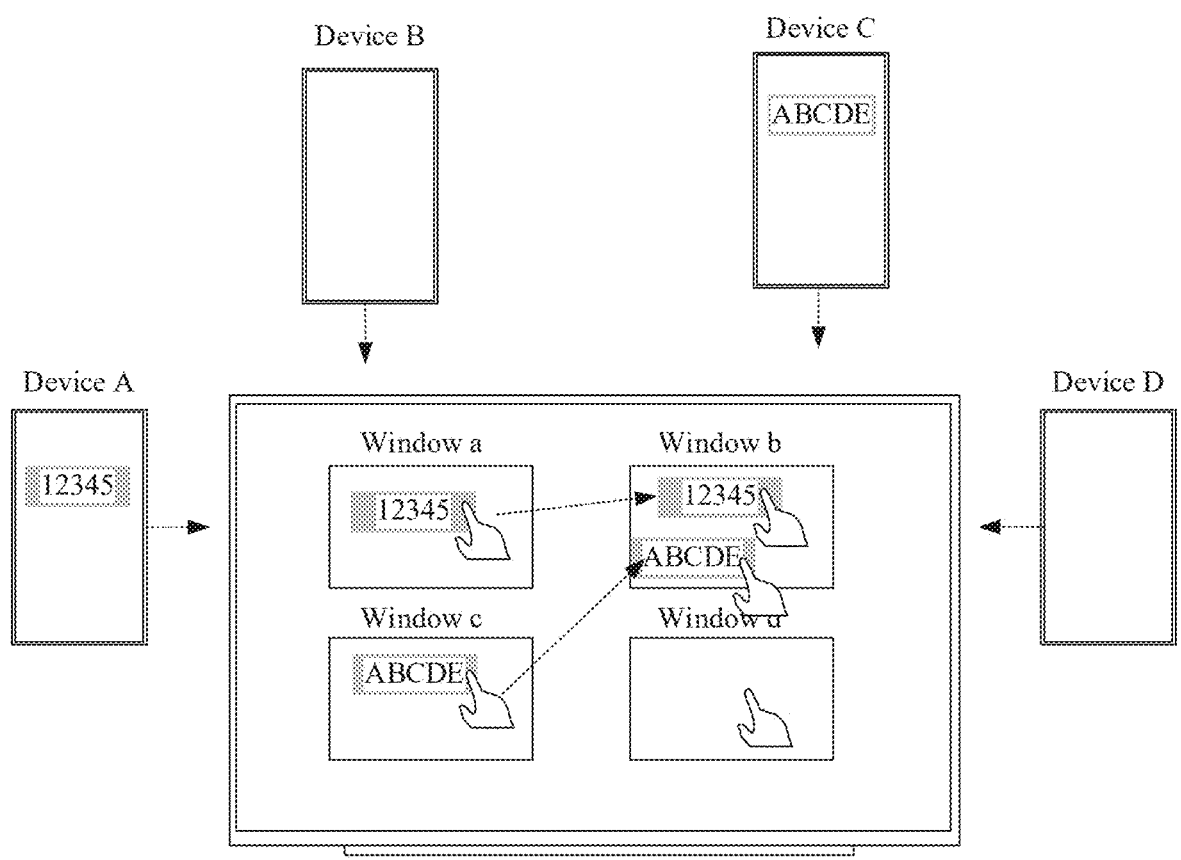
Figure 9E:
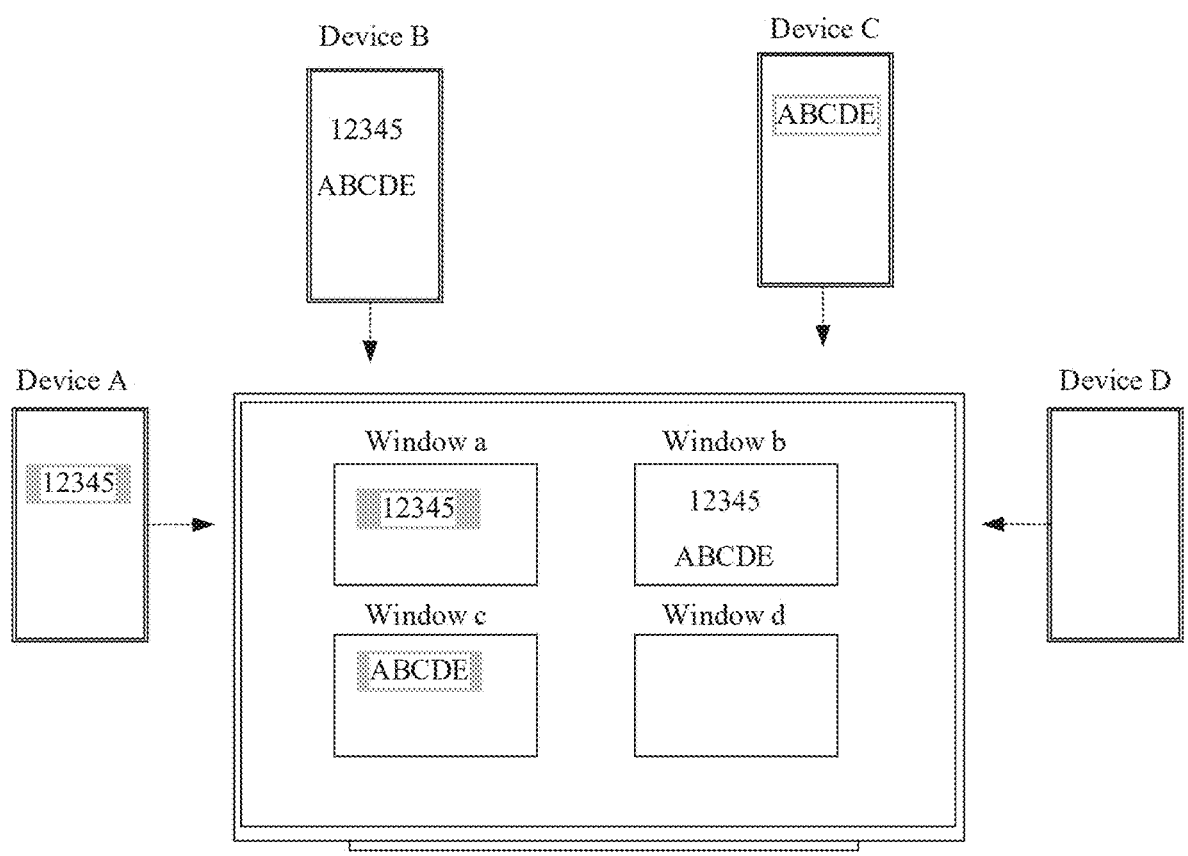

Based on the projection scenario shown in FIG. 9A, in addition to data transmission among the plurality of groups of devices, data of the plurality of devices may be further transmitted to a same device. As shown in FIG. 9D, the user may trigger long press instructions in the window a and the window e at approximately the same time. The electronic whiteboard sends the long press instruction triggered in the window a and coordinates to the device A. The electronic whiteboard sends the long press instruction triggered in the window c and coordinates to the device C. Based on this, the user may perform a first drag action from the window a to the window b based on long pressing on the window a, and perform a first release action on the window b based on the first drag action. At approximately the same time, the user performs a second drag action from the window c to the window b based on long pressing on the window c, and performs a second release action on the window b based on the second drag action. The electronic whiteboard may send a first release instruction and a second release instruction that are respectively triggered by the first release action and the second release action to the device B. The electronic whiteboard may include the first release instruction in first transmission information, and include the second release instruction in second transmission information. The electronic whiteboard sends the first transmission information and the second transmission information to the device B. Alternatively, the electronic whiteboard may include the first release instruction and the second release instruction in a same piece of transmission information and send the transmission information to the device B. The device B separately obtains data from the device A and the device C based on the transmission information. The device B displays, in a projection display application, the data "12345" and "ABCDE" obtained from the device A and the device C. As shown in FIG. 9E, the device B may determine, based on coordinates of the first release instruction, that the coordinates are located in the m' row of an editing area. The device B uses a start location of the $m^{th}$ row as an input location of the data "12345". Similarly, the device B determines, based on coordinates of the second release instruction, that the coordinates are located in the $n^{th}$ row of the editing area. The device B uses a start location of the $n^{th}$ row as an input location of the data "ABCDE".

In another possible design, the device B may alternatively determine, based on a time sequence of receiving "12345" and "ABCDE", a sequence of displaying "12345" and "ABCDE". For example, the device B first receives "ABCDE", and then receives "12345". In this case, the device B may enter "ABCDE" in a start location of the first low in the editing area. The device B enters "12345" at an end of "ABCDE" or in a row next to "ABCDE".

Figure 10A:
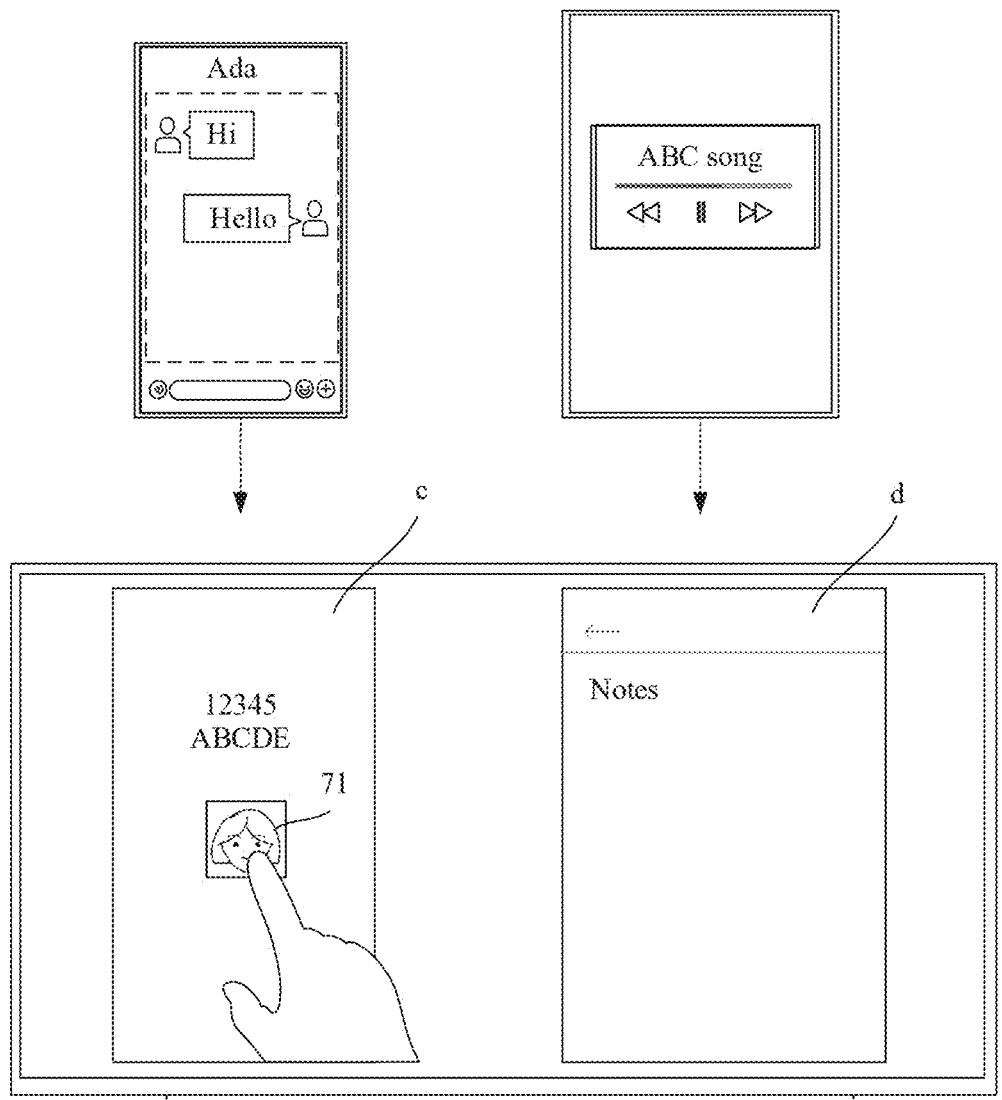
FIG. 10A to FIG. 10D are schematic diagrams of data transmission in a projection scenario 7 according to an embodiment of this application.

Scenario 7: In this scenario, the smartphone and the tablet support a plurality of working modes. After the smartphone and the tablet computer each project an application interface in a first working mode onto the electronic whiteboard, the smartphone and the tablet computer may switch to a second working mode. As shown in FIG. 10A, the smartphone projects a user interface of an electronic document onto the electronic whiteboard. A WeChat chat interface is displayed on the smartphone. The electronic document runs in a background of the smartphone. Similarly, the tablet computer projects a user interface of Memo onto the electronic document, and the tablet computer displays a music playback interface. Memo runs in a background of the tablet computer. The electronic whiteboard provides a window c and a window d. The window c displays the user interface of the electronic document projected by the smartphone. The window d displays the user interface of Memo projected by the tablet computer.

Figure 10B:
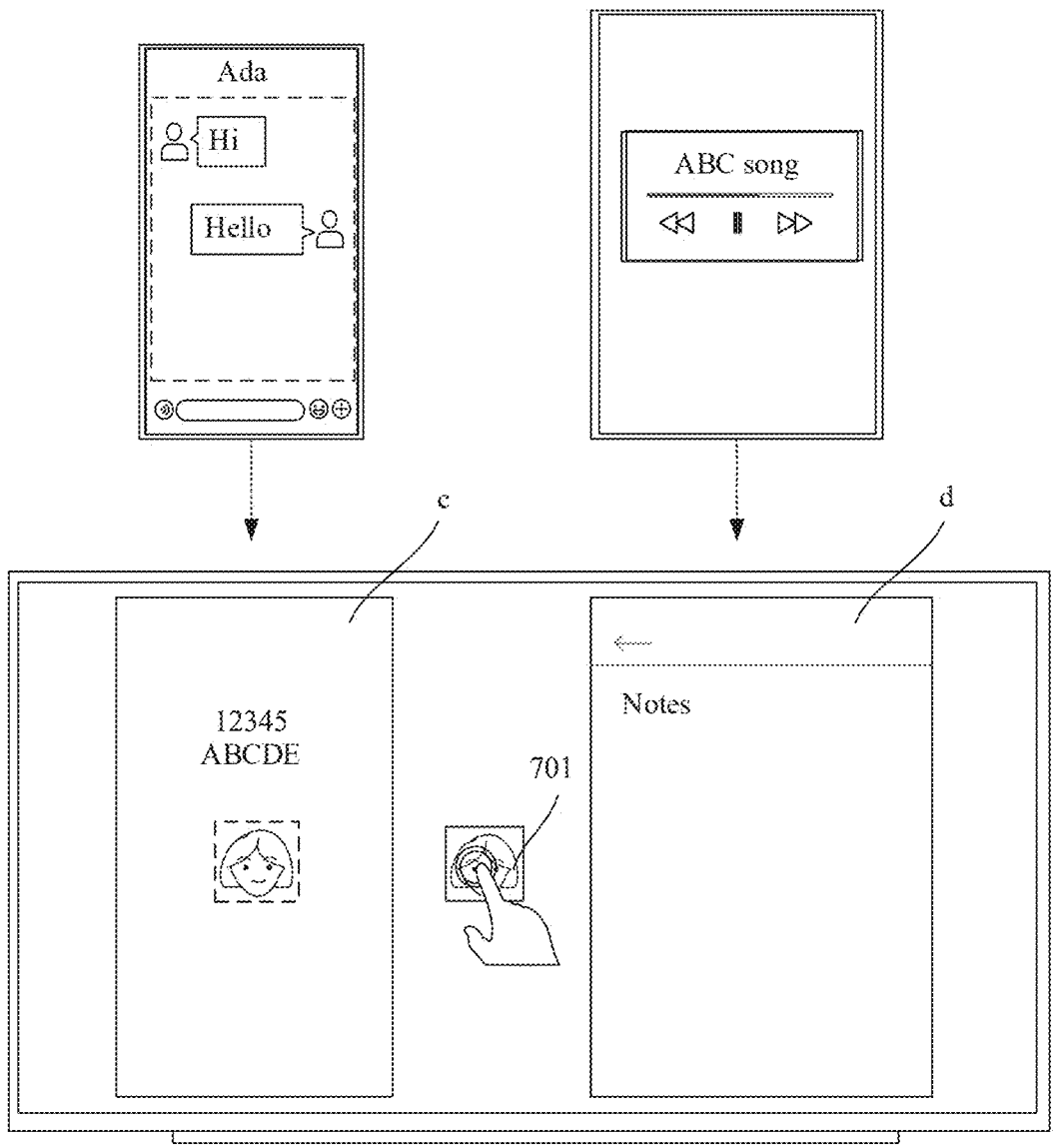
Figure 10C:
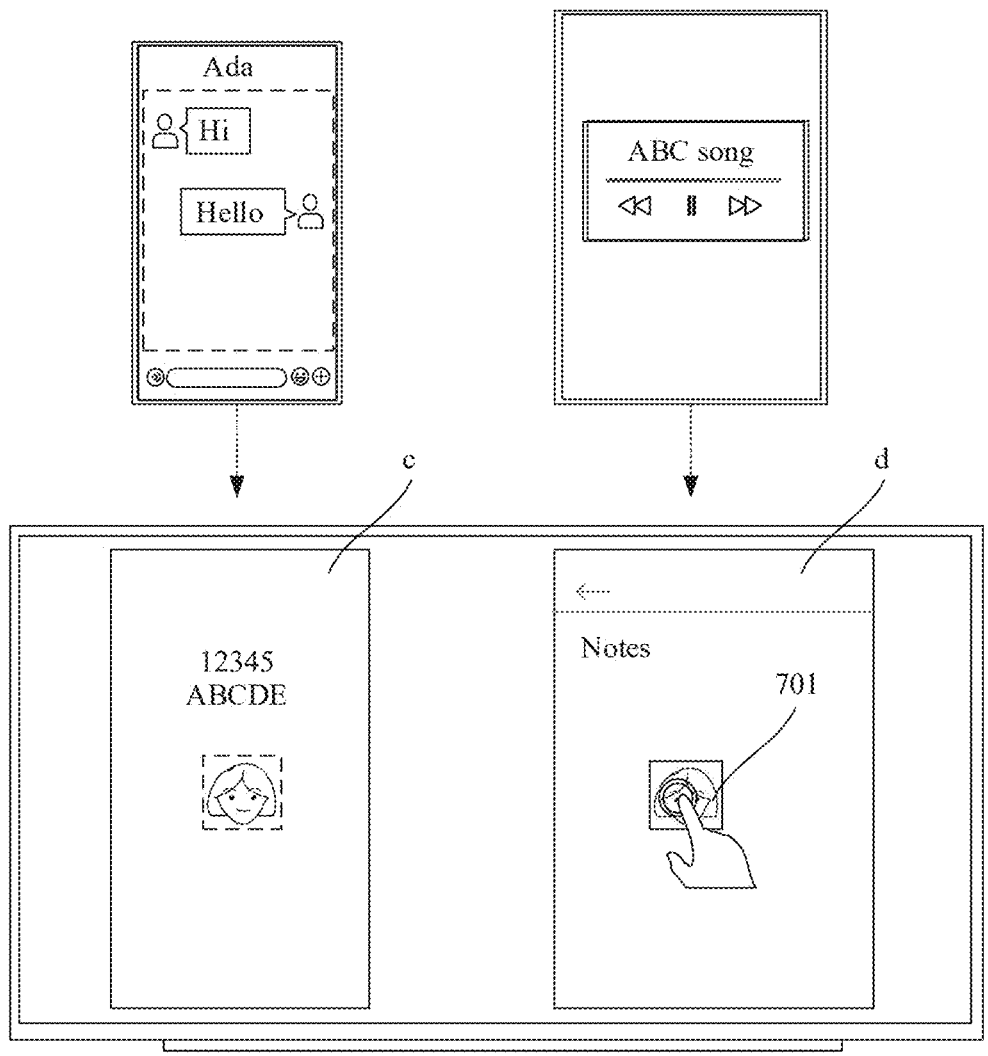
Figure 10D:
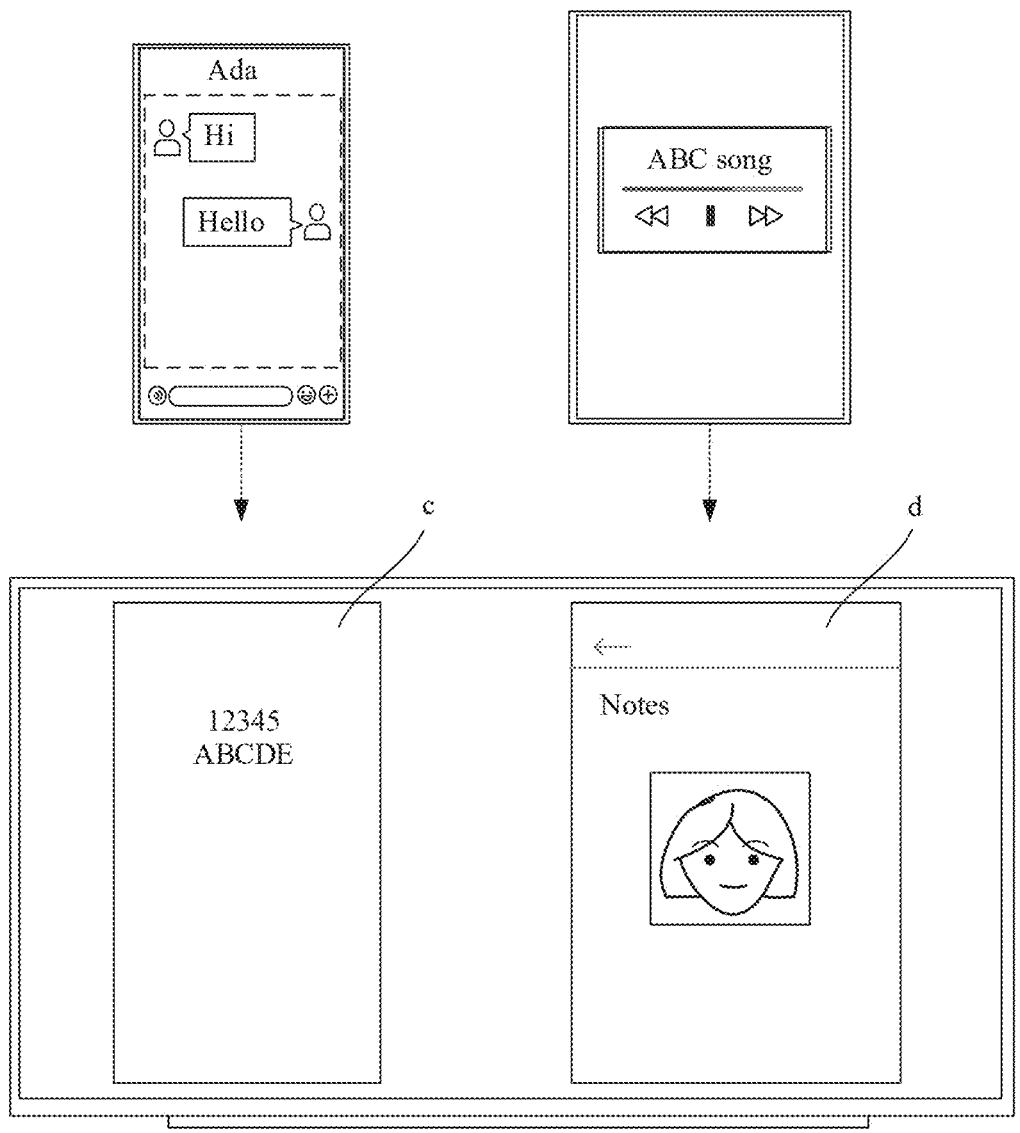

As shown in FIG. 10A, when a user performs a gesture operation to long press at a location of an image 71 of the electronic whiteboard, the electronic whiteboard sends a long press instruction to the smartphone. The smartphone provides the long press instruction for the electronic document running in the background. The electronic document determines, by using the long press instruction, that the user selects the image 71. As shown in FIG. 10B, the image 71 in the electronic document is in a selected state. The selected state may be, for example, that a border of the image 71 is displayed as a dashed line. In addition, the electronic document further generates an image thumbnail 701 of the image 71. The image thumbnail 701 may move with a drag action of the user. As shown in FIG. 10C, when the user drags the image thumbnail 701 and releases the image thumbnail 701 in the window d, the electronic whiteboard sends a release instruction to the tablet computer. The tablet computer sends the release instruction to Memo that runs in the background. Memo determines, based on coordinates of the release instruction, a location of entering image data. When obtaining icon data from the smartphone, the tablet computer provides the image data for Memo. Memo enters the image data in the editing area, and projects a user interface that displays the image data onto the electronic whiteboard. As shown in FIG. 10D, after Memo successfully displays the image in the editing area, the tablet computer sends a message indicating a receiving success to the smartphone. The smartphone sends the message indicating a receiving success to the electronic document. After obtaining the message indicating a receiving success, the electronic document deletes the image 71 from the electronic document. Optionally, if the tablet computer fails to receive the image 71, the electronic document may remove the selected state of the image 71 and continue to display the image 71.

Figure 11A:
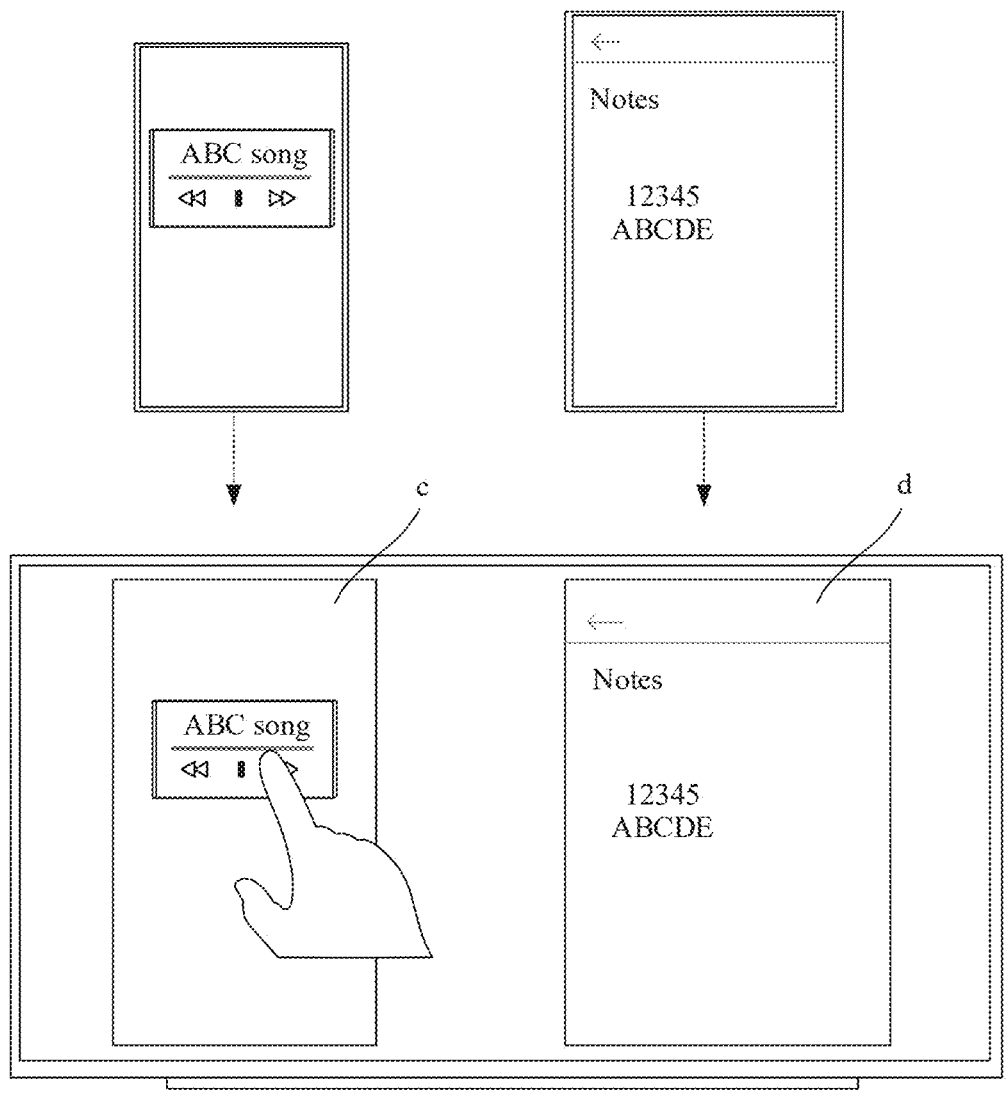
FIG. 11A to FIG. 11D are schematic diagrams of data transmission in a projection scenario 8 according to an embodiment of this application.
Figure 11B:
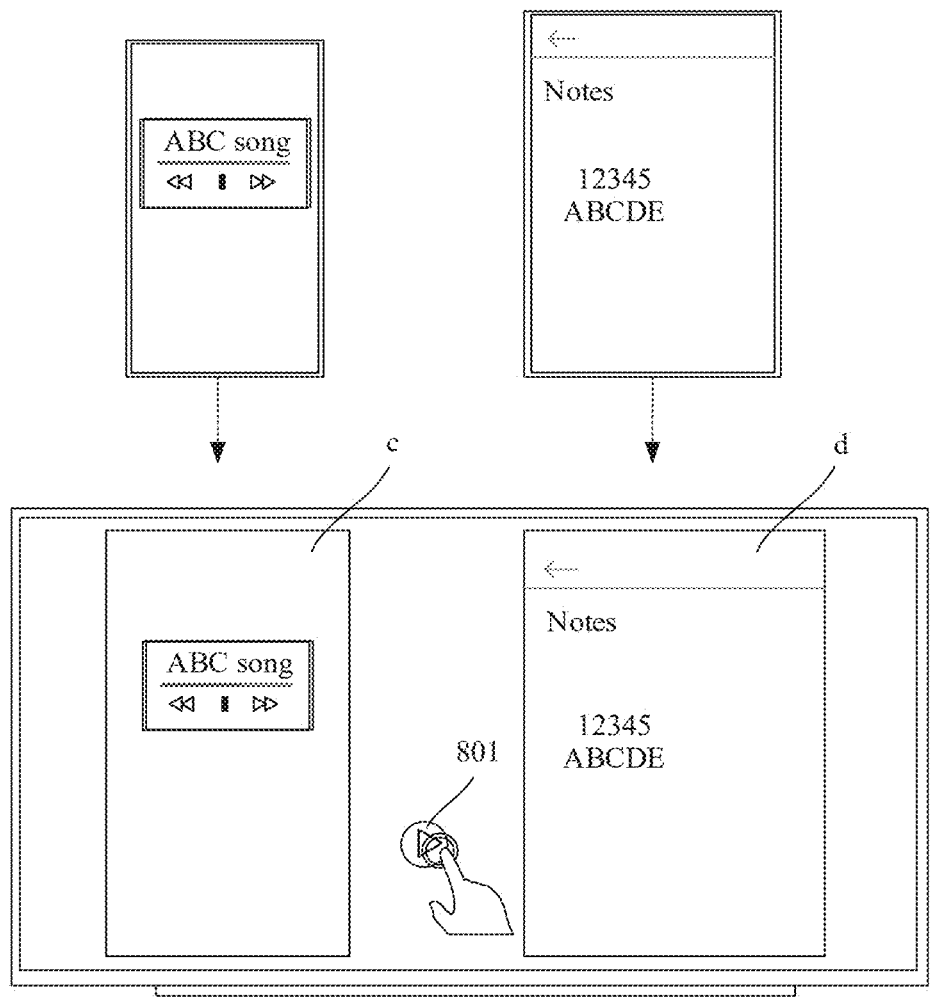
Figure 11C:
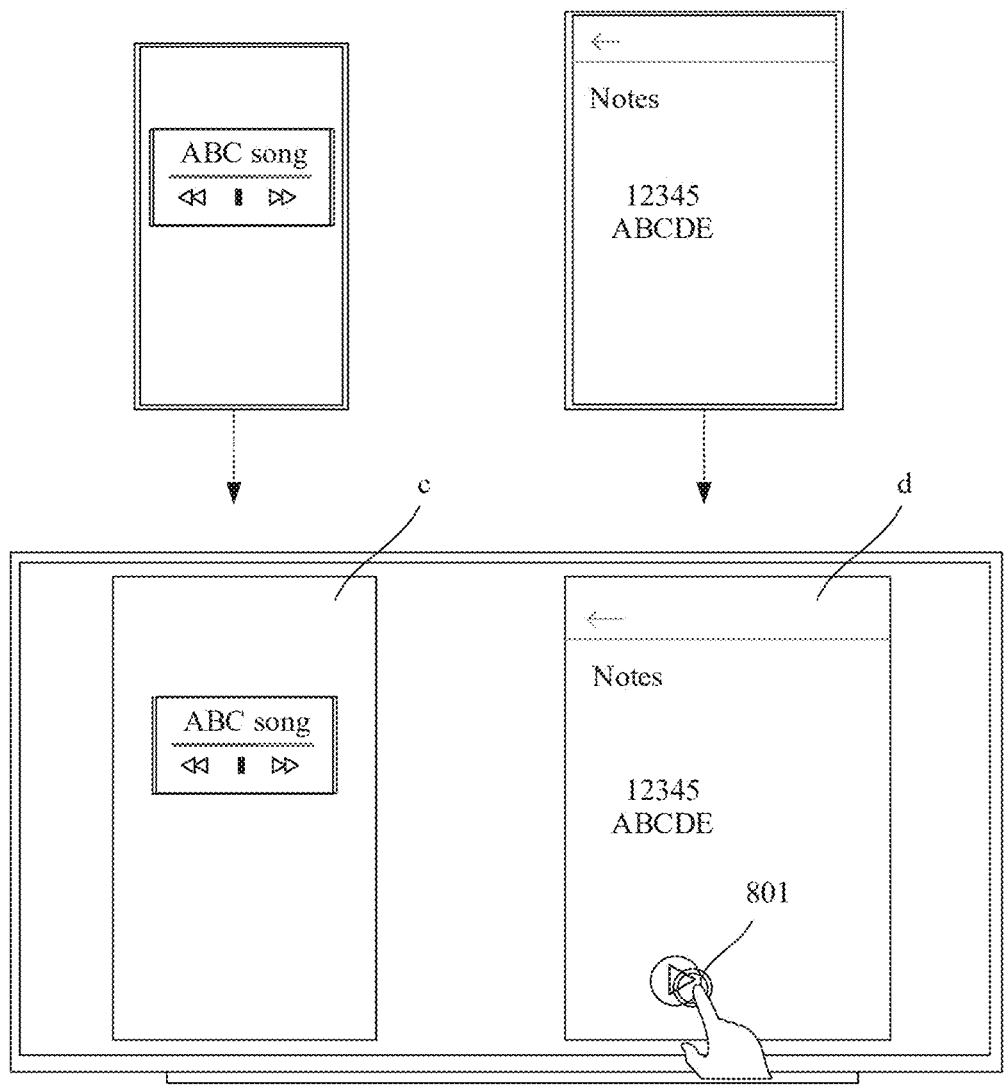
Figure 11D:
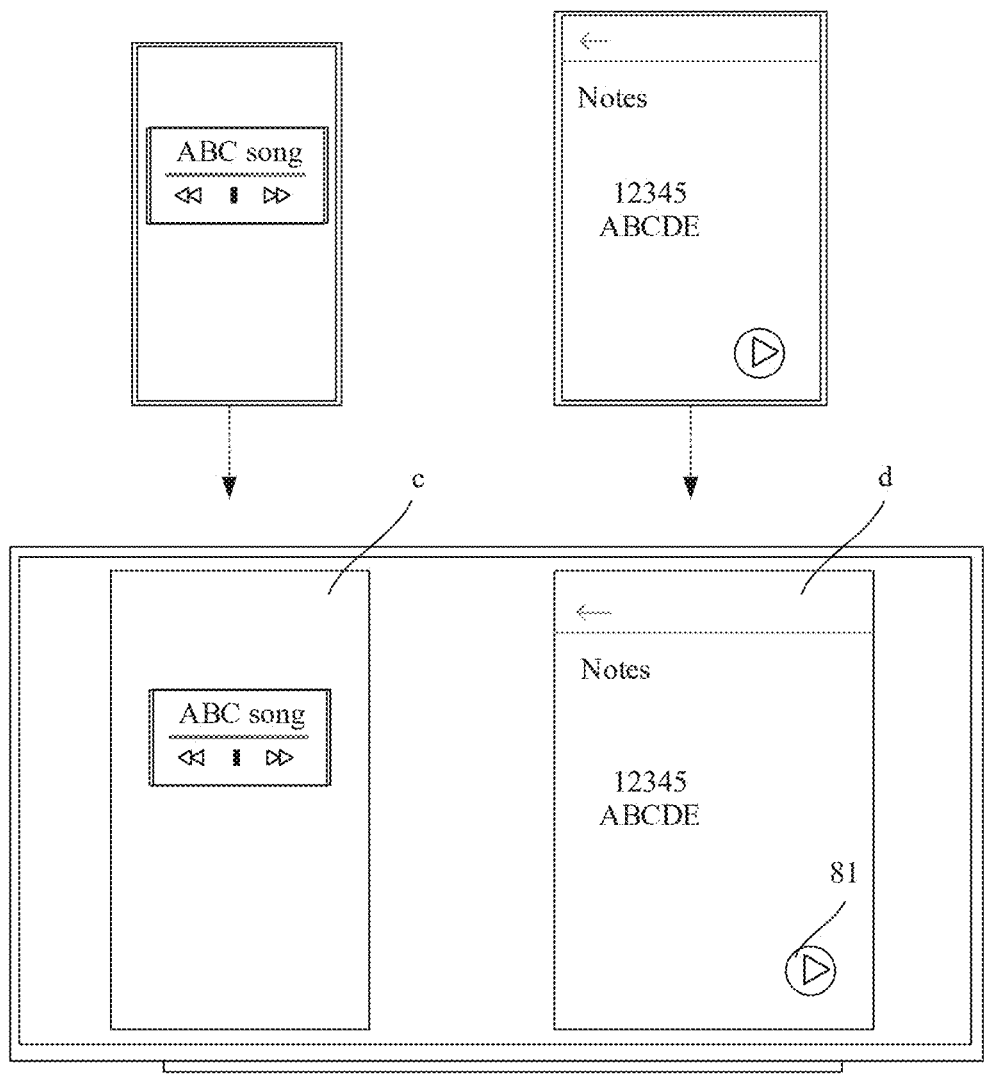

Projection scenario 8: In this projection scenario, as shown in FIG. 11A, the smartphone projects a music playback interface onto the electronic whiteboard. The tablet computer projects an interface of Memo onto the electronic whiteboard. The electronic whiteboard provides a window c and a window d. The window c displays the music playback interface projected by the smartphone. The window d displays the interface of Memo projected by the smartphone. When a user long presses the music playback interface on the window c of the electronic whiteboard, the electronic whiteboard sends a long press instruction to the smartphone. The smartphone determines that a long press action of the user acts on an interface of currently played music. The smartphone sends the long press instruction to a music application. The music application determines link information of the currently played music. The smartphone sends the link information to the electronic whiteboard. As shown in FIG. 11B, a music icon 801 is displayed in the electronic whiteboard. The music icon 801 may move with a drag action of the user. As shown in FIG. 11C, when the electronic whiteboard detects that the drag action of the user is released on the window d, the electronic whiteboard determines that the link information of the music needs to be sent to the tablet computer. After receiving the link information of the music, the tablet computer opens a corresponding application based on the link information of the music and plays corresponding music. As shown in FIG. 11D, the tablet computer may display a music control 81 in a foreground, and play music in a background. Optionally, the tablet computer may alternatively switch current Memo to the background. The tablet computer displays the music application as a foreground application and plays music. According to the method in this embodiment, audio and video data may be transmitted from one device to another device for playing by using an operation performed by the user on the electronic whiteboard.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A first electronic device comprising:
   a memory configured to store instructions; and
   one or more processors coupled to the memory and configured to execute the instructions to cause the first electronic device to:
   display a first projected interface of a second electronic device using a first window;
   display a second projected interface of a third electronic device using a second window;
   display a third projected interface of a fourth electronic device using a third window;
   simultaneously detect a first input instruction that acts on first information in the first window and a second input instruction that acts on second information in the second window, wherein the first and second input instructions include a tap and drag operation that acts on the first and second information and a release operation of the first and second information in the third window;
   send a third input instruction to the fourth electronic device based on the first and second input instructions, wherein the third input instruction instructs the fourth electronic device to obtain the first and second information; and
   display the first and second information in the third window based on a time sequence of receiving the first and second information.

2. The first electronic device of claim 1, wherein the tap operation includes a long press instruction triggered by a long press gesture, wherein the drag operation includes a drag instruction triggered by a drag gesture, and wherein the release operation includes a release instruction triggered by a release gesture.

3. The first electronic device of claim 1, wherein the one or more processors coupled to the memory and configured to execute the instructions to cause the first electronic device to send first transmission information comprising a first access address of the first information and second transmission information comprising a second access address of the second information.

4. The first electronic device of claim 3, wherein the first transmission information and the second transmission information further comprise first verification information to perform security verification on the fourth electronic device.

5. The first electronic device of claim 3, wherein the first transmission information further comprises a first thumbnail of the first information and the second transmission information further comprises a second thumbnail of the second information, and wherein the one or more processors are further configured to execute the instructions to cause the first electronic device to display the first and second thumbnails based on coordinates of the first and second input instructions.

6. The first electronic device of claim 3, wherein the first transmission information further comprises first description information of the first information and the second transmission information further comprises second description information of the second information, and wherein the one or more processors are further configured to execute the instructions to cause the first electronic device to:
   generate a first thumbnail of the first information based on the first description information and a second thumbnail of the second information based on the second description information; and
   display the first and second thumbnails based on coordinates of the first and second input instructions.

7. The first electronic device of claim 1, wherein the one or more processors are further configured to execute the instructions to cause the first electronic device to:
   obtain, based on the first and second input instructions, input location information to obtain a third application that receives the first and second information and a location at which the third application displays the first and second information; and
   send the input location information to the fourth electronic device.

8. A second electronic device comprising:
   a display;
   a memory configured to store instructions; and
   one or more processors coupled to the memory and display and configured to execute the instructions to cause the second electronic device to:
   send a projected interface to a first electronic device;
   receive, from the first electronic device, first and second input instructions, wherein the first and second input instructions are based on first and second instructions triggered by simultaneous tap operations acting on first and second information;

obtain the first and second information from the projected interface based on the first and second input instructions;

receive, from a third electronic device, first transmission information related to the first information;

receive, from a fourth electronic device, second transmission information related to the second information; and display, on the display, the first and second information based on a time sequence of receiving the first and second information.

9. The second electronic device of claim 8, wherein the one or more processors are further configured to execute the instructions to cause the second electronic device to further obtain the first information from the third electronic device and the second information from the fourth electronic device.

10. The second electronic device of claim 8, wherein the first and second transmission information comprises a first access address of the first information and a second access address of the second information.

11. The second electronic device of claim 10, wherein the first and second transmission information further comprises respective first and second verification information, the one or more processors are further configured to execute the instructions to cause the second electronic device to perform verification on the third and fourth electronic devices based on the first verification information and the second verification information.

12. The second electronic device of claim 8, wherein the first transmission information comprises a first thumbnail of the first information or first description information of the first information, and wherein the second transmission information comprises a second thumbnail of the second information or second description information of the second information.

13. A method performed by a first electronic device, comprising:

displaying a first projected interface of a second electronic device using a first window;

displaying a second projected interface of a third electronic device using a second window;

displaying a third projected interface of a fourth electronic device using a third window;

simultaneously detecting a first input instruction that acts on first information in the first window and a second input instruction that acts on second information in the second window, wherein the first and second input instructions include a tap and drag operation that acts on the first and second information and a release operation of the first and second information in the third window;

sending a third input instruction to the fourth electronic device based on the first and second input instructions, wherein the third input instruction instructs the fourth electronic device to obtain the first and second information; and displaying the first and second information in the third window based on a time sequence of receiving the first and second information.

14. The method of claim 13, wherein the tap operation includes a long press instruction triggered by a long press gesture, wherein the drag operation includes a drag instruction triggered by a drag gesture, and wherein the release operation includes a release instruction triggered by a release gesture.

15. The method of claim 13, further comprising sending first transmission information comprising a first access address of the first information and second transmission information comprising a second access address of the second information.

16. The method of claim 15, wherein the first transmission information and the second transmission information further comprise first verification information to perform security verification on the fourth electronic device.

17. The method of claim 15, wherein the first transmission information further comprises a first thumbnail of the first information and the second transmission information further comprises a second thumbnail of the second information, and wherein the method further comprises displaying the first and second thumbnails based on coordinates of the first and second input instructions.

18. The method of claim 15, wherein the first transmission information further comprises first description information of the first information and the second transmission information further comprises second description information of the second information, and wherein the method further comprises:

generating a first thumbnail of the first information based on the first description information and a second thumbnail of the second information based on the second description information; and displaying the first and second thumbnails based on coordinates of the first and second input instructions.

19. The method of claim 13, further comprising:

obtaining, based on the first and second input instructions, input location information to obtain a third application that receives the first and second information and a location at which the third application displays the first and second information; and sending the input location information to the fourth electronic device.

* * * * *